US012696025B2

(12) United States Patent
Zhang et al.

(10) Patent No.: US 12,696,025 B2
(45) Date of Patent: Jul. 28, 2026

(54) EARPHONES

(71) Applicant: SHENZHEN SHOKZ CO., LTD., Shenzhen (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 138 days.

(21) Appl. No.: 18/517,758

(22) Filed: Nov. 22, 2023

(65) Prior Publication Data

US 2024/0147133 A1 May 2, 2024

Related U.S. Application Data

(63) Continuation of application No. PCT/CN2023/083539, filed on Mar. 24, 2023.

(30) Foreign Application Priority Data

Oct. 28, 2022 (CN) ......................... 202211336918.4
Dec. 1, 2022 (CN) ......................... 202223239628.6
(Continued)

(51) Int. Cl.
*H04R 1/10* (2006.01)

(52) U.S. Cl.
CPC ........... *H04R 1/105* (2013.01); *H04R 1/1016* (2013.01)

(58) Field of Classification Search
CPC .............................. H04R 1/105; H04R 1/1016
See application file for complete search history.

(56) References Cited

U.S. PATENT DOCUMENTS 9,031,275 B2 5/2015 Brødsgaard
10,631,075 B1 4/2020 Patil et al.
(Continued)

FOREIGN PATENT DOCUMENTS

CN 203968330 U 11/2014
CN 110012376 A 7/2019
(Continued)

OTHER PUBLICATIONS

Notice of Reasons for Refusal in Japanese Application No. 2024560732 mailed on Jan. 6, 2026, 14 pages.
(Continued)

*Primary Examiner* — Andrew Sniezek
(74) *Attorney, Agent, or Firm* — METIS IP LLC

(57) ABSTRACT

An earphone comprises a sound production component and an ear hook including a first portion and a second portion connected in sequence. The first portion is hung between an auricle of a user and a head of the user, and the second portion extends toward a front outer side of the auricle and connects to the sound production component, so that the sound production component is worn at a position near an ear canal but does not block an opening of the ear canal. The sound production component and the auricle have a first projection and a second projection on a sagittal plane, respectively. A first distance between a centroid of the first projection and a highest point of the second projection in a vertical axis direction is within a range of 17 mm-43 mm, and an area of the first projection is within a range of 202 $mm^2$-560 $mm^2$.

20 Claims, 25 Drawing Sheets

(30) Foreign Application Priority Data

| | | |
|---|---|---|
| Dec. 30, 2022 | (WO) ................ | PCT/CN2022/144339 |
| Mar. 2, 2023 | (WO) ................ | PCT/CN2023/079409 |
| Mar. 2, 2023 | (WO) ................ | PCT/CN2023/079412 |

(56) References Cited

U.S. PATENT DOCUMENTS

| | | | | |
|---|---|---|---|---|
| 11,736,850 | B1 | 8/2023 | Liu et al. | |
| 11,877,111 | B1 * | 1/2024 | Zhang .................... | H04R 1/105 |
| 11,902,733 | B1 * | 2/2024 | Xu ........................ | H04R 1/1066 |
| 11,956,584 | B1 * | 4/2024 | Zhang .................. | H04R 1/1041 |
| 2003/0044038 | A1 | 3/2003 | Shirata | |
| 2007/0009133 | A1 | 1/2007 | Gerkinsmeyer | |
| 2007/0258613 | A1 | 11/2007 | Wright | |
| 2008/0144877 | A1 | 6/2008 | Ham et al. | |
| 2009/0175473 | A1 | 7/2009 | Wong et al. | |
| 2010/0061581 | A1 | 3/2010 | Soetejo et al. | |
| 2012/0070022 | A1 | 3/2012 | Saiki | |
| 2012/0134524 | A1 | 5/2012 | Peng | |
| 2016/0134957 | A1 | 5/2016 | Jentz et al. | |
| 2016/0381472 | A1 | 12/2016 | Feeley et al. | |
| 2017/0006387 | A1 | 1/2017 | Kah, Jr. | |
| 2017/0034611 | A1 | 2/2017 | Maruyama | |
| 2020/0137476 | A1 | 4/2020 | Shinmen et al. | |
| 2020/0196062 | A1 | 6/2020 | Zhang | |
| 2020/0322712 | A1 | 10/2020 | Williams et al. | |
| 2021/0029477 | A1 | 1/2021 | Yoshikawa et al. | |
| 2021/0112329 | A1 | 4/2021 | Zhang et al. | |
| 2021/0168483 | A1 | 6/2021 | Zhang et al. | |
| 2021/0195312 | A1 | 6/2021 | Woo et al. | |
| 2022/0095029 | A1 | 3/2022 | Zheng et al. | |
| 2022/0124423 | A1 | 4/2022 | Zheng et al. | |
| 2022/0124428 | A1 | 4/2022 | Zheng et al. | |
| 2022/0386006 | A1 | 12/2022 | Meyberg Guzman et al. | |
| 2023/0061686 | A1 | 3/2023 | Wolfl | |
| 2023/0130211 | A1 | 4/2023 | Li et al. | |
| 2023/0269512 | A1 | 8/2023 | Wang | |
| 2023/0308801 | A1 | 9/2023 | Schmidt et al. | |
| 2024/0040301 | A1 * | 2/2024 | Zheng .................... | H04R 1/105 |
| 2024/0107219 | A1 | 3/2024 | He | |

FOREIGN PATENT DOCUMENTS

| | | | |
|---|---|---|---|
| CN | 110958526 | A | 4/2020 |
| CN | 210491148 | U | 5/2020 |
| CN | 212909891 | U | 4/2021 |
| CN | 214014498 | U | 8/2021 |
| CN | 214125513 | U | 9/2021 |
| CN | 113542956 | A | 10/2021 |
| CN | 113556638 | A | 10/2021 |
| CN | 113573215 | A | 10/2021 |
| CN | 114189778 | A | 3/2022 |
| CN | 114286228 | A | 4/2022 |
| CN | 114286234 | A | 4/2022 |
| CN | 114286236 | A | 4/2022 |
| CN | 216357249 | U | 4/2022 |
| CN | 216649963 | U | 5/2022 |
| CN | 217063962 | U | 7/2022 |
| CN | 115175069 | A | 10/2022 |
| EP | 4181531 | A1 | 5/2023 |
| WO | 2021133679 | A1 | 7/2021 |

OTHER PUBLICATIONS

Notice of Reasons for Rejection in Japanese Application No. 2024560734 mailed on Oct. 7, 2025, 10 pages.

The Extended European Search Report in European Application No. 23881048.5 mailed on Jul. 8, 2025, 10 pages.

* cited by examiner

EARPHONES

CROSS-REFERENCE TO RELATED APPLICATIONS

This application is a continuation of International Application No. PCT/CN2023/083539, filed on Mar. 24, 2023, which claims priority to Chinese Patent Application No. 202211336918.4, filed on Oct. 28, 2022, Chinese Patent Application No. 202223239628.6, filed on Dec. 1, 2022, International Application No. PCT/CN2022/144339, filed on Dec. 30, 2022, International Application No. PCT/CN2023/079412, filed on Mar. 2, 2023, and International Application No. PCT/CN2023/079409, filed on Mar. 2, 2023, the entire contents of each of which are hereby incorporated by reference.

TECHNICAL FIELD

The present application relates to the field of acoustic technology, and in particular, it relates to headphones.

BACKGROUND

With a development of acoustic output technologies, an acoustic device (e.g., an earphone) has been widely used in a daily life. The acoustic device may be used with an electronic device (e.g., a mobile phone, a computer, etc.) to provide an auditory feast to a user. The acoustic device may be generally divided into a headset acoustic device, an ear hook acoustic device, an in-ear acoustic device, etc., according to a wearing manner of the user.

Therefore, it is desirable to provide earphones that are able to improve a wearing comfortability for users and have a good output performance.

SUMMARY

One embodiment of the present disclosure provides an earphone, comprising: a sound production component and an ear hook. The ear hook may include a first portion and a second portion connected in sequence. The first portion may be hung between an auricle of a user and a head of the user. The second portion may extend toward a front outer side of the auricle and connect to the sound production component, so that the sound production component may be worn at a position near an ear canal but does not block an opening of the ear canal. The sound production component and the auricle may have a first projection and a second projection on a sagittal plane, respectively. A centroid of the first projection may have a first distance from a highest point of the second projection in a vertical axis direction. The first distance may be within a range of 17 mm-43 mm. An area of the first projection may be within a range of 202 $mm^2$-560 $mm^2$.

BRIEF DESCRIPTION OF THE DRAWINGS

The present disclosure is further described in terms of exemplary embodiments. These exemplary embodiments are described in detail with reference to the accompanying drawings. These exemplary embodiments are non-limiting exemplary embodiments, in which like reference numbers represent similar structures throughout the several views of the drawings, wherein.

DETAILED DESCRIPTION

Figure 1:
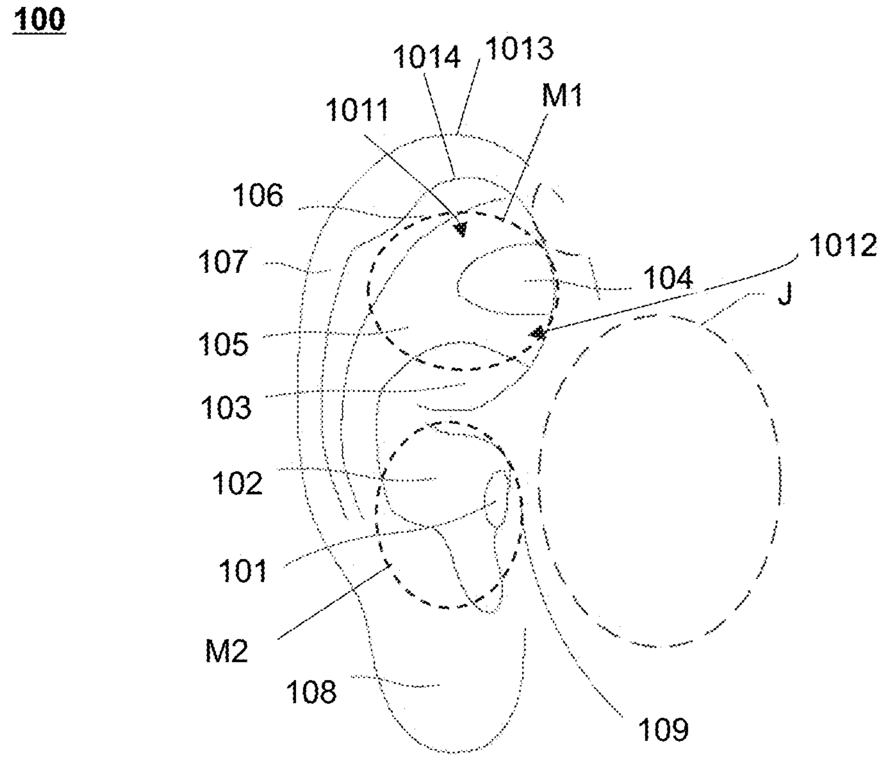
FIG. 1 is a schematic diagram illustrating an exemplary ear according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

FIG. 1 is a schematic diagram illustrating an exemplary ear according to some embodiments of the present disclosure. As shown in FIG. 1, FIG. 1 is a schematic diagram of an exemplary ear according to some embodiments of the present disclosure. Referring to FIG. 1, an ear 100 may include an external ear canal 101, a cavity of auricular concha 102, a cymba conchae 103, a triangular fossa 104, an antihelix 105, a scapha 106, a helix 107, an earlobe 108, a crus of helix 109, an outer contour 1013, and an inner contour 1014. It should be noted that, for the convenience of description, a superior crura of antihelix 1011, an inferior crura of antihelix 1012, and the antihelix 105 are collectively referred to as an antihelix region in the embodiments of the present disclosure. In some embodiments, an acoustic device may be stably worn by means of one or more parts of the ear 100 supporting the acoustic device. In some embodiments, the external ear canal 101, the cavity of auricular concha 102, the cymba conchae 103, and the triangular fossa 104 may have a certain depth and volume in a three-dimensional space, which can be used to meet the wearing requirements of the acoustic device. For example, the acoustic device (e.g., the earphone) may be worn in the external ear canal 101. In some embodiments, the acoustic device may be worn by means of other parts of the ear 100 than the external ear canal 101. For example, the acoustic device may be worn by means of the cymba conchae 103, the triangular fossa 104, the antihelix 105, the scapha 106, or the helix 107, or a combination thereof. In some embodiments, the earlobe 108 of the user and other parts may be further used to improve the wearing comfort and reliability of the acoustic device.

By using other parts of the ear 100 than the external ear canal 101 to wear the acoustic device and transmit sound, the external ear canal 101 of the user may be “freed”. When the user wears the acoustic device (earphone), the acoustic device may not block the external ear canal 101 of the user. The user may receive both the sound from the acoustic device and the sound from the environment (e.g., sound of a whistle, sound of a vehicle bell, sound of people around, sound of traffic guidance, etc.), thereby reducing the probability of traffic accidents. In some embodiments, the acoustic device may be designed into a structure adapted to the ear 100 according to a structure of the ear 100, to realize the wearing of the sound production component of the acoustic device at different positions of the ear. For example, when the acoustic device is the earphone, the earphone may include a suspension structure (e.g., the ear hook) and the sound production component. The sound production component and the suspension structure may be physically connected. The suspension structure may be adapted to a shape of the auricle, to place the whole or part of the structure of the sound production component on a front side (e.g., a region J enclosed by dotted lines in FIG. 1) of the crus of helix 109. As another example, when the user wears the earphone, the whole or part structure of the sound production component may be in contact with an upper part (e.g., a position of one or more of the crus of helix 109, the cymba conchae 103, the triangular fossa 104, the antihelix 105, the scapha 106, the helix 107, etc.) of the external ear canal 101. As another example, when the user wears the earphone, the whole or part of the structure of the sound production component may be located in a cavity (e.g., a region M1 including at least the cymba conchae 103 and the triangular fossa 104 and a region M2 including at least the cavity of auricular concha 102 enclosed by the dotted lines in FIG. 1) formed by one or more parts (e.g., the cavity of auricular concha 102, the cymba conchae 103, the triangular fossa 104, etc.) of the ear.

Different users may have individual differences, resulting in different shapes, sizes, and other dimensional differences in the ears. For ease of description and understanding, unless otherwise specified, the present disclosure mainly takes to an ear model with a “standard” shape and size for reference, and further describes how the acoustic device in different embodiments is worn on the ear model. For example, a simulator containing the head and (left and right) ears thereof prepared based on ANSI: S3.36, S3.25 and IEC: 60318-7 standards, such as GRAS KEMAR, HEAD Acoustics, B&K 4128 series, or B&K 5128 series, may be used as a reference for wearing the acoustic device, to present a situation that most users normally wear the acoustic device. Taking GRAS KEMAR as an example, an ear simulator may be any one of GRAS 45AC, GRAS 45BC, GRAS 45CC, or GRAS 43AG. Taking HEAD Acoustics as an example, an ear simulator may be any one of HMS II.3, HMS II.3 LN, or HMS II.3LN HEC. It should be noted that the range of data measured in the embodiments of the present disclosure is based on GRAS 45BC KEMAR, but it should be understood that there may be differences between different head models and ear models. There may be a fluctuation of ±10% in the relevant data range with other models. Merely by way of example, a reference ear model may have the following relevant features: a size of a projection of an auricle on a sagittal plane in a vertical axis direction may be within a range of 55 mm-65 mm, and a size of the projection of the auricle on the sagittal plane in a sagittal axis direction may be within a range of 45 mm-55 mm. The projection of the auricle on the sagittal plane refers to a projection of an edge of the auricle on the sagittal plane. The edge of the auricle may at least include an outer contour of the helix, a contour of the earlobe, a contour of a tragus, an intertragic notch, an antitragus tip, a notch between an antitragus and the antihelix, etc. Therefore, in the present disclosure, expressions such as “wearing by the user”, “in the wearing state” and “in wearing” refer to that the acoustic device described in the present disclosure is worn on the ear of the simulator. Of course, considering the individual differences of different users, the structure, shape, size, thickness, etc., of one or more parts of the ear 100 may be differentiated according to ears of different shapes and sizes. These differentiated designs may be expressed as that feature parameters of one or more parts (e.g., the sound production component, the ear hook, etc., hereinafter) of the acoustic device may have different ranges of values, to adapt to different ears.

It should be noted that in the fields of medicine and anatomy, three basic planes including the sagittal plane, the coronal plane, and the horizontal plane, and three basic axes including the sagittal axis, the coronal axis, and the vertical axis of a human body may be defined. The sagittal plane refers to a section perpendicular to the ground along front and rear directions of the body, which divides the human body into left and right parts; the coronal plane refers to a section perpendicular to the ground along left and right directions of the body, which divides the human body into front and rear parts; and the horizontal plane refers to a section parallel to the ground along a vertical direction of the body, which divides the human body into upper and lower parts. Correspondingly, the sagittal axis refers to an axis along a front-back direction of the body and perpendicular to the coronal plane, the coronal axis refers to an axis along a left-right direction of the body and perpendicular to the sagittal plane, and the vertical axis refers to an axis along a vertical direction of the body and perpendicular to the horizontal plane. Further, the front side of the ear in the present disclosure refers to a side of the ear facing a facial region of the human body along the sagittal axis direction. A schematic diagram illustrating a front contour of the ear as shown in FIG. 1 may be obtained by observing the ear of the simulator along the coronal axis direction of the human body.

The description of the ear 100 is for illustration purposes only, and is not intended to limit the scope of the present disclosure. Those skilled in the art can make various variations and modifications based on the description of the present disclosure. For example, part of the structure of the acoustic device may cover part or all of the external ear canal 101. These variations and modifications are still within the protection scope of the present disclosure.

Figure 2:
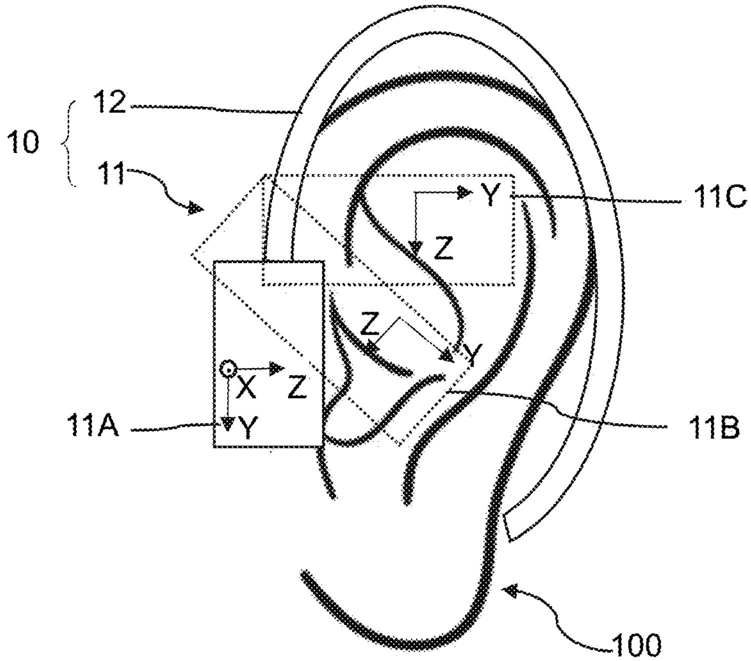
FIG. 2 is a schematic diagram illustrating an exemplary wearing manner of an earphone according to some embodiments of the present disclosure.

FIG. 2 is a schematic diagram illustrating an exemplary wearing manner of an earphone according to some embodiments of the present disclosure. As shown in FIG. 2, the earphone 10 may comprise a sound production component 11 and a suspension structure 12. In some embodiments, the earphone 10 may enable the sound production component 11 to be worn on a user’s body (e.g., the head, neck, or upper torso of the body) through the suspension structure 12. In some embodiments, the suspension structure 12 may be an ear hook. The sound production component 11 may be connected with one end of the ear hook. The ear hook may be set in a shape suitable for the ear of the user. For example, the ear hook may be in an arc structure. In some embodiments, the suspension structure 12 may also be a clamping structure adapted to the auricle of the user, to enable the suspension structure 12 to clamp the auricle of the user. In some embodiments, the suspension structure 12 may include but not limited to the ear hook, an elastic band, etc., so that the earphone 10 may be hung on the user to prevent the earphone 10 from falling during use for the user.

In some embodiments, the sound production component 11 may be worn on the user's body. A loudspeaker may be disposed in the sound production component 11 to produce sound input to the ear of the user 100. In some embodiments, the earphone 10 may be combined with products such as glasses, a headset, a head-mounted display device, an AR/VR helmet, etc. In this case, the sound production component 11 may be suspended or clamped near the ear 100 of the user. In some embodiments, the sound production component 11 may be circular, elliptical, polygonal (regular or irregular), U-shaped, V-shaped, or semicircular, so that the sound production component 11 may be directly hung on the ear 100 of the user.

Referring to FIG. 1 and FIG. 2, in some embodiments, when the user wears the earphone 10, at least part of the sound production component 11 may be located in a region J on a front side of a tragus of the ear 100 of the user or regions $M_1$ and $M_2$ on a front outer side of an auricle in FIG. 1. An exemplary description may be given below in conjunction with different wearing positions of the sound production component (11A, 11B, and 11C). It should be noted that the front outer side of the auricle mentioned in the embodiments of the present disclosure refers to a side of the auricle away from the head along the coronal axis direction, and correspondingly, a rear inner side of the auricle refers to a side of the auricle facing the head along the coronal axis direction. In some embodiments, the sound production component 11A may be located on a side of the ear 100 of the user facing the facial region along the sagittal axis direction, i.e., the sound production component 11A may be located on a human facial region J on a front side of the ear 100. Further, a loudspeaker may be disposed inside a housing of the sound production component 11A. At least one sound guiding hole (not shown in FIG. 2) may be disposed on the housing of the sound production component 11A. The sound guiding hole may be disposed on a sidewall of the housing of the sound production component facing or close to the external ear canal 101 of the user. The loudspeaker may output sound to the external ear canal 101 of the user through the sound guiding hole. In some embodiments, the loudspeaker may include a diaphragm. A cavity inside the housing of the sound production component 11 may be at least divided into a front cavity and a rear cavity by the diaphragm. The sound guiding hole may be acoustically coupled with the front cavity. The diaphragm may vibrate to drive the air in the front cavity to vibrate to produce air-conducted sound. The air-conducted sound produced by the front cavity may be transmitted to the outside through the sound guiding hole. In some embodiments, the housing of the sound production component 11 may further include one or more pressure relief holes. The pressure relief hole may be located on a sidewall of the housing adjacent to or opposite to a sidewall where the sound guiding hole is located. The pressure relief hole may be acoustically coupled with the rear cavity. When the diaphragm vibrates, the vibration may also drive the air in the rear cavity to vibrate to produce air-conducted sound. The air-conducted sound produced by the rear cavity may be transmitted to the outside through the pressure relief hole. For example, in some embodiments, the loudspeaker in the sound production component 11A may output sound with a phase difference (e.g., anti-phase) through the sound guiding hole and the pressure relief hole. The sound guiding hole may be located in a sidewall of the housing of the sound production component 11A facing the external ear canal 101 of the user, and the pressure relief hole may be located on a side of the housing of the sound production component 11 away from the external ear canal 101 of the user. At this time, the housing may act as a baffle, thereby increasing a sound path difference from the sound guiding hole and the pressure relief hole to the external ear canal 101, and increasing a sound intensity at the external ear canal 101 while reducing a volume of far-field leakage. In some embodiments, the sound production component 11 may have a long axis direction Y and a short axis direction Z which are perpendicular to a thickness direction X and orthogonal to each other. The long axis direction Y may be defined as a direction (e.g., when a projection shape is a rectangle or an approximate rectangle, the long axis direction may be a length direction of the rectangle or the approximate rectangle) with a maximum extension size in a shape of a two-dimensional projection plane (e.g., a projection of the sound production component 11 on a plane where an outer surface of the sound production component is located, or a projection of the sound production component 11 on the sagittal plane) of the sound production component 11. The short axis direction Z may be defined as a direction (e.g., when a projection shape is a rectangle or an approximate rectangle, the short axis direction may be a width direction of the rectangle or the approximate rectangle) in a shape of a projection of the sound production component 11 on the sagittal plane perpendicular to the long axis direction Y. The thickness direction X may be defined as a direction perpendicular to the two-dimensional projection plane, e.g., which is consistent with the coronal axis direction, both pointing to the left and right directions of the body. In some embodiments, when the sound production component 11 is in a tilted state when being worn, the long axis direction Y and the short axis direction Z may still be parallel or approximately parallel to the sagittal plane. A certain included angle may be formed between the long axis direction Y and the sagittal axis direction, i.e., the long axis direction Y may also be tilted accordingly. A certain included angle may be formed between the short axis direction Z and the vertical axis direction, i.e., the short axis direction Z may also be tilted, as shown in a wearing state of the sound production component of FIG. 2. In some embodiments, the whole or part of the structure of the sound production component 11B may extend into the cavity of auricular concha, i.e., a projection of the sound production component 11B on the sagittal plane and a projection of the cavity of auricular concha on the sagittal plane may have an overlap part. The specific description regarding the sound production component 11B may be found elsewhere in the present disclosure (e.g., FIG. 3 and corresponding content thereof). In some embodiments, the sound production component 11 may also be in a horizontal state or approximately horizontal state in the wearing state, as shown in the sound production component 11C of FIG. 2. The long axis direction Y may be consistent or approximately consistent with the sagittal axis direction, both pointing to the front-back direction of the body. The short axis direction Z may be consistent or approximately consistent with the direction of the vertical axis, both pointing to the up-down direction of the body. It should be noted that in the wearing state, the sound production component 11C in the approximately horizontal state means that an included angle between the long axis direction Y of the sound production component 11C shown in FIG. 2 and the sagittal axis may be within a specific range (e.g., not greater than 20°). In addition, a wearing position of the sound production component may not be limited to the sound production component 11A, the sound production component 11B, and the sound production component 11C in FIG. 2. The wearing position of the sound production component 11 may meet the region J, the region $M_1$, or the $M_2$ in FIG. 1. For example, the whole or part structure of the sound production component 11 may be located in the region J enclosed by the dotted lines in FIG. 1. As another example, the whole or part structure of the sound production component may be in contact with the position of one or more parts of the ear 100 such as the crus of helix 109, the cymba conchae 103, the triangular fossa 104, the antihelix 105, the scapha 106, and the helix 107. As another example, the whole or part structure of the sound production component 11 may be located in a cavity (e.g., the region $M_1$ enclosed by the dotted lines in FIG. 1 that includes at least the cymba conchae 103 and the triangular fossa 104, and the region $M_2$ enclosed by the dotted lines in FIG. 1 that includes at least the cavity of auricular concha 102) formed by one or more parts (e.g., the cavity of auricular concha 102, the cymba conchae 103, the triangular fossa 104, etc.) of the ear 100.

In order to improve the stability of the earphone 10 in the wearing state, the earphone 10 may adopt any one or a combination of the following methods. First, at least part of the suspension structure 12 may be configured as a profiling structure that fits at least one of the rear inner side of the auricle and the head, to increase a contact area between the suspension structure 12 and the ear and/or the head, thereby increasing the resistance of the acoustic device 10 falling off from the ear. Second, at least part of the suspension structure 12 may be set as an elastic structure, so that the suspension structure 12 may have a certain amount of deformation in the wearing state, to increase a positive pressure of the suspension structure 12 on the ear and/or the head, thereby increasing the resistance of the earphone 10 falling off from the ear. Third, at least part of the suspension structure 12 may be set to lean against the ear and/or the head in the wearing state, to form a reaction force that presses the ear and make the sound production component 11 press against the front outer side (e.g., the regions $M_1$ and $M_2$ shown in FIG. 1) of the auricle, thereby increasing the resistance of the earphone 10 falling off from the ear. Fourth, the sound production component 11 and the suspension structure 12 may be set to clamp the antihelix region, a region of the cavity of auricular concha, etc. from the front outer side and the rear inner side of the auricle in the wearing state, thereby increasing the resistance of the earphone 10 falling off from the ear. Fifth, the sound production component 11 or a structure connected thereto may be arranged to at least partially extend into cavities such as the cavity of auricular concha 102, the cymba conchae 103, the triangular fossa 104, and the scapha 106, thereby increasing the resistance of the earphone 10 falling off from the ear.

Figure 3:
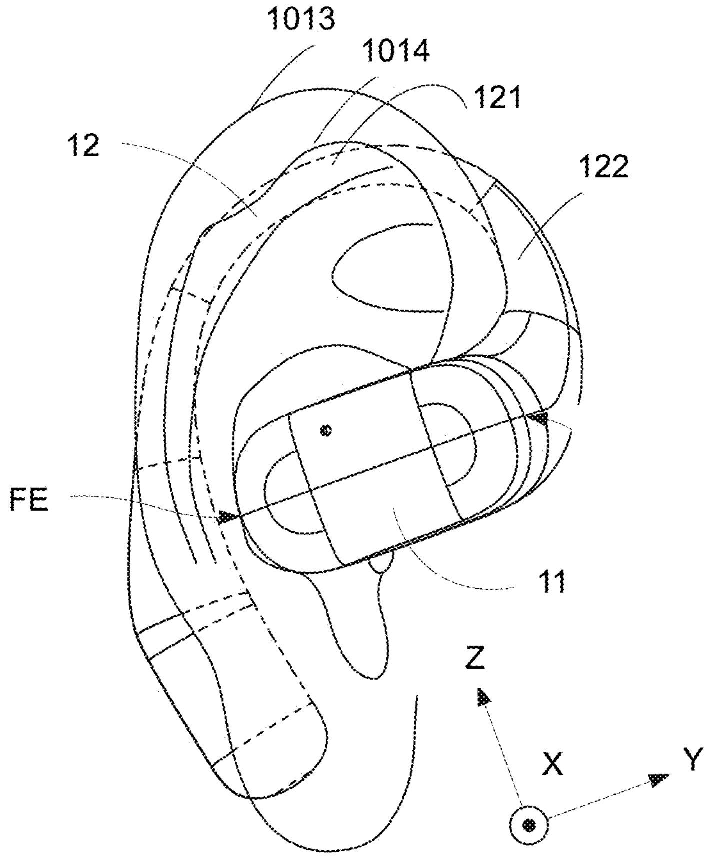
FIG. 3 is a schematic diagram illustrating a wearing manner that a sound production component of an earphone is inserted into a cavity of an auricular concha according to some embodiments of the present disclosure.

Exemplarily, referring to FIG. 3, in the wearing state, an end FE (also referred to as a free end) of the sound production component 11 may extend into the cavity of auricular concha. Optionally, the sound production component 11 and the suspension structure 12 may be configured to clamp an ear region from the front side and the rear side of the ear region corresponding to the cavity of auricular concha, thereby increasing the resistance of the earphone 10 when the earphone is falling off from the ear, and further improving the stability of the earphone 10 in the wearing state. For example, the end FE of the sound production component may be pressed in the cavity of auricular concha in the thickness direction X. As another example, the end FE may abut against the cavity of auricular concha (e.g., the end FE abuts against an inner wall of the cavity of auricular concha opposite to the end FE) in the long axis direction Y and/or the short axis direction Z. It should be noted that the end FE of the sound production component 11 refers to an end of the sound production component 11 opposite to a fixed end connected with the suspension structure 12, which is also referred to as the free end. The sound production component 11 may be a regular or irregular structure. An exemplary description is given to further illustrate the end FE of the sound production component 11. For example, when the sound production component 11 is a cuboid structure, an end wall of the sound production component 11 may be a plane, and the end FE of the sound production component 11 may be an end sidewall opposite to the fixed end connected with the suspension structure 12 in the sound production component 11. As another example, when the sound production component 11 is a sphere, an ellipsoid, or an irregular structure, the end FE of the sound production component 11 may be a specific region away from the fixed end obtained by cutting the sound production component 11 along a Y-Z plane (a plane formed by the short axis direction Z and the thickness direction X). A ratio of a size of the specific region along the long axis direction Y to a size of the sound production component along the long axis direction Y may be within a range of 0.05-0.2.

Figure 4:
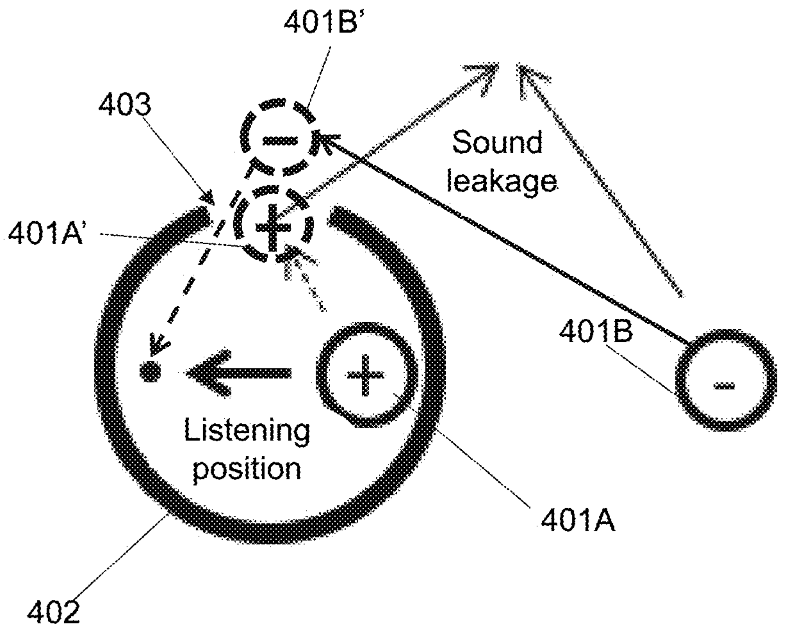
FIG. 4 is a schematic diagram illustrating an acoustic model with a cavity-like structure according to some embodiments of the present disclosure.

By extending at least part of the sound production component 11 into the cavity of auricular concha, a listening volume at a listening position (e.g., at the opening of the ear canal), especially a listening volume at middle and low frequencies, may be improved, while still maintaining good effect of far-field sound leakage cancellation. Merely by way of example, when the whole or part of the structure of the sound production component 11 extends into the cavity of auricular concha 102, the sound production component 11 and the cavity of auricular concha 102 may form a structure similar to a cavity (hereinafter referred to as a quasi-cavity structure). In the embodiments of the disclosure, the quasi-cavity structure may be understood as a semi-closed structure enclosed by the sidewall of the sound production component 11 and the cavity of auricular concha 102. The semi-closed structure may make the listening position (e.g., the opening of the ear canal) not completely sealed off from an external environment, but have a leakage structure (e.g., an opening, a gap, a tube, etc.) in acoustic communication with the external environment. When the user wears the earphone 10, one or more sound guiding holes may be disposed on a side of the housing of the sound production component 11 near or toward the ear canal of the user. One or more pressure relief holes may be disposed on other sidewalls (e.g., sidewalls away from the ear canal of the user) of the housing of the sound production component 11. The sound guiding hole may be acoustically coupled with a front cavity of the earphone 10, and the pressure relief hole may be acoustically coupled with a rear cavity of the earphone 10. Taking the sound production component 11 including one sound guiding hole and one pressure relief hole as an example, sound output from the sound guiding hole and sound output from the pressure relief hole may be approximately regarded as two sound sources. Sound phases of the two sound sources may be opposite to form a dipole. Inner walls corresponding to the sound production component 11 and the cavity of auricular concha 102 may form the quasi-cavity structure. The sound source corresponding to the sound guiding hole may be located in the quasi-cavity structure, and the sound source corresponding to the pressure relief hole may be located outside the quasi-cavity structure, forming an acoustic model shown in FIG. 4. As shown in FIG. 4, a quasi-cavity structure 402 may include a listening position and at least one sound source 401A. The “include” here means that at least one of the listening position and the sound source 401A is located inside the quasi-cavity structure 402, and also means that at least one of the listening position and the sound source 401A is located at an inner edge of the quasi-cavity structure 402. The listening position may be equivalent to the opening of the ear canal, an acoustic reference point of the ear, such as ERP, DRP, etc., or an entrance structure leading to a listener, etc. A sound source 401B may be located outside the quasi-cavity structure 402. The sound sources 401A and 401B with anti-phases may form a dipole. The dipole may respectively radiate sound to the surrounding space and produce a phenomenon of interference and cancellation of sound waves, thereby realizing the effect of sound leakage cancellation. As a sound path difference between the two sounds is relatively large at the listening position, the effect of sound cancellation may be relatively insignificant, and a relatively large sound may be heard at the listening position than at other positions. Specifically, as the sound source 401A is surrounded by the quasi-cavity structure 402, most of the sound radiated from the sound source 401A may reach the listening position through direct radiation or reflection. In contrast, most of the sound radiated from the sound source 401A may not reach the listening position without the quasi-cavity structure 402. Therefore, the arrangement of the quasi-cavity structure 402 may significantly increase a sound volume reaching the listening position. Meanwhile, only a small part of anti-phase sound radiated from the anti-phase sound source 401B outside the quasi-cavity structure 402 may enter the quasi-cavity structure 402 through a leakage structure 403 of the quasi-cavity structure 402. This may be equivalent to generating a secondary sound source 401B' at the leakage structure 403, of which an intensity may be significantly smaller than the sound source 401B and also be significantly smaller than the sound source 401A. The sound produced by the secondary sound source 401B' may have a weak anti-phase cancellation effect on the sound source 401A in the cavity, which may significantly increase the listening volume at the listening position. For sound leakage, the sound source 401A may radiate sound to the outside through the leakage structure 402 of the cavity, which may be equivalent to generating a secondary sound source 401A' at the leakage structure 402. As almost all the sound radiated by the sound source 401A comes from the leakage structure 403, and a scale of the quasi-cavity structure 402 is much smaller than a spatial scale of evaluating sound leakage (the difference is at least one order of magnitude), it can be considered that an intensity of the secondary sound source 401A' may be equivalent to that of the sound source 401A. For the external space, the sound cancellation effect produced by the secondary sound source 401A' and the sound source 401B may be equivalent to the sound cancellation effect produced by the sound source 401A and the sound source 401B. That is to say, a considerable sound leakage reduction effect may still be maintained under the quasi-cavity structure.

In a specific application scenario, an outer wall of the housing of the sound production component 11 may usually be a plane or a curved surface, while a contour of the cavity of auricular concha of the user may be an uneven structure. By extending part or the whole structure of the sound production component 11 into the cavity of auricular concha, the sound production component 11 and the contour of the cavity of auricular concha may form the quasi-cavity structure that communicates with the outside. Further, the sound guiding hole may be arranged on a position of the housing of the sound production component toward the opening of ear canal of the user and near the edge of the cavity of auricular concha, and the pressure relief hole may be arranged at a position where the sound production component 11 deviates from or is away from the opening of the ear canal, to construct the acoustic model shown in FIG. 4, to improve the listening volume at the opening of ear canal when the user wears the earphone, and reduce the far-field leakage effect.

Figure 5A:
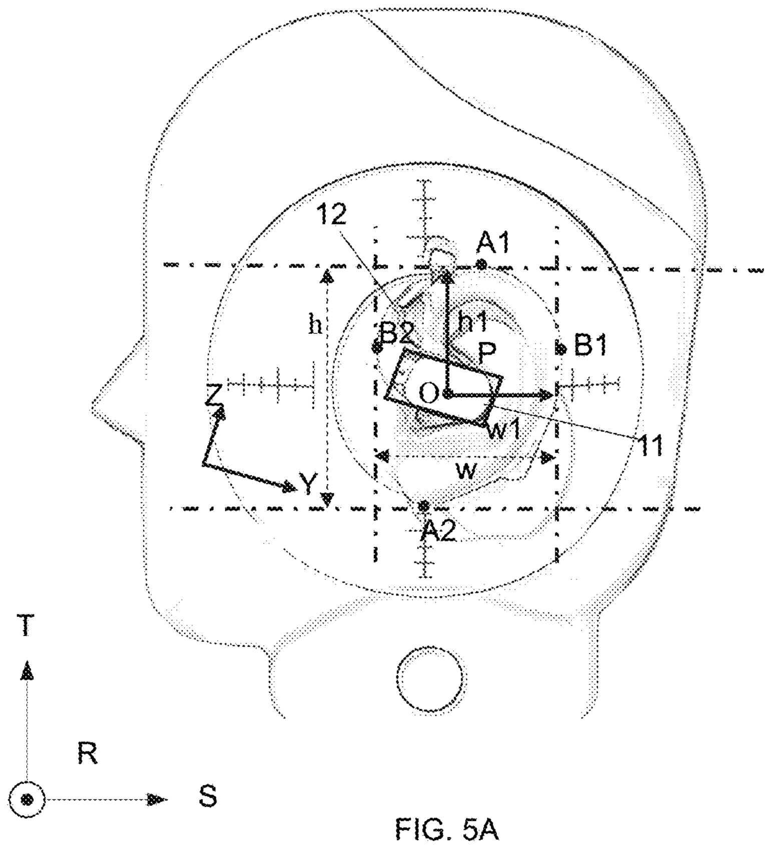
FIG. 5A is a schematic diagram illustrating an exemplary wearing manner of an earphone according to some embodiments of the present disclosure.
Figure 5B:
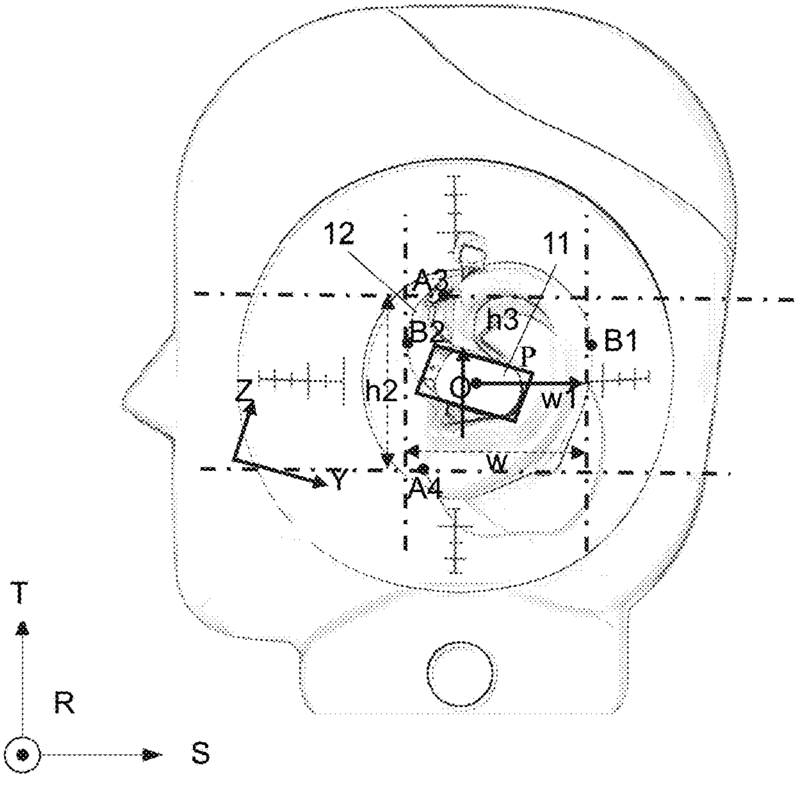
FIG. 5B is a schematic diagram illustrating an exemplary wearing manner of an earphone according to some embodiments of the present disclosure.

FIG. 5A and FIG. 5B are schematic diagrams illustrating an exemplary wearing manner of an earphone according to some embodiments of the present disclosure.

In some embodiments, the sound production component of the earphone may include a transducer and a housing for accommodating the transducer. The transducer may be an element capable of receiving an electrical signal and converting the electrical signal into a sound signal for output. In some embodiments, according to frequencies, transducer types may include low frequency (e.g., 30 Hz-150 Hz) loudspeakers, medium and low frequency (e.g., 150 Hz-500 Hz) loudspeakers, medium and high frequency (e.g., 500 Hz-5 kHz) loudspeakers, high frequency (e.g., 5 kHz-16 kHz) loudspeakers, or full range (e.g., 30 Hz-16 kHz) loudspeakers, or any combination thereof. The low frequency, high frequency, etc., mentioned here may only represent an approximate range of the frequency, and in different application scenarios, there may be different division methods. For example, a frequency division point may be determined, the low frequency may represent a frequency range below the frequency division point, and the high frequency may represent a frequency range above the frequency division point. The frequency division point may be any value within an audible range of the human ear, e.g., 500 Hz, 600 Hz, 700 Hz, 800 Hz, 1000 Hz, or the like.

In some embodiments, the transducer may include a diaphragm. When the diaphragm vibrates, the sound may be emitted from the front side and the rear side of the diaphragm, respectively. In some embodiments, a front cavity (not shown) for sound transmission may be disposed at the front side of the diaphragm in the housing 120. The front cavity may be acoustically coupled with the sound guiding hole, and sound from the front side of the diaphragm may be emitted from the sound guiding hole through the front cavity. A rear cavity (not shown) for sound transmission may be disposed at the rear side of the diaphragm in the housing 120. The rear cavity may be acoustically coupled with the pressure relief hole, and sound from the rear side of the diaphragm may be emitted from the pressure relief hole through the rear cavity.

Referring to FIG. 3, an example of the suspension structure 12 is shown here with an ear hook. In some embodiments, the ear hook may include a first portion 121 and a second portion 122 connected in sequence. The first portion may be hung between the rear inner side of the auricle of the user and the head of the user. The second portion may extend toward a front outer side (a side of the auricle away from the head along the coronal axis direction) of the auricle and connect the sound production component 11, so that the sound production component may be worn at a position near the ear canal but not block the opening of the ear canal. In some embodiments, the sound guiding hole may be disposed on the sidewall of the housing of the sound production component 11 toward the auricle, and the sound produced by the transducer may be exported out of the housing and transmitted to the opening of the ear canal of the user.

Referring to FIG. 3 and FIG. 5A, in some embodiments, when the user wears the earphone 10, the sound production component 11 may have a first projection on a sagittal plane (i.e., a plane formed by a T-axis and an S-axis in FIG. 5A) along a coronal axis direction R. A shape of the sound production component 11 may be a regular or irregular three-dimensional shape. Correspondingly, the first projection of the sound production component 11 on the sagittal plane may be a regular or irregular shape. For example, when the shape of the sound production component 11 is a cuboid, a quasi-cuboid shape, or a cylinder, the first projection of the sound production component 11 on the sagittal plane may be a rectangle or a quasi-rectangle shape (e.g., a racetrack shape). Considering that the first projection of the sound production component 11 on the sagittal plane may be the irregular shape, for the convenience of describing the first projection, a rectangular region shown in a solid line box P may be delineated around the projection (i.e., the first projection) of the sound production component 11 in FIG. 5A and FIG. 5B, and a centroid O of the rectangular region shown by the solid line box P may be approximately regarded as a centroid of the first projection. It should be noted that the above description about the first projection and the centroid thereof is only an example, and the shape of the first projection is related to the shape of the sound production component 11 or a wearing condition relative to the ear. The auricle may have a second projection on the sagittal plane along the coronal axis direction R. In order to make the earphone 10 in the wearing state, the sound guiding hole of the sound production component 11 may be close to the opening of the ear canal to improve a listening effect at the opening of the ear canal of the user. In some embodiments, a distance $h_1$ (also referred to as a first distance) between a centroid O of the first projection and a highest point of the second projection in a vertical axis direction (e.g., the T-axis direction in FIG. 5A) may be within a range of 17 mm-43 mm. At this time, at least part of the sound production component 11 may be located in the antihelix region of the user or extend into the cavity of auricular concha, so that the sound guiding hole of the sound production component 11 may be close to the opening of the ear canal of the user, thereby guaranteeing a relatively good listening effect at the opening of the ear canal of the user. In this case, sufficient volume may be produced in the ear canal of the user with no requirement for the diaphragm of the sound production component to drive too much air. In some embodiments, an overall size of the sound production component 11 may be reduced by reducing a size of the diaphragm of the sound production component. In addition, an excessive size of the sound production component 11 may increase a weight of the sound production component 11, thereby affecting wearing comfort of the user. In this case, in some embodiments, an area of the first projection may be within a range of 202 $mm^2$-560 $mm^2$. Preferably, the distance $h_1$ between the centroid O of the first projection and the highest point of the second projection in the vertical axis direction may be within a range of 19 mm-40 mm, and an area of the first projection of the sound production component 11 on the sagittal plane may be within a range of 220 $mm^2$-500 $mm^2$. By narrowing down the first distance, the sound production component 11 may not completely cover the opening of the ear canal of the user, and the sound guiding hole of the sound production component 11 is ensured to be closer to the opening of the ear canal of the user. The size of the sound production component 11 and the size of the diaphragm are small, so that sound production efficiency of the sound production component may be improved while reducing the weight of the sound production component 11, thereby improving the wearing comfort of the user. More preferably, the distance $h_1$ between the centroid O of the first projection and the highest point of the second projection in the vertical axis direction may be within a range of 21 mm-35 mm, and the area of the first projection of the sound production component 11 on the sagittal plane may be within a range of 300 $mm^2$-470 $mm^2$. By further narrowing down the first distance, the sound guiding hole of the sound production component 11 is enabled to be closer to the opening of the ear canal of the user while the opening of the ear canal of the user remains fully open. In addition, here the size of the sound production component 11 and the size of the diaphragm may be further optimized, so that the sound production efficiency of the sound production component 11 may be improved on the premise of meeting assembly of internal elements of the sound production component 11, and the weight of the sound production component 11 may be within a reasonable range, thereby guaranteeing the wearing comfort of the user. Based on the above description of the effect, further preferably, the distance $h_1$ between the centroid O of the first projection and the highest point of the second projection in the vertical axis direction may be within a range of 25 mm-31 mm, and the area of the first projection of the sound production component 11 on the sagittal plane may be within a range of 330 $mm^2$-440 $mm^2$.

In some embodiments, the sound production component 11 and the suspension structure 12 may be two independent structures or an integrated structure. In order to describe the first projection region of the sound production component more clearly, a thickness direction X, a long axis direction Y, and a short axis direction Z may be introduced according to a three-dimensional structure of the sound production component 11. The long axis direction Y and the short axis direction Z are perpendicular, and the thickness direction X may be perpendicular to a plane formed by the long axis direction Y and the short axis direction Z. Merely by way of example, a confirmation process of the solid line box P may be as follows. Two farthest points of the sound production component 1 in the long axis direction Y may be determined, and a first line segment and a second line segment parallel to the short axis direction Z through these two farthest points may be drawn, respectively. Two farthest points of the sound production component 11 in the short axis direction Z may be determined, a third line segment and a fourth line segment parallel to the long axis direction Y through these two farthest points may be drawn. The rectangular region of the solid line box P in FIG. 5A and FIG. 5B may be obtained by a region formed by the above line segments.

In some embodiments, a distance $w_1$ (also referred to as a second distance) between the centroid O of the first projection and an end point of the second projection in the sagittal axis direction (e.g., the S-axis direction shown in FIG. 5A) may be within a range of 20 mm-36 mm. Here, when the distance $w_1$ between the centroid O of the first projection and the end point of the second projection in the sagittal axis direction is controlled to be within the range of 20 mm-36 mm, and the distance $h_1$ between the centroid O of the first projection and the highest point of the second projection in the vertical axis direction is controlled to be within the range of 17 mm-36 mm, part or the whole structure of the sound production component 11 may approximately cover the antihelix region of the user (e.g., the position in the triangular fossa, the superior crura of the helix, the inferior crura of the helix, or the position of the antihelix, and the position of the sound production component 11C relative to the ear in FIG. 2) of the user, or part or the whole structure of the sound production component 11 may extend into the cavity of auricular concha (e.g., the position of the sound production component 11C relative to the ear in FIG. 2). In some embodiments, the position of the sound production component relative to the auricle may also be reflected by a ratio of the distance between the centroid of the first projection and the highest point of the second projection to a height of the second projection in a vertical axis, and a ratio of the distance between the centroid of the first projection and the end point of the second projection to a width of the second projection in a sagittal axis. Taking a size of an auricle model described hereinbefore as an example, a size of the second projection in the vertical axis may be 71.33 mm, a size of the second projection in the sagittal axis may be 50.4 mm, the ratio of the distance $h_1$ between the centroid O of the first projection and the highest point of the second projection in the vertical axis direction to the height h of the second projection in the vertical axis direction may be within a range of 0.25-0.6, and the ratio of the distance $w_1$ between the centroid O of the first projection and the end point of the second projection in the sagittal axis direction to the width w of the second projection in the sagittal axis direction may be within a range of 0.4-0.7. Preferably, the ratio of the distance $h_1$ between the centroid O of the first projection and the highest point of the second projection in the vertical axis direction to the height h of the second projection in the vertical axis direction may be within a range of 0.3-0.56, and the ratio of the distance $w_1$ between the centroid O of the first projection and the end point of the second projection in the sagittal axis direction to the width w of the second projection in the sagittal axis direction may be within a range of 0.45-0.65. More preferably, the ratio of the distance $h_1$ between the centroid O of the first projection and the highest point of the second projection in the vertical axis direction to the height h of the second projection in the vertical axis direction may be within a range of 0.35-0.5, and the ratio of the distance $w_1$ between the centroid O of the first projection and the end point of the second projection in the sagittal axis direction to the width w of the second projection in the sagittal axis direction may be within a range of 0.5-0.6. Further preferably, the ratio of the distance $h_1$ between the centroid O of the first projection and the highest point of the second projection in the vertical axis direction to the height h of the second projection in the vertical axis direction may be within a range of 0.4-0.5, and the ratio of the distance $w_1$ between the centroid O of the first projection and the end point of the second projection in the sagittal axis direction to the width w of the second projection in the sagittal axis direction may be within a range of 0.52-0.58.

It should be noted that in the embodiments of the present disclosure, the highest point of the second projection may be understood as a point with a greatest distance in the vertical axis direction relative to the projection of a certain point on the neck of the user on the sagittal plane among all the projection points, i.e., a projection of the highest point of the auricle (e.g., point A1 in FIG. 5A) on the sagittal plane may be the highest point of the second projection. A lowest point of the second projection may be understood as a point with a smallest distance in the vertical axis direction relative to the projection of a certain point of the neck of the user on the sagittal plane among all the projection points, i.e., a projection of the lowest point of the auricle (e.g., point A2 in FIG. 5A) on the sagittal plane may be the lowest point of the second projection. A height of the second projection in the vertical axis direction may be a difference (height h shown in FIG. 5A) between the point with the greatest distance and the point with the smallest distance in the vertical axis direction relative to a projection of a certain point of the neck of the user on the sagittal plane among all the projection points in the second projection, i.e., a distance between the point A1 and the point A2 in the vertical axis direction T. The end point of the second projection may be understood as a point with the greatest distance in the sagittal axis direction relative to a projection of a nose tip of the user on the sagittal plane among all the projection points, i.e., the projection of the end point of the auricle (e.g., point B1 in FIG. 5A) on the sagittal plane may be the end point of the second projection. A front end point of the second projection may be understood as a point with a smallest distance in the sagittal axis direction relative to the projection of the nose tip of the user on the sagittal plane among all projection points, i.e., the projection of the front end point of the auricle (e.g., point B2 shown in FIG. 5) on the sagittal plane may be the front end point of the second projection. A width of the second projection in the sagittal axis direction may be a difference (the width w shown in FIG. 5A) between the point with the greatest distance and the point with the smallest distance along the sagittal axis direction relative to the projection of the nose tip on the sagittal plane among all projection points in the second projection, i.e., a distance between the point B1 and the point B2 in the sagittal axis direction S. It should be noted that the projections of structures such as the sound production component 11 or the auricle on the sagittal plane in the embodiments of the present disclosure refer to projections on the sagittal plane along the coronal axis direction R, which is not emphasized in the disclosure hereinafter.

In some embodiments, in order to make the whole or part structure of the sound production component 11 cover the antihelix region of the user (e.g., the position in the triangular fossa, the superior crura of antihelix, the inferior crura of antihelix, or the position of the antihelix), as the position of the sound production component 11C relative to the ear shown in FIG. 2, the distance $h_1$ between the centroid O of the first projection and the highest point of the second projection in the vertical axis direction may be within a range of 17 mm-29 mm, and the distance $w_1$ between the centroid O of the first projection and the end point of the second projection in the sagittal axis direction may be within a range of 20 mm-31 mm. Correspondingly, the ratio of the distance $h_1$ between the centroid O of the first projection and the highest point of the second projection in the vertical axis direction to the height h of the second projection in the vertical axis direction may be within a range of 0.25-0.4, and the ratio of the distance $w_1$ between the centroid O of the first projection and the end point of the second projection in the sagittal axis direction to the width w of the second projection may be within a range of 0.4-0.6. Preferably, in some embodiments, the distance $h_1$ between the centroid O of the first projection and the highest point of the second projection in the vertical axis direction may be within a range of 17 mm-25 mm, and the distance $w_1$ between the centroid O of the first projection and the end point of the second projection in the sagittal axis direction may be within a range of 21 mm-31 mm. Correspondingly, the ratio of the distance $h_1$ between the centroid O of the first projection and the highest point of the second projection in the vertical axis direction to the height h of the second projection in the vertical axis direction may be within a range of 0.25-0.35, and the ratio of the distance $w_1$ between the centroid O of the first projection and the end point of the second projection in the sagittal axis direction to the width w of the second projection in the sagittal axis direction may be within a range of 0.42-0.6. At this time, a larger portion of the sound production component 11 may be fit to the antihelix region, especially the superior crura of the helix, the inferior crura of the helix, and the triangular fossa, and the sound production component 11 may form a stronger baffle effect with the antihelix region. Meanwhile, the end FE of the sound production component 11 may be relatively close to the inner contour of the auricle, and an acoustic short circuit region between the end FE of the sound production component 11 and the inner contour of the auricle may be significantly reduced, so that the listening volume at the opening of the ear canal of the user may be significantly improved. More preferably, the distance $h_1$ between the centroid O of the first projection and the highest point of the second projection in the vertical axis direction may be within a range of 17 mm-24 mm, and the distance $w_1$ between the centroid O of the first projection and the end point of the second projection in the sagittal axis direction may be within a range of 21 mm-28 mm 21 mm-28 mm. Correspondingly, the ratio of the distance $h_1$ between the centroid O of the first projection and the highest point of the second projection in the vertical axis direction to the height h of the second projection in the vertical axis direction may be within a range of 0.25-0.34, and the ratio of the distance $w_1$ between the centroid O of the first projection and the end point of the second projection in the sagittal axis direction to the width w of the second projection in the sagittal axis direction may be within a range of 0.42-0.55. At this time, the sound production component 11 may remain fully fit to the antihelix region, and the sound production component 11 does not cover the opening of the ear canal of the user, so that the opening of the ear canal of the user may remain fully open, thereby facilitating the user's access to the external sound. In addition, the end FE of the sound production component 11 may be closer to or lean against the inner contour of the auricle relative to the inner contour of the auricle, and the acoustic short circuit region between the end FE of the sound production component 11 and the inner contour of the auricle may be significantly reduced, thereby significantly improving the listening volume at the opening of the ear canal of the user. Furthermore, the end FE of the sound production component may be very close to the inner contour of the auricle, and the inner contour of the auricle may support the sound production component 11, which improves the wearing stability for the user. When the whole or part structure of the sound production component 11 covers the antihelix region of the user, the housing of the sound production component 11 may act as a baffle to increase a sound path difference from the sound guiding hole and the pressure relief hole to the opening of the ear canal, thereby increasing a sound intensity at the opening of the ear canal. Furthermore, in the wearing state, the sidewall of the sound production component 11 may be close to the antihelix region, and a concave-convex structure of the antihelix region may also act as a baffle, to increase a sound path of the transmission of the sound from the pressure relief hole to the opening of the ear canal, thereby increasing the sound path difference from the sound guiding hole and the pressure relief hole to the opening of the ear canal. In addition, when the whole or part of the sound production component 11 covers the antihelix region of the user, the sound production component 11 may not extend into the opening of ear canal of the user, which may ensure that the opening of ear canal remains fully open, thereby obtaining sound information in the external environment for the user, and improving the wearing comfort for the user. The specific description regarding the whole or part structure of the sound production component 11 substantially covering the antihelix region of the user may be found elsewhere in the present disclosure.

In some embodiments, in order to make the whole or part of the structure of the sound production component 11 extend into the cavity of auricular concha, as the position of the sound production component 11B relative to the ear shown in FIG. 2, the distance $h_1$ between the centroid O of the first projection and the highest point of the second projection in the vertical axis direction may be within a range of 25 mm-43 mm, and the distance $w_1$ between the centroid O of the first projection and the end point of the second projection in the sagittal axis direction may be within a range of 20 mm-32.8 mm. Correspondingly, at this time, the ratio of the distance $h_1$ between the centroid O of the first projection and the highest point of the second projection in the vertical axis direction to the height h of the second projection in the vertical axis direction may be within a range of 0.35-0.6, and the ratio of the distance $w_1$ between the centroid O of the first projection and the end point of the second projection in the sagittal axis direction to the width w of the second projection in the sagittal axis direction may be within a range of 0.4-0.65. In some embodiments, the distance $h_1$ between the centroid O of the first projection and the highest point of the second projection in the vertical axis direction may be within a range of 25 mm-39 mm, at this time, the ratio of the distance $h_1$ between the centroid O of the first projection and the highest point of the second projection in the vertical axis direction to the height h of the second projection in the vertical axis direction may be within a range of 0.35-0.55, the distance $w_1$ between the centroid O of the first projection and the end point of the second projection in the sagittal axis direction may be within a range of 22.6 mm-30.2 mm, and at this time, the ratio of the distance $w_1$ between the centroid O of the first projection and the end point of the second projection in the sagittal axis direction to the width w of the second projection in the sagittal axis direction may be within a range of 0.45-0.5. Here a larger portion of the sound production component 11 may extend into the cavity of auricular concha, and a size of a gap between the sound production component 11 and the cavity of auricular concha may be smaller, further improving the listening effect at the opening of the ear canal of the user. More preferably, the distance $h_1$ between the centroid O of the first projection and the highest point of the second projection in the vertical axis direction may be within a range of 28.5 mm-35.7 mm, at this time, the ratio of the distance $h_1$ between the centroid O of the first projection and the highest point of the second projection in the vertical axis direction to the height h of the second projection in the vertical axis direction may be within a range of 0.35-0.5, the distance $w_1$ between the centroid O of the first projection and the end point of the second projection in the sagittal axis direction may be within a range of 25 mm-28 mm, and at this time, the ratio of the distance $w_1$ between the centroid O of the first projection and the end point of the second projection in the sagittal axis direction to the width w of the second projection in the sagittal axis direction may be within a range of 0.5-0.55. Here a larger portion of the sound production component 11 may extend into the cavity of auricular concha, the end FE of the sound production component 11 may be closer to the antihelix or lean against the antihelix, and the size of the gap between the sound production component 11 and the cavity of auricular concha may be further reduced. In addition, the antihelix may support the sound production component 11 to a certain extent, thereby improving the wearing stability for the user. According to the earphone provided in the embodiments of the present disclosure, when the user wears the earphone, the ratio of the distance $h_1$ between the centroid O of the first projection and the highest point of the second projection in the vertical axis direction to the height h of the second projection in the vertical axis direction may be controlled to be within the range of 0.35-0.6, and the ratio of the distance $w_1$ between the centroid of the first projection and the end point of the second projection in the sagittal axis direction to the width w of the second projection in the sagittal axis direction may be controlled to be within the range of 0.4-0.65, so that at least part of the sound production component 11 may extend into the cavity of auricular concha, and form the acoustic model shown in FIG. 4 with the cavity of auricular concha of the user, thereby improving the listening volume of the earphone at the listening position (e.g., at the opening of the ear canal), especially the listening volume at the medium and low frequency, while maintaining a good effect of far-field sound leakage cancellation. When part or the whole of the sound production component 11 extends into the cavity of auricular concha, the sound guiding hole may be closer to the opening of the ear canal, which further increases the listening volume at the opening of the ear canal. In addition, the cavity of auricular concha may support and limit the sound production component 11 to a certain extent, thereby improving the stability of the earphone in the wearing state. It should be noted that, the position of the sound production component relative to the auricle may satisfy one or both of conditions of the distance $h_1$ between the centroid O of the first projection and the highest point of the second projection in the vertical axis direction, and the distance $w_1$ between the centroid O of the first projection and the end point of the second projection in the sagittal axis direction.

It should also be noted that an area of the first projection of the sound production component 11 on the sagittal plane may be generally much smaller than an area of a projection of the auricle on the sagittal plane, to ensure that the opening of ear canal of the user may not be blocked when the user wears the earphone 10, and the load on the user when wearing the earphone may be reduced, which is convenient for the user to carry daily. On this premise, in the wearing state, when a ratio of the distance $h_1$ between the centroid O of the projection (the first projection) of the sound production component 11 on the sagittal plane and the projection (the highest point of the second projection) of the highest point A1 of the auricle on the sagittal plane in the vertical axis direction to the height h of the second projection in the vertical axis direction is too small or too large, part of the structure of the sound production component 11 may be located above a top of the auricle or at the earlobe of the user, which may be impossible to use the auricle to sufficiently support and limit the sound production component 11, and there may be a problem that the wearing is unstable and easy to fall off. On the other hand, it may also cause the sound guiding hole disposed on the sound production component 11 to be away from the opening of the ear canal, affecting the listening volume at the opening of the ear canal of the user. In order to ensure that the earphone does not block the opening of the ear canal of the user and ensure the stability and comfort of the user wearing the earphone and a good listening effect, in some embodiments, the ratio of the distance $h_1$ between the centroid O of the first projection and the highest point A1 of the second projection in the vertical axis direction to the height h of the second projection in the vertical axis direction may be controlled to be within a range of 0.35-0.6, so that when part or the whole structure of the sound production component extends into the cavity of auricular concha, the force exerted by the cavity of auricular concha on the sound production component 11 may support and limit the sound production component 11 to a certain extent, thereby improving the wearing stability and comfort of the earphone. Meanwhile, the sound production component 11 may also form the acoustic model shown in FIG. 4 with the cavity of auricular concha, to ensure the listening volume of the user at the listening position (e.g., the opening of the ear canal) and reduce the far-field leakage volume. Preferably, the distance $h_1$ between the centroid O of the first projection and the highest point A1 of the second projection in the vertical axis direction may be within a range of 25 mm-39 mm, and then the ratio of the distance $h_1$ between the centroid O of the first projection and the highest point A1 of the second projection in the vertical axis direction to the height h of the second projection in the vertical axis direction may be within a range of 0.35-0.55. More preferably, the distance $h_1$ between the centroid O of the first projection and the highest point of the second projection in the vertical axis direction may be within a range of 28.5 mm-35.7 mm, and then the ratio of the distance $h_1$ between the centroid O of the first projection and the highest point of the second projection in the vertical axis direction to the height h of the second projection in the vertical axis direction may be controlled to be within a range of 0.4-0.5.

Similarly, when the ratio of the distance $w_1$ between the centroid O of the first projection and the end point of the second projection in the sagittal axis direction to the width w of the second projection in the sagittal axis direction is too large or too small, the part of whole structure of the sound production component 11 may be located in a facial region on the front side of the ear, or extend out of the outer contour of the auricle, which may also cause the problem that the sound production component 11 cannot construct the acoustic model in FIG. 4 with the cavity of auricular concha, and also lead to unstable wearing of the earphone 10. According to the earphone provided in the embodiments of the present disclosure, the distance $w_1$ between the centroid O of the first projection and the end point of the second projection in the sagittal axis direction may be controlled to be within a range of 20 mm-32.8 mm, and the ratio of the distance $w_1$ between the centroid O of the first projection and the end point of the second projection in the sagittal axis direction to the width w of the second projection in the sagittal axis direction may be controlled to be within a range of 0.4-0.7, thereby improving the wearing stability and comfort of the earphone while ensuring the acoustic output effect of the sound production component. Preferably, the distance $w_1$ between the centroid O of the first projection and the end point of the second projection in the sagittal axis direction may be within a range of 22.6 mm-30.2 mm, and then the ratio of the distance $w_1$ between the centroid O of the first projection and the end point of the second projection in the sagittal axis direction to the width w of the second projection in the sagittal axis direction may be within a range of 0.45-0.6. More preferably, the distance $w_1$ between the centroid O of the first projection and the end point of the second projection in the sagittal axis direction may be within a range of 25 mm-28 mm, and then the ratio of the distance $w_1$ between the centroid O of the first projection and the end point of the second projection in the sagittal axis direction to the width w of the second projection in the sagittal axis direction may be within a range of 0.5-0.0.55. The technical effects regarding the distance $h_1$ between the centroid O of the first projection and the highest point of the second projection in the vertical axis direction, and the distance $w_1$ between the centroid O of the first projection and the end point of the second projection in the sagittal axis direction are mentioned in the foregoing description of the present disclosure, which are not repeated here.

Figure 6:
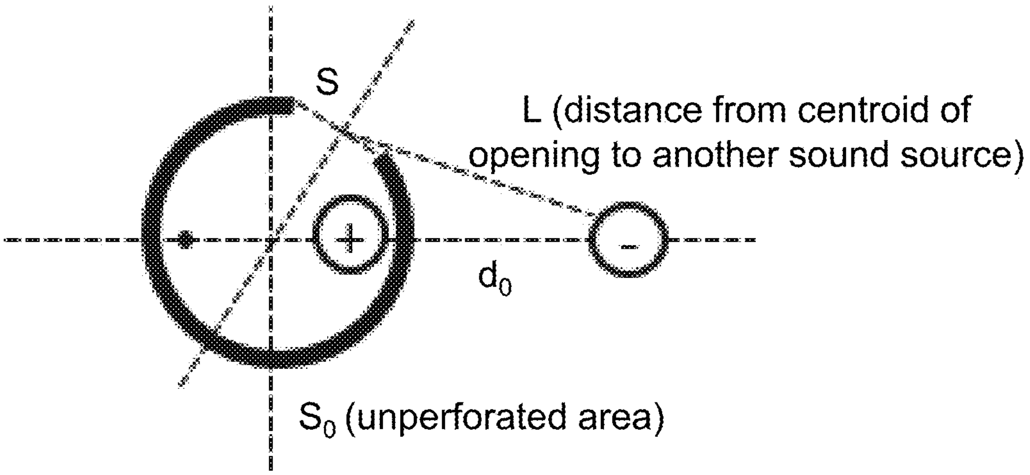
FIG. 6 is a schematic diagram illustrating a cavity-like structure according to some embodiments of the present disclosure.
Figure 7:
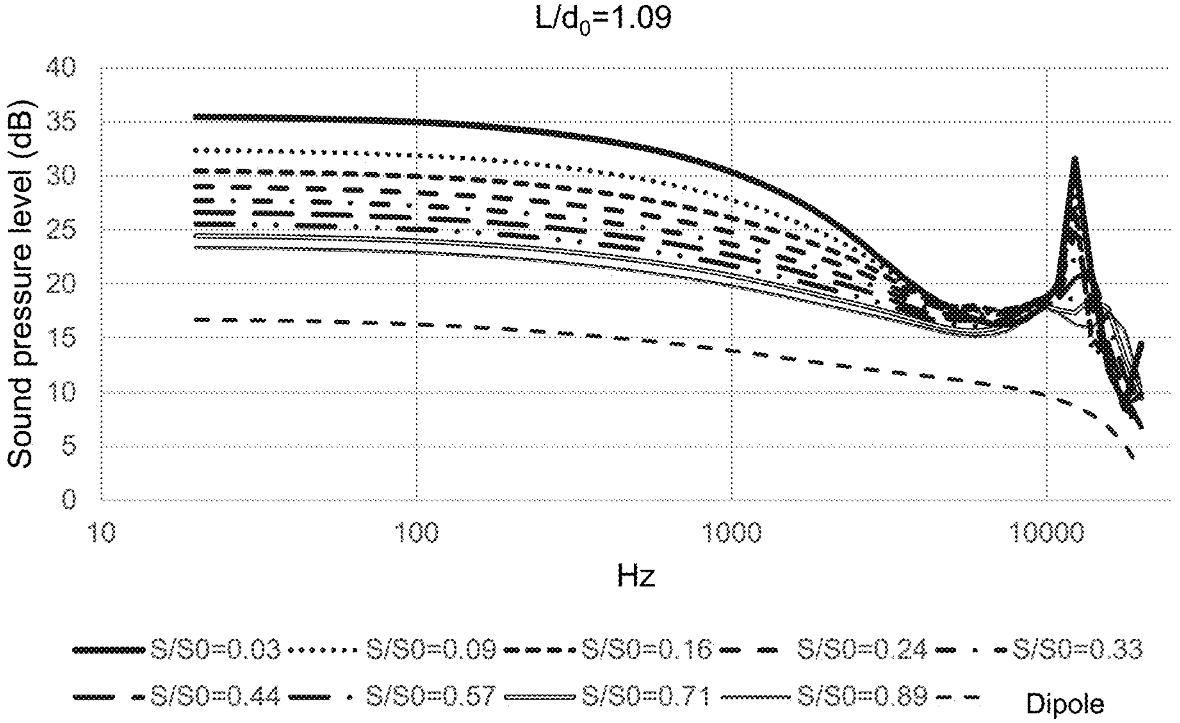
FIG. 7 is a diagram illustrating sound index curves of cavity-like structures including leakage structures with different sizes according to some embodiments of the present disclosure.

As mentioned above, when the user wears the earphone 10, at least part of the sound production component 11 may extend into the cavity of auricular concha of the user to form the acoustic model in FIG. 4. The outer wall surface of the housing of the sound production component 11 may usually be the plane or the curved surface, and the contour of the cavity of auricular concha of the user may be an uneven structure. When the part of whole structure of the sound production component 11 extends into the cavity of auricular concha, a gap may be formed as the sound production component 11 cannot be closely fit with the cavity of auricular concha. The gap may correspond to the leakage structure 403 in FIG. 4. FIG. 6 is a schematic diagram illustrating a quasi-cavity structure according to some embodiments of the present disclosure. FIG. 7 is a diagram illustrating sound index curves of cavity-like structures including leakage structures with different sizes according to some embodiments of the present disclosure. As shown in FIG. 6, an opening area of the leakage structure on the quasi-cavity structure may be represented as S, and an area of the quasi-cavity structure directly affected by a contained sound source (e.g., "+" shown in FIG. 6) may be represented as S0. The "directly affected" here means that sound emitted by the contained sound source may directly acoustically act on a wall of the quasi-cavity structure without passing through the leakage structure. A distance between two sound sources is d0, and a distance from a center of an opening shape of the leakage structure to another sound source (e.g., "–" in FIG. 6) is L. As shown in FIG. 7, keeping L/d0=1.09 constant, the larger the relative opening size S/S0, the smaller the listening index. This is because the larger the relative opening, the more sound components that the contained sound source radiates directly outward, and the less sound reaching the listening position, causing the listening volume to decrease with the increase of the relative opening, which in turn leads the decrease of the listening index. It may be inferred that the larger the opening, the lower the listening volume at the listening position.

In some embodiments, considering that a relative position of the sound production component 11 and the ear canal of the user (e.g., the cavity of auricular concha) may affect a size of the gap formed between the sound production component 11 and the cavity of auricular concha, e.g., when the end FE of the sound production component 11 abuts against the cavity of auricular concha, the size of the gap may be relatively small, and when the end FE of the sound production component 11 does not abut against the cavity of auricular concha, the size of the gap may be relatively large. The gap formed between the sound production component 11 and the cavity of auricular concha may be referred to as the leakage structure in the acoustic model in FIG. 4. The relative position of the sound production component 11 and the ear canal of the user (e.g., the cavity of auricular concha) may affect a count of the leakage structure of the quasi-cavity structure formed by the sound production component 11 and the cavity of auricular concha and the opening size of the leakage structure, and the opening size of the leakage structure may directly affect the listening quality. Specifically, the larger the opening of the leakage structure, the more sound components that the sound production component 11 radiate directly outward, and the less sound reaching the listening position. Accordingly, in order to consider the listening volume of the sound production component 11 and the sound leakage reduction effect to ensure the acoustic output quality of the sound production component 11, the sound production component 11 may be fit as closely as possible to the cavity of auricular concha of the user. Correspondingly, the distance $h_1$ between the centroid O of the first projection and the highest point of the second projection in the vertical axis direction may be controlled to be within a range of 25 mm-43 mm, and then the ratio of the distance $h_1$ between the centroid O of the first projection and the highest point of the second projection in the vertical axis direction to the height h of the second projection in the vertical axis direction may be controlled to be within a range of 0.35-0.6, while distance $w_1$ between the centroid O of the first projection and the end point of the second projection in the sagittal axis direction may be controlled to be within a range of 20 mm-32.8 mm, and the ratio of the distance $w_1$ between the centroid O of the first projection and the end point of the second projection in the sagittal axis direction to the width w of the second projection in the sagittal axis direction may be controlled to be within a range of 0.4-0.65. Preferably, in some embodiments, in order to improve the wearing comfort of the earphone while ensuring the acoustic output quality of the sound production component 11, the distance $h_1$ between the centroid O of the first projection and the highest point of the second projection in the vertical axis direction may be within a range of 25 mm-39 mm, and then the ratio of the distance $h_1$ between the centroid O of the first projection and the highest point of the second projection in the vertical axis direction to the height h of the second projection in the vertical axis direction may be within a range of 0.35-0.55, while the distance $w_1$ between the centroid O of the first projection and the end point of the second projection in the sagittal axis direction may be within a range of 22.6 mm-30.2 mm, and the ratio of the distance $w_1$ between the centroid O of the first projection and the end point of the second projection in the sagittal axis direction to the width w of the second projection in the sagittal axis direction may be within a range of 0.45-0.5. More preferably, the distance $h_1$ between the centroid O of the first projection and the highest point of the second projection in the vertical axis direction may be within a range of 28.5 mm-35.7 mm, and then the ratio of the distance $h_1$ between the centroid O of the first projection and the highest point of the second projection in the vertical axis direction to the height h of the second projection in the vertical axis direction may be within a range of 0.35-0.5, while the distance $w_1$ between the centroid O of the first projection and the end point of the second projection in the sagittal axis direction may be within a range of 25 mm-28 mm, and then the ratio of the distance $w_1$ between the centroid O of the first projection and the end point of the second projection in the sagittal axis direction to the width w of the second projection in the sagittal axis direction may be within a range of 0.5-0.55. The technical effects regarding the distance $h_1$ between the centroid O of the first projection and the highest point of the second projection in the vertical axis direction, and the distance $w_1$ between the centroid O of the first projection and the end point of the second projection in the sagittal axis direction are mentioned in the foregoing description of the present disclosure, which are not repeated here.

In some embodiments, considering that there may be certain differences in the shape and size of the ears of different users, the ratio may fluctuate within a certain range. For example, when the earlobe of the user is long, the height h of the second projection in the vertical axis direction may be larger than that of a general situation. At this time, when the user wears the earphone 10, the ratio of the distance $h_1$ between the centroid O of the first projection and the highest point of the second projection in the vertical axis direction to the height h of the second projection in the vertical axis direction may be smaller, e.g., which may be within a range of 0.2-0.55. Similarly, in some embodiments, when the helix of the user is bent forward, the width w of the second projection in the sagittal axis direction be smaller than that of the general situation, and the distance $w_1$ between the centroid O of the first projection and the end point of the second projection in the sagittal axis direction may also be relatively small. At this time, when the user wears the earphone 10, the ratio of the distance $w_1$ between the centroid O of the first projection and the end point of the second projection in the sagittal axis direction to the width w of the second projection in the sagittal axis direction may be larger, e.g., which may be within a range of 0.4-0.75.

The ears of different users are different. For example, some users have longer earlobes. At this time, it may have an effect if the earphone 10 is defined using the ratio of the distance between the centroid O of the first projection and the highest point of the second projection to the height of the second projection on the vertical axis. As shown in FIG. 5B, a highest point A3 and a lowest point A4 of a connection region between the auricle of the user and the head of the user may be selected for illustration. The highest point of the connection part between the auricle and the head may be understood as a position where a projection of the connection region of the auricle and the head on the sagittal plane has a greatest distance from a projection of a specific point on the neck on the sagittal plane. The lowest point of the connection part between the auricle and the head may be understood as a position where the projection of the connection region of the auricle and the head on the sagittal plane has a smallest distance from a projection of a specific point on the neck on the sagittal plane. In order to consider the listening volume of the sound production component 11 and the sound leakage reduction effect to ensure the acoustic output quality of the sound production component 11, the sound production component 11 may be fit as closely as possible to the cavity of auricular concha of the user. Correspondingly, a ratio of a distance $h_3$ between the centroid O of the first projection and a highest point of a projection of the connection region of the auricle and the head on the sagittal plane in the vertical axis direction to a height $h_2$ between a highest point and a lowest point of the projection of the connection region of the auricle and the head on the sagittal plane in the vertical axis direction may be controlled to be within a range of 0.4-0.65. Meanwhile, the ratio of the distance $w_1$ between the centroid O of the first projection and the end point of the second projection in the sagittal axis direction to the width w of the second projection in the sagittal axis direction may be controlled to be within a range of 0.4-0.65. Preferably, in some embodiments, in order to improve the wearing comfort of the earphone while ensuring the acoustic output quality of the sound production component 11, the ratio of the distance $h_3$ between the centroid O of the first projection and the highest point of the projection of the connection region of the auricle and the head on the sagittal plane in the vertical axis direction to the height $h_2$ between the highest point and the lowest point of the projection of the connection region of the auricle and the head on the sagittal plane in the vertical axis direction may be controlled to be within a range of 0.45-0.6, and the ratio of the distance $w_1$ between the centroid O of the first projection and the end point of the second projection in the sagittal axis direction to the width w of the second projection in the sagittal axis direction may be within a range of 0.45-0.68. More preferably, the ratio of the distance $h_3$ between the centroid O of the first projection and the highest point of the projection of the connection region of the auricle and the head on the sagittal plane in the vertical axis direction to the height $h_2$ between the highest point and the lowest point of the projection of the connection region of the auricle and the head on the sagittal plane in the vertical axis direction may be within a range of 0.5-0.6, and the ratio of the distance $w_1$ between the centroid O of the first projection and the end point of the second projection in the sagittal axis direction to the width w of the second projection in the sagittal axis direction may be within a range of 0.48-0.6.

Referring to FIG. 6 and descriptions thereof, the larger the opening of the leakage structure in the cavity-like structure, the smaller the listening volume at the listening position. In some embodiments, in order to ensure the listening volume at the opening of the ear canal when the user wears the earphone, an overlap part between the area of the first projection of the sound production component 11 on the sagittal plane and the area of the projection of the cavity of auricular concha on the sagittal plane may be controlled to be within a relatively large range, i.e., a larger portion of the sound production component 11 may extend into the cavity of auricular concha to reduce the size of the gap between the sound production component 11 and the cavity of auricular concha, thereby improving the listening effect at the opening of the ear canal of the user. An extent to which the sound production component 11 extends into the cavity of auricular concha may be represented by a ratio of the overlap part between the area of the first projection and the area of the projection of the cavity of auricular concha on the sagittal plane to the area of the first projection. For example, the larger the ratio, the larger the portion of the sound production component 11 extending into the cavity of auricular concha. Considering that when a larger portion of the sound production component 11 extends into the cavity of auricular concha, the sound production component 11 may block the opening of the ear canal, and the opening of the ear canal of the user may not remain fully open, affecting user's access to sound information in the external environment. Accordingly, in order to ensure that the opening of the ear canal of the user remains fully open to obtain the sound information in the external environment while improving the hearing effect at the opening of the ear canal of the user, in some embodiments, the ratio of the overlap part between the area of the first projection and the area of the projection of the cavity of auricular concha on the sagittal plane to the area of the first projection may be within a range of 0.25-0.8. Considering that the ratio of the overlap part between the area of the first projection and the area of the projection of the cavity of auricular concha on the sagittal plane to the area of the first projection may be relatively large, a portion of the opening of the ear canal of the user may be covered, which affects an opening degree of the opening of the ear canal, and in turn affects the user's access to the sound information in the external environment, the ratio of the overlap part between the area of the first projection and the area of the projection of the cavity of auricular concha on the sagittal plane to the area of the first projection may be relatively small, and the size of the gap between the sound production component 11 and the cavity of auricular concha may be relatively large. More preferably, the ratio of the overlap part between the area of the first projection and the area of the projection of the cavity of auricular concha on the sagittal plane to the area of the first projection may be within a range of 0.4-0.7. Here, by adjusting the ratio of the overlap part between the area of the first projection and the area of the projection of the cavity of auricular concha on the sagittal plane to the area of the first projection, the size of the gap between the sound production component 11 and the cavity of auricular concha may be as small as possible on the premise of ensuring that the opening degree of the opening of the ear canal is large, thereby ensuring the listening effect at the opening of the ear canal of the user. Accordingly, more preferably, the ratio of the overlap part between the area of the first projection and the area of the projection of the cavity of auricular concha on the sagittal plane to the area of the first projection may be within a range of 0.45-0.65. By setting the ratio of the overlap part between the area of the first projection and the area of the projection of the cavity of auricular concha on the sagittal plane to the area of the first projection in a more suitable range, the overall comprehensive performance of the earphone may be improved while considering the opening degree of the opening of the ear canal and the size of the gap between the sound production 11 and the cavity of auricular concha. It should be noted that in the embodiments of the present disclosure, the cavity of auricular concha refers to a concave fossa region below the crus of the helix. That is to say, an edge of the cavity of auricular concha includes at least a sidewall below the crus of the helix, a contour of the tragus, an intertragic notch, an antitragus tip, a notch between an antitragus and the antihelix, and a contour of an antihelix body corresponding to the cavity of auricular concha. The projection of the cavity of auricular concha on the sagittal plane refers to a projection of the edge of the cavity of the cavity of auricular concha on the sagittal plane. In addition, sizes and contour shapes of cavities of auricular concha may vary from user to user (e.g., by age, gender, height, and weight), and areas of projections of the cavities of the auricular concha on the sagittal plane may be within a certain range (e.g., 320 $mm^2$-410 $mm^2$).

In some embodiments, the extent to which the sound production component extends into the cavity of auricular concha may also be reflected by controlling a ratio of the overlap part between the area of the first projection and the area of the projection of the cavity of auricular concha on the sagittal plane to the area of the projection of the cavity of auricular concha on the sagittal plane. The ratio of the overlap part between the area of the first projection and the area of the projection of the cavity of auricular concha on the sagittal plane to the area of the projection of the cavity of auricular concha on the sagittal plane may be controlled to be within a certain range to reduce the size of the gap, which is specifically described FIG. 8.

Figure 8:
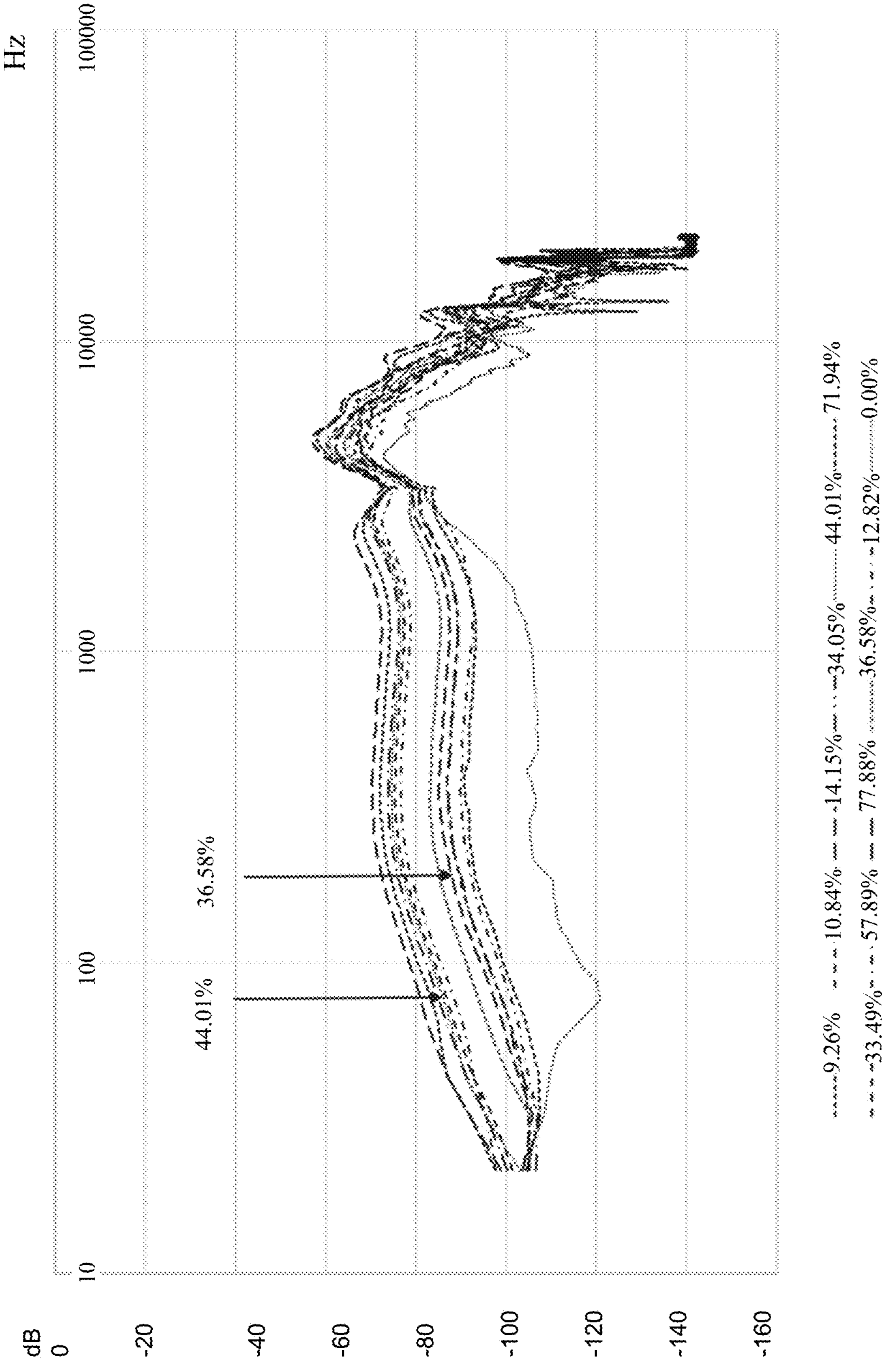
FIG. 8 is a diagram illustrating exemplary frequency response curves corresponding to different overlap ratios each of which is a ratio of a projection area of a first projection to a projection area of a cavity of an auricular concha of a user on a sagittal plane according to some embodiments of the present disclosure.

FIG. 8 is a diagram illustrating exemplary frequency response curves corresponding to different overlap ratios each of which is a ratio of a projection area of a first projection to a projection area of a cavity of an auricular concha of a user on a sagittal plane according to some embodiments of the present disclosure. As shown in FIG. 8, an abscissa may represent a frequency (unit: Hz), and an ordinate may represent a frequency response (unit: dB) at the opening of the ear canal corresponding to different overlap ratios. As shown in FIG. 8, when the user wears the earphone, at least part of the structure of the sound production component 11 covers the cavity of auricular concha, i.e., the first projection of the sound production component 11 on the sagittal plane has an overlap region with the projection of the cavity of auricular concha on the sagittal plane, the sound volume at the opening of the ear canal of the user may be increased significantly compared with a condition that the first projection does not have the overlap region (an overlap ratio is 0%) with the projection of the cavity of auricular concha on the sagittal plane, especially within a medium and low frequency range. In some embodiments, to improve the listening effect when the user wears the earphone, an overlap ratio of the area of the first projection of the sound production component 11 on the sagittal plane to the area of the projection of the cavity of auricular concha of the user on the sagittal plane may be not less than 9.26%. As shown in FIG. 8, with an increasing of the overlap ratio of the area of the first projection of the sound production component 11 on the sagittal plane to the area of the projection of the cavity of auricular concha of the user on the sagittal plane, an improvement of the listening volume at the opening of the ear canal of the user may be stronger, especially when the overlap ratio of the area of the first projection to the area of the projection of the cavity of auricular concha of the user on the sagittal plane is increased from 36.58% to 44.01%, the listening effect may be improved significantly. Accordingly, to further improve the listening effect of the user, the overlap ratio of the area of the first projection to the area of the projection of the cavity of auricular concha of the user on the sagittal plane may be not less than 44.01%. Preferably, the overlap ratio of the area of the first projection to the area of the projection of the cavity of auricular concha of the user on the sagittal plane may be not less than 57.89%. It should be noted that, a frequency response curve obtained through the measurement in the embodiments of the present disclosure corresponding to the overlap ratio of the area of the first projection to the area of the projection of the cavity of auricular concha of the user on the sagittal plane may be obtained through the measurement of changing a wearing position (e.g., translating along the sagittal axis direction or the vertical axis direction) of the sound production component based on a certain wearing angle (e.g., an angle between an upper sidewall or a lower sidewall and the horizontal direction) of the sound production component and a certain size of the sound production component.

For the earphone provided by the embodiments of the present disclosure, the sound production component 11 may be well fit with the cavity of auricular concha of the user to form the acoustic model shown in FIG. 4 through the at least part of the sound production component 11 extending into the cavity of auricular concha and controlling the overlap ratio of the area of the first projection on the sagittal plane to the area of the projection of the cavity of auricular concha of the user on the sagittal plane to be not less than 44.01%, thereby increasing the listening volume at the listening location (e.g., the opening of the ear canal) of the earphone, especially the listening volume at the medium and low frequency.

It should also be noted that to ensure that the opening of the ear canal of the user is not blocked when the user wears the earphone 10 and to keep an open state of the opening of the ear canal, so that the user may receive the sound from the outside environment while receiving the sound output by the earphone 10, the overlap ratio of the area of the first projection of the sound production component 11 on the sagittal plane to the area of the projection of the cavity of auricular concha on the sagittal plane should not be too large. In the wearing state, when the overlap ratio of the area of the first projection of the sound production component 11 on the sagittal plane to the area of the projection of the cavity of auricular concha of the user on the sagittal plane is too small, a size of the sound production component 11 extending into the cavity of auricular concha may be too small, and a fit area between the sound production component 11 and the cavity of auricular concha may also be small, which may be impossible to use the cavity of auricular concha to sufficiently support and limit the sound production component 11, and in turn leads to a problem that the earphone 10 may fall off easily due to unstable wearing. On the other hand, the size of the gap between the sound production component 11 and the cavity of auricular concha may be too large, affecting the listening volume at the opening of the ear canal of the user. In order to ensure the wearing stability and comfort and a good listening effect when the user wears the earphone on the premise of ensuring that the earphone does not block the opening of the ear canal of the user, in some embodiments, the overlap ratio of the area of the first projection of the sound production component 11 on the sagittal plane to the area of the projection of the cavity of auricular concha on the sagittal plane may be within a range of 44.01%-77.88%, so that when the whole or part of the structure of the sound production component 11 extends into the cavity of auricular concha, the force exerted by the cavity of auricular concha on the sound production component 11 may support and limit the sound production component 11 to a certain extent, thereby improving the wearing stability and comfort of the earphone. Meanwhile, the sound production component 11 may also form the acoustic model shown in FIG. 4 with the cavity of auricular concha, to ensure the listening volume of the user at the listening position (e.g., the opening of the ear canal) and reduce the far-field leakage volume. Preferably, the overlap ratio of the area of the first projection of the sound production component 11 on the sagittal plane to the area of the projection of the cavity of auricular concha of the user on the sagittal plane may be within a range of 46%-71.94%. More preferably, the overlap ratio of the area of the first projection of the sound production component 11 on the sagittal plane to the area of the projection of the cavity of auricular concha of the user on the sagittal plane may be within a range of 48%-65%. Further preferably, the overlap ratio of the area of the first projection of the sound production component 11 on the sagittal plane to the area of the projection of the cavity of auricular concha of the user on the sagittal plane may be within a range of 57.89%-62%.

As shown in FIG. 5A, a shape of the first projection of the sound production component 11 on the sagittal plane may include the long axis direction Y and the short axis direction Z. In some embodiments, considering that when the size of the sound production component 11 along the long axis direction Y and the short axis direction Z is too small, a volume of the sound production component 11 may be relatively small, and an area of a diaphragm arranged in the sound production component 11 may also be relatively small, which causes a low efficiency of generating the sound by driving the air in the housing of the sound production component 11 through the diaphragm, thereby affecting the acoustic output effect of the earphone. In addition, when the size of the sound production component 11 in the long axis direction Y is too large, the sound production component 11 may exceed a range of the cavity of auricular concha, which is not able to extend into the cavity of auricular concha and form the cavity-like structure; or the size of the gap formed between the sound production component 11 and the cavity of auricular concha may be too large, which affects the listening volume at the opening of the ear canal when the user wears the earphone 10 and the far-field sound leakage effect. When the size of the sound production component 11 in the short axis direction Z is too large, the sound production component 11 may cover the opening of the ear canal of the user, affecting the user' access to the sound information in the external environment. In some embodiments, to ensure a good acoustic output quality when the user wears the earphone 10, a size of the shape of the first projection along the long axis direction Y may be within a range of 12 mm-32 mm. Preferably, the size of the shape of the first projection along the long axis direction Y may be within a range of 18 mm-29 mm. More preferably, the size of the shape of the first projection along the long axis direction Y may be within a range of 20 mm-27 mm. More preferably, the size of the shape of the first projection along the long axis direction Y may be within a range of 22 mm-25 mm. Correspondingly, a size of the shape of the first projection along the short axis direction Z may be within a range of 4.5 mm-18 mm. Preferably, the size of the shape of the first projection along the short axis direction Z may be within a range of 10 mm-15 mm. More preferably, the size of the shape of the first projection along the short axis direction Z may be within a range of 11 mm-13.5 mm. Further preferably, the size of the shape of the first projection along the short axis direction Z may be within a range of 12 mm-13 mm. To further illustrate the effect of the shape of the first projection of the sound production component 11 on the sagittal plane on the listening effect when the user wears the earphone, the following may be an exemplary illustration of a ratio of the size of the shape of the first projection of the sound production component 11 on the sagittal plane along the long axis direction Y to the size of the shape of the first projection of the sound production component 11 on the sagittal plane along the short axis direction Z.

Figure 9:
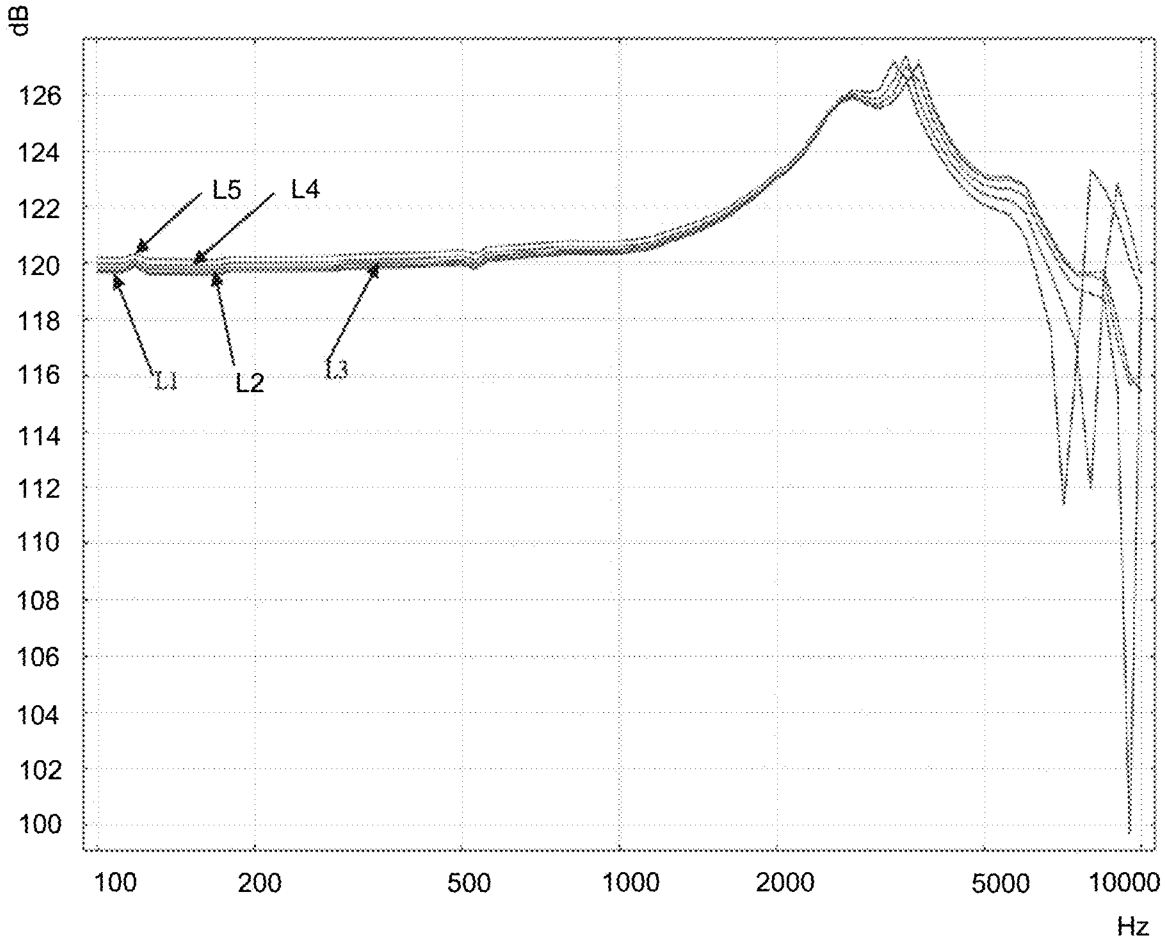
FIG. 9 is a diagram illustrating exemplary frequency response curves corresponding to different ratios each of which is a ratio of a size of a first projection in a long axis direction to a size of a first projection in a short axis direction according to some embodiments of the present disclosure.

FIG. 9 is a diagram illustrating exemplary frequency response curves corresponding to different ratios each of which is a ratio of a size of a first projection along a long axis direction Y to a size of a first projection along a short axis direction Z when an area of a first projection of the sound production component 11 on a sagittal plane is a certain value (e.g., 119 $mm^2$). As shown in FIG. 9, an abscissa may represent a frequency (unit: Hz), and an ordinate may represent a total sound pressure level (unit: dB) corresponding to different ratios of the size of the first projection of the sound production component 11 on the sagittal plane along the long axis direction Y to the size of the first projection along the short axis direction Z. For ease of distinguishing different frequency response curves, frequency response curves shown in FIG. 9 from the top to the bottom may correspond to L5, L4, L3, L2, and L1, respectively, within a range of 100 Hz-1000 Hz. L1 refers to frequency response curve when a ratio of the size of the first projection along the long axis direction Y to the size of the first projection along the short axis direction Z is 4.99 (i.e., the size of the first projection along the long axis direction Y is 24.93 mm, and the size of the first projection along the short axis direction Z is 4.99 mm). L2 refers to a frequency response curve when the ratio of the size of the first projection along the long axis direction Y to the size of the first projection along the short axis direction Z is 3.99 (i.e., the size of the first projection along the long axis direction Y is 22.43 mm, and the size of the first projection along the short axis direction Z is 5.61 mm). L3 refers to a frequency response curve when the ratio of the size of the first projection along the long axis direction Y to the size of the first projection along the short axis direction Z is 3.04 (i.e., the size of the first projection along the long axis direction Y is 19.61 mm, and the size of the first projection along the short axis direction Z is 6.54 mm). L4 refers to a frequency response curve when the ratio of the size of the first projection along the long axis direction Y to the size of the first projection along the short axis direction Z is substantially 2.0 (i.e., the size of the first projection along the long axis direction Y is 16.33 mm, and the size of the first projection along the short axis direction Z is 8.16 mm). L5 refers to a frequency response curve when the ratio of the size of the first projection along the long axis direction Y to the size of the first projection along the short axis direction Z is 1.0 (i.e., the size of the first projection along the long axis direction Y is 12.31 mm, and the size of the first projection along the short axis direction Z is 12.31 mm). As shown in FIG. 9, resonance frequencies corresponding to the frequency response curves L1-L5 may be substantially the same (about 3500 Hz). However, when the ratio of the size of the first projection along the long axis direction Y to the size of the first projection along the short axis direction Z is within a range of 1.0-3.0, the frequency response curve of the sound production component 11 may be generally smooth, and the frequency response may be good within a range of 100 Hz-3500 Hz. When the frequency is 5000 Hz, the greater the ratio of the size of the first projection along the long axis direction Y to the size of the first projection along the short axis direction Z, the faster the sound frequency response of the sound production component 11 decreases at the opening of the ear canal. Accordingly, in some embodiments, to ensure a good acoustic output effect when the user wears the earphone, the ratio of the size of the first projection of the sound production component 11 on the sagittal plane along the long axis direction Y to the size of the first projection of the sound production component 11 on the sagittal plane along the short axis direction Z may be within a range of 1.0-3.0. In some embodiments, considering that the area of the first projection is a certain value, the smaller the ratio of the size of the first projection of the sound production component 11 on the sagittal plane along the long axis direction Y to the size of the first projection of the sound production component 11 on the sagittal plane along the short axis direction Z, the larger the size of the first projection of the sound production component 11 on the sagittal plane along the short axis direction Z. When the size of the first projection of the sound production component 11 on the sagittal plane along the short axis direction Z is too large, the sound production component 11 may be unable to well extend into the cavity of auricular concha of the user, thereby causing the problem of wearing stability and comfort. Accordingly, in order to ensure the wearing stability and comfort, the ratio of the size of the first projection of the sound production component 11 on the sagittal plane along the long axis direction Y to the size of the first projection of the sound production component 11 on the sagittal plane along the short axis direction Z may be within a range of 1.4-2.5. Preferably, the ratio of the size of the first projection of the sound production component 11 on the sagittal plane along the long axis direction Y to the size of the first projection of the sound production component 11 on the sagittal plane along the short axis direction Z may be within a range of 1.4-2.3. More preferably, the ratio of the size of the first projection of the sound production component 11 on the sagittal plane along the long axis direction Y to the size of the first projection of the sound production component 11 on the sagittal plane along the short axis direction Z may be within a range of 1.45-2.0. It should be understood that, when the sound production component 11 includes different length-width ratios, an overlap ratio of the first projection of the sound production component 11 on the sagittal plane to the projection of the cavity of auricular concha on the sagittal plane may be different. In some embodiments, by controlling the ratio of the size of the first projection of the sound production component 11 on the sagittal plane along the long axis direction Y to the size of the first projection of the sound production component 11 on the sagittal plane along the short axis direction Z to be within a range of 1.4-3, the area of the projection of the sound production component 11 on the sagittal plane in a normal wearing state may be relatively moderate, which not only avoiding a relatively large size of the gap formed between the sound production component 11 and the cavity of auricular concha caused by a too small projection area of the sound production component 11 on the sagittal plane, causing a relatively low listening volume at the opening of the ear canal of the user, but also avoiding the impossibility of remaining the opening of the ear canal of the user in the open state caused by a too large projection area of the sound production component 11 on the sagittal plane, affecting the user's access to the sound from the external environment, thereby bringing a good acoustic experience to the user.

It should be noted that, the frequency response curves obtained through the measurement shown in FIG. 9 may be obtained through a simulation experiment. An auditory system of the human body may be simulated through a P.574.3 type of a full-band human ear simulation model, and a human auricle may be simulated through an auricle defined based on an ITU-TP.57 standard. The auricle of the ITU-TP.57 standard may include a geometric shape of the ear canal. In addition, the frequency response curves corresponding to different sizes of the long axis direction and different sizes of the short axis direction obtained through the measurement in the embodiments of the present disclosure may be obtained through the measurement by changing the different sizes along the long axis direction and the different sizes along the short axis direction based on a certain wearing angle (the angle between the upper sidewall or the lower sidewall and the horizontal direction) and wearing position of the sound production component.

In some embodiments, a size of the sound production component 11 along the thickness direction X may also affect the listening effect when the user wears the earphone. A further illustration may be provided below combined with FIG. 10.

Figure 10:
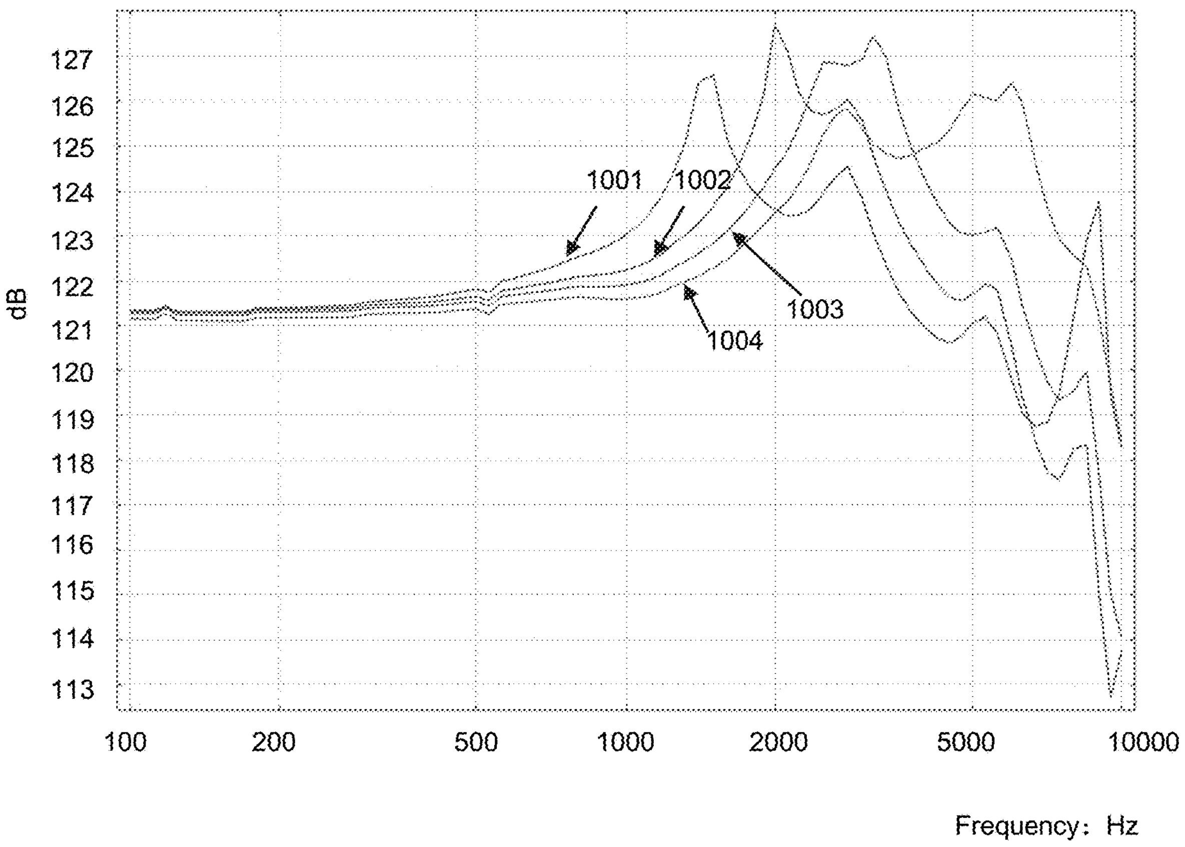
FIG. 10 is a diagram illustrating exemplary frequency response curves corresponding to different sizes of a sound production component in a thickness direction according to some embodiments of the present disclosure.

FIG. 10 is a diagram illustrating exemplary frequency response curves corresponding to different sizes of a sound production component along the thickness direction X when an area of a first projection of the sound production component 11 on a sagittal plane is a certain value and a ratio of a size of the first projection along the long axis direction Y to a size of projection of the sound production component 11 on the sagittal plane along the short axis direction Z is a certain value. As shown in FIG. 10, an abscissa may represent a frequency (unit: Hz), and an ordinate may represent a sound pressure level (unit: dB) corresponding to different frequencies at the opening of the ear canal. A frequency response curve 1001 refers to a frequency response curve when a size of the sound production component 11 along the thickness direction X is 20 mm. A frequency response curve 1002 refers to a frequency response curve when the size of the sound production component 11 along the thickness direction X is 10 mm. A frequency response curve 1003 refers to a frequency response curve when the size of the sound production component 11 along the thickness direction X is 5 mm. A frequency response curve 1004 refers to a frequency response curve when the size of the sound production component 11 along the thickness direction X is 1 mm. The size (also referred to as a thickness) of the sound production component 11 along the thickness direction X may be proportional to a size of a front cavity of the sound production component 11 along the thickness direction X. The smaller the size of the front cavity along the thickness direction X, the greater the resonance frequency corresponding to a resonant peak of the front cavity, and the frequency response curve within a lower frequency range (100 Hz-1000 Hz) may be smoother. In some embodiments, a sound guiding hole may be acoustically coupled with the front cavity, and sound in the front cavity may be transmitted to the opening of the ear canal of the user through the sound guiding hole and received by the auditory system of the user. If the size of the sound production component 11 along the thickness direction X is too large, and the resonance frequency corresponding to the resonant peak of the front cavity corresponding to the sound production component 11 is too small, the acoustic performance of the sound production component 11 in the lower frequency band may be affected. In addition, in the wearing state, when an overall size or weight of the sound production component 11 is relatively large, the wearing stability and comfort may be affected. When the size of the sound production component 11 along the thickness direction X is too small, a space of the front cavity and a rear cavity of the sound production component 11 may be limited, affecting a vibration amplitude of the diaphragm, thereby limiting the output of the sound production component 11 at a low frequency and a large vibration amplitude. Accordingly, to ensure a good acoustic output effect and the wearing stability of the sound production component 11, in some embodiments, the thickness (the size of the sound production component 11 along the thickness direction) of the sound production component 11 may be within a range of 2 mm-20 mm. Preferably, the thickness of the sound production component 11 may be within a range of 5 mm-15 mm. More preferably, the thickness of the sound production component 11 may be within a range of 8 mm-12 mm. It should be noted that, in the wearing state, when at least one wall surface of two sidewalls (i.e., an inner side facing an outer side of the ear of the user and an outer side deviated from the outer side of the ear of the user) of the sound production component 11 oppositely arranged along the thickness direction X is a non-planar surface, the thickness of the sound production component 11 may be a maximum distance between the inner side and the outer side along the thickness direction X.

It should be noted that, the frequency response curves corresponding to different thicknesses obtained through the measurement in the embodiments of the present disclosure may be obtained through the measurement by changing the size of the sound production component along the thickness direction based on a certain wearing angle (an angle between the upper sidewall or the lower sidewall and the horizontal direction), a wearing position, a certain size along the long axis direction, and a certain size along the short axis direction.

Figure 11A:
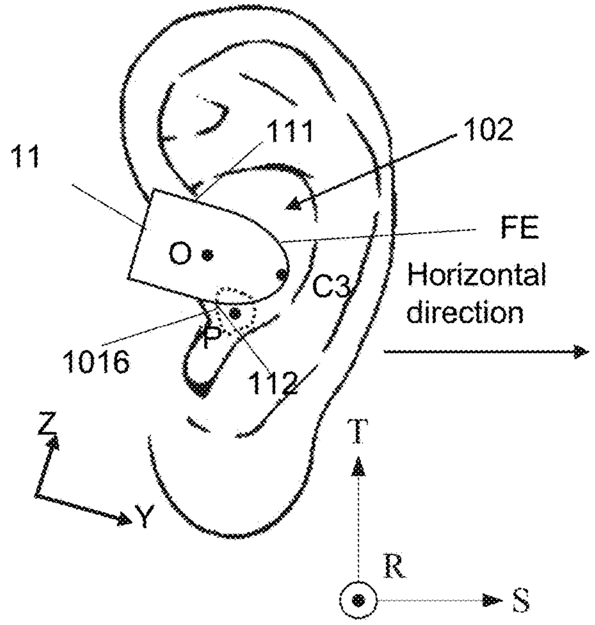
FIG. 11A is a schematic diagram illustrating an exemplary fitting position between an earphone and an ear canal of a user according to some embodiments of the present disclosure.
Figure 11B:
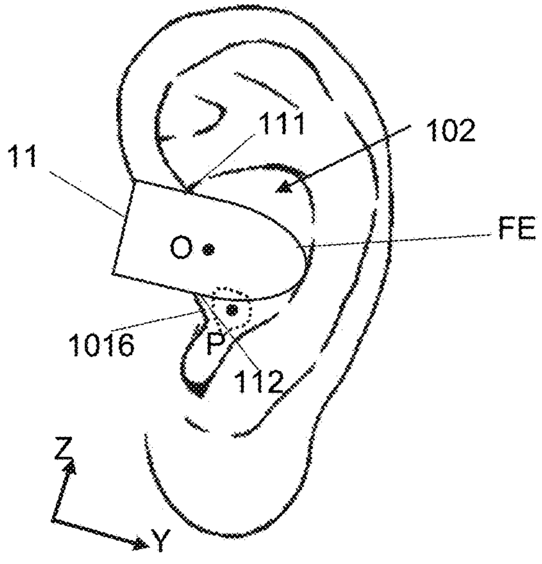
FIG. 11B is a schematic diagram illustrating an exemplary fitting position between an earphone and an ear canal of a user according to some embodiments of the present disclosure.
Figure 11C:
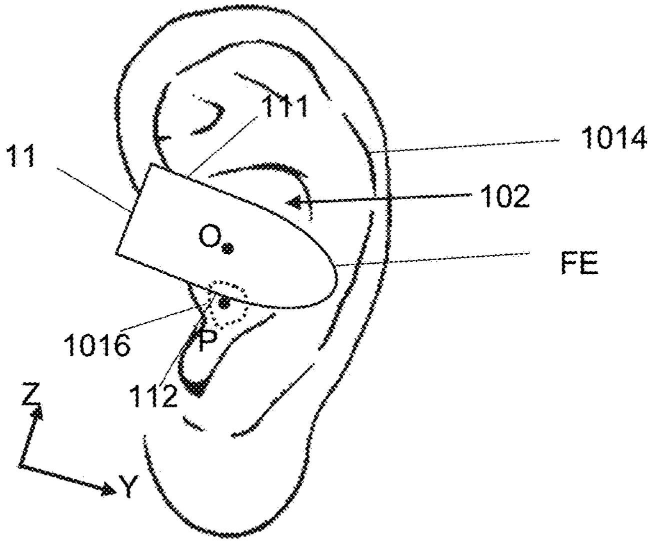
FIG. 11C is a schematic diagram illustrating an exemplary fitting position between an earphone and an ear canal of a user according to some embodiments of the present disclosure.

FIGS. 11A-11C are schematic diagrams illustrating exemplary fitting positions between an earphone and an ear canal of a user according to some embodiments of the present disclosure.

The size of the gap formed between the sound production component 11 and the edge of the cavity of auricular concha may not only be related to an inclination angle between a projection of an upper sidewall 111 (also referred to as an upper side surface) or a projection of a lower sidewall 112 (also referred to as a lower side surface) of the sound production component 11 on the sagittal plane and the horizontal direction (parallel to the sagittal axis S with a same direction), and the size of (e.g., a size along the short axis direction Z and the long axis direction Y shown in FIG. 11A, and a size along the thickness direction X shown in FIG. 3) the sound production component 11, but also related to a distance of the end FE of the sound production component 11 relative to the edge of the cavity of auricular concha. The distance of the end FE of the sound production component 11 relative to the edge of the cavity of auricular concha may be represented as a distance between a midpoint of the projection of the end FE of the sound production component 11 on the sagittal plane and the projection of the edge of the cavity of auricular concha on the sagittal plane. The cavity of auricular concha refers to a concave fossa region below the crus of helix. That is to say, the edge of the cavity of auricular concha includes at least a sidewall below the crus of the helix, a contour of the tragus, an intertragic notch, an antitragus tip, a notch between an antitragus and the antihelix, and a contour of an antihelix body corresponding to the cavity of auricular concha. The projection of the edge of the cavity of auricular concha on the sagittal plane may be a contour of the projection of the cavity of auricular concha on the sagittal plane. Specifically, one end of the sound production component 11 may be connected with the suspension structure 12 (the second portion 122 of the ear hook). When the user wears the earphone, the whole or part of the structure of the sound production component 11 may extend into the cavity of auricular concha cavity, and the position of the end FE (free end) of the sound production component 11 relative to the edge of the cavity of auricular concha may affect the overlap ratio of the area of the first projection of the sound production component 11 on the sagittal plane to the area of the projection of the cavity of auricular concha on the sagittal plane, thereby affecting the size of the gap between the sound production component 11 and the cavity of auricular concha, and the listening volume at the opening of the ear canal of the user. Furthermore, the distance between the midpoint of the projection of the end FE of the sound production component 11 on the sagittal plane and the projection of the edge of the cavity of auricular concha on the sagittal plane may represent the position of the end FE of the sound production component 11 relative to the cavity of auricular concha and a degree to which the sound production component 11 covers the cavity of auricular concha of the user. It should be noted that, when the projection of the end FE of the sound production component 11 on the sagittal plane is a curved line or a broken line, the midpoint of the projection of the end FE of the sound production component 11 on the sagittal plane may be selected through a following exemplary method. A line segment may be determined through two points with a maximum distance of the projection of the end FE of the sound production component 11 on the sagittal plane along the short axis direction, a vertical centerline may be determined through a midpoint on the line segment, and an intersecting point between the vertical centerline and the projection may be determined as the midpoint of the projection of the end FE of the sound production component 11 on the sagittal plane. In some embodiments, when the end FE of the sound production component 11 is a curved surface, a tangent point on a tangent line of the projection that is parallel to the short axis direction Z may be determined as the midpoint of the projection of the end FE of the sound production component 11 on the sagittal plane.

As shown in FIG. 11A, when the sound production component 11 does not abut against the edge of the cavity of auricular concha 102, the end FE of the sound production component 11 may be located in the cavity of auricular concha 102. That is to say, the midpoint of the projection of the end FE of the sound production component 11 on the sagittal plane may not overlap with the projection of the edge of the cavity of auricular concha 102 on the sagittal plane. As shown in FIG. 11B, the sound production component 11 of the earphone 10 may extend into the cavity of auricular concha 102, and the end FE of the sound production component 11 may abut against the edge of the cavity of auricular concha 102. That is to say, the midpoint of the projection of the end FE of the sound production component 11 on the sagittal plane may overlap with the projection of the edge of the cavity of auricular concha 102 on the sagittal plane. As shown in FIG. 11C, the sound production component 11 of the earphone 10 may cover the cavity of auricular concha, and the end FE of the sound production component 11 may be located between the edge of the cavity of auricular concha 102 and the inner contour 1014 of the auricle.

As shown in FIGS. 11A-11C, when the end FE of the sound production component 11 is located in the edge of the cavity of auricular concha 102, if the distance between a midpoint C3 of the projection of the end FE of the sound production component 11 on the sagittal plane and the projection of the edge of the cavity of auricular concha 102 on the sagittal plane is too large, the overlap ratio of the area of the first projection of the sound production component 11 on the sagittal plane to the area of the projection of the cavity of auricular concha on the sagittal plane may be too small, and the size of the gap formed between the sound production component 11 and the cavity of auricular concha 102 may be relatively large, affecting the listening volume at the opening of the ear canal of the user. When the midpoint C3 of the projection of the end FE of the sound production component 11 on the sagittal plane is located at a position between the projection of the edge of the cavity of auricular concha 102 on the sagittal plane and the projection of the inner contour 1014 of the auricle on the sagittal plane, if the distance between the midpoint C3 of the projection of the end FE of the sound production component 11 on the sagittal plane and the projection of the edge of the cavity of auricular concha 102 on the sagittal plane is too large, the end FE of the sound production component 11 may interfere with the auricle, and a proportion of the sound production component 11 covering the cavity of auricular concha 102 may not be increased. In addition, when the user wears the earphone, if the end FE of the sound production component 11 is not located in the cavity of auricular concha 102, the edge of the cavity of auricular concha 102 may not limit the sound production component 11, so that the earphone may easily fall off. In addition, an increase in the size of the sound production component 11 may increase the weight of the sound production component 11, affecting the wearing comfort and portability. It should be noted that, when the projection of the end FE of the sound production component 11 on the sagittal plane is a curved line or a broken line, the midpoint of the projection of the end FE of the sound production component 11 on the sagittal plane may be selected through a following exemplary method. A line segment may be determined through a start point and an end point of the projection of the end FE of the sound production component 11 on the sagittal plane, a vertical centerline may be determined through a midpoint on the line segment, and an intersecting point between the vertical centerline and the projection may be determined as the midpoint of the projection of the end FE of the sound production component 11 on the sagittal plane. In some embodiments, when the end FE of the sound production component 11 is a curved surface, a tangent point on a tangent line of the projection parallel to the short axis direction Z may be determined as the midpoint of the projection of the end FE of the sound production component 11 on the sagittal plane.

Figure 12:
FIG. 12 is a diagram illustrating exemplary frequency response curves corresponding to different distances between a projection of an end of a sound production component on a sagittal plane and a projection of an edge of a cavity of an auricular concha on the sagittal plane according to some embodiments of the present disclosure.

FIG. 12 is a diagram illustrating exemplary frequency response curves corresponding to different distances between a projection of an end of a sound production component on a sagittal plane and a projection of an edge of a cavity of an auricular concha on the sagittal plane according to some embodiments of the present disclosure. As shown in FIG. 12, an abscissa may represent a frequency (unit: Hz), and an ordinate may represent a sound pressure level (unit: dB) at the opening of the ear canal corresponding to different frequencies. A frequency response curve 1201 refers to a frequency response curve when the distance between the midpoint C3 of the projection of the end of the sound production component on the sagittal plane and the projection of the edge of the cavity of auricular concha on the sagittal plane is 0 mm (e.g., in the wearing state, the end of the sound production component 11 abuts against the edge of the cavity of auricular concha). A frequency response curve 1202 refers to a frequency response curve when the distance between the midpoint C3 of the projection of the end of the sound production component on the sagittal plane and the projection of the edge of the cavity of auricular concha on the sagittal plane is 4.77 mm. A frequency response curve 1203 refers to a frequency response curve when the distance between the midpoint C3 of the projection of the end of the sound production component on the sagittal plane and the projection of the edge of the cavity of auricular concha on the sagittal plane is 7.25 mm. A frequency response curve 1204 refers to a frequency response curve when the distance between the midpoint C3 of the projection of the end of the sound production component on the sagittal plane and the projection of the edge of the cavity of auricular concha on the sagittal plane is 10.48 mm. A frequency response curve 1205 refers to a frequency response curve when the distance between the midpoint C3 of the projection of the end of the sound production component on the sagittal plane and the projection of the edge of the cavity of auricular concha on the sagittal plane is 15.3 mm. A frequency response curve 1206 refers to a frequency response curve when the distance between the midpoint C3 of the projection of the end of the sound production component on the sagittal plane and the projection of the edge of the cavity of auricular concha on the sagittal plane is 19.24 mm. As shown in FIG. 12, when the distance between the midpoint C3 of the projection of the end of the sound production component on the sagittal plane and the projection of the edge of the cavity of auricular concha on the sagittal plane is 0 mm (e.g., in the wearing state, the end of the sound production component 11 abuts against the edge of the cavity of auricular concha), 4.77 mm, or 7.25 mm, a sound pressure level of sound measured at the opening of the ear canal may be relatively large. When the distance between the midpoint C3 of the projection of the end of the sound production component on the sagittal plane and the projection of the edge of the cavity of auricular concha on the sagittal plane is 19.24 mm (e.g., in the wearing state, the end of the sound production component 11 abuts against the edge of the cavity of auricular concha), a sound pressure level of sound measured at the opening of the ear canal may be relatively small. That is to say, in the wearing state, the greater the distance between the midpoint C3 of the projection of the end of the sound production component on the sagittal plane and the projection of the edge of the cavity of auricular concha on the sagittal plane, i.e., the less the structure of the sound production component 11 extending into the cavity of auricular concha, the smaller the overlap ratio of the area of the first projection of the sound production component 11 on the sagittal plane to the area of the projection of the edge of the cavity of auricular concha on the sagittal plane, and the worse the listening volume at the opening of the ear canal. Accordingly, to ensure the wearing comfort and stability of the user while ensuring a good listening effect of the earphone 10, in some embodiments, the distance between the midpoint C3 of the projection of the end FE of the sound production component 11 on the sagittal plane and the projection of the edge of the cavity of auricular concha on the sagittal plane may not be greater than 16 mm. Preferably, the distance between the midpoint C3 of the projection of the end FE of the sound production component 11 on the sagittal plane and the projection of the edge of the cavity of auricular concha on the sagittal plane may not be greater than 13 mm. More preferably, the distance between the midpoint C3 of the projection of the end FE of the sound production component 11 on the sagittal plane and the projection of the edge of the cavity of auricular concha on the sagittal plane may be within a range of 0 mm-10.92 mm. Merely by way of example, the distance between the midpoint C3 of the projection of the end FE of the sound production component 11 on the sagittal plane and the projection of the edge of the cavity of auricular concha on the sagittal plane may be within a range of 0 mm-15.3 mm. Preferably, the distance between the midpoint C3 of the projection of the end FE of the sound production component 11 on the sagittal plane and the projection of the edge of the cavity of auricular concha on the sagittal plane may be within a range of 0 mm-10.48 mm. More preferably, the distance between the midpoint C3 of the projection of the end FE of the sound production component 11 on the sagittal plane and the projection of the edge of the cavity of auricular concha on the sagittal plane may be within a range of 0 mm-7.25 mm. Further preferably, the distance between the midpoint C3 of the projection of the end FE of the sound production component 11 on the sagittal plane and the projection of the edge of the cavity of auricular concha on the sagittal plane may be within a range of 0 mm-4.77 mm. In some embodiments, the end of the sound production component may abut against the edge of the cavity of auricular concha, which may be understood as that the projection of the end FE of the sound production component 11 may overlap (e.g., a position of the sound production component 11 relative to the cavity of auricular concha shown in FIG. 11A) with the projection of the edge of the cavity of auricular concha on the sagittal plane. That is, when the distance between the projection of the end of the sound production component on the sagittal plane and the projection of the edge of the cavity of auricular concha on the sagittal plane is 0 mm, the sound production component 11 may have a good frequency response. At this time, the end of the sound production component 11 may abut against the edge of the cavity of auricular concha, to support and limit the sound production component 11, thereby improving the wearing stability for the user. It should be noted that, in some embodiments, the distance between the midpoint C3 of the projection of the end FE of the sound production component 11 on the sagittal plane and the projection of the edge of the cavity of auricular concha 102 on the sagittal plane may be a minimum distance between the midpoint C3 of the projection of the end FE of the sound production component 11 on the sagittal plane and the projection of the edge of the cavity of auricular concha 102 on the sagittal plane. In some embodiments, the distance between the midpoint C3 of the projection of the end FE of the sound production component 11 on the sagittal plane and the projection of the edge of the cavity of auricular concha 102 on the sagittal plane may be a distance along the sagittal axis direction. In addition, the distance between the end of the sound production component 11 on the sagittal plane and the projection of the edge of the cavity of auricular concha on the sagittal plane in the FIG. 12 may be measured based on a scenario that the end of the sound production component 11 extends into the cavity of auricular concha. It should be noted that, in a specific wearing scenario, another point of the projection of the end FE of the sound production component 11 on the sagittal plane other than the midpoint C3 may also abut against the edge of the cavity of auricular concha. At this time, the distance between the midpoint C3 of the projection of the end FE of the sound production component 11 on the sagittal plane and the projection of the edge of the cavity of auricular concha on the sagittal plane may be greater than 0 mm. In some embodiments, the distance between the midpoint C3 of the projection of the end FE of the sound production component 11 on the sagittal plane and the projection of the edge of the cavity of auricular concha on the sagittal plane may be within a range of 2 mm-16 mm. Preferably, the distance between the midpoint C3 of the projection of the end FE of the sound production component 11 on the sagittal plane and the projection of the edge of the cavity of auricular concha on the sagittal plane may be within a range of 4 mm-10.48 mm. In addition, the cavity of auricular concha 102 may be a concave fossa structure, and a sidewall corresponding to the cavity of auricular concha 102 may be not a smooth wide surface. The projection of the edge of the cavity of auricular concha on the sagittal plane may be an irregular two-dimensional shape, and a projection of the sidewall corresponding to the cavity of auricular concha 102 on the sagittal plane may be located on a contour of the shape, or located outside of the contour of the shape. Therefore, the midpoint of the projection of the end FE of the sound production component 11 on the sagittal plane may also not overlap with the projection of the edge of the cavity of auricular concha 102 on the sagittal plane. For example, the midpoint of the projection of the end FE of the sound production component 11 on the sagittal plane may be located at an inner side or an outer side of the projection of the edge of the cavity of auricular concha 102 on the sagittal plane. In the embodiments of the present disclosure, when the end FE of the sound production component 11 is located in the cavity of auricular concha 102, the distance between the midpoint of the projection of the end FE of the sound production component 11 on the sagittal plane and the projection of the edge of the cavity of auricular concha 102 on the sagittal plane may be within a specific range (e.g., not greater than 6 mm), which indicates that the end FE of the sound production component 11 abuts against the edge of the cavity of auricular concha 102.

It should be noted that the frequency response curves corresponding to different distances between the midpoint of the projection of the end FE of the sound production component on the sagittal plane and the projection of the edge of the cavity of auricular concha on the sagittal plane obtained through the measurement in the embodiments of the present disclosure may be obtained through the measurement by changing the wearing position (e.g., translating along the sagittal axis direction) of the sound production component based on a certain wearing angle (an angle between the upper sidewall or the lower sidewall and the horizontal direction), a certain size along the long axis direction, a certain size along the short axis direction, and a certain size along the thickness direction.

In some embodiments, as shown in FIGS. 11A-11C, when the earphone 10 is in the wearing state, the first projection of the sound production component 11 on the sagittal plane may at least partially overlap with a projection (e.g., a region 1016 enclosed by dotted lines shown in FIGS. 11A-11C) of the opening of the ear canal on the sagittal plane. A distance between a centroid O of the first projection of the sound production component 11 on the sagittal plane and a centroid P' of the projection of the opening of the ear canal on the sagittal plane may represent a relative position relationship between the sound production component 111 and the opening of the ear canal, and an overlap ratio of the area of the first projection of the sound production component 11 on the sagittal plane to an area of the projection of the opening of the ear canal on the sagittal plane. The overlap ratio may affect a count of the leakage structure of the cavity-like structure formed by the sound production component 11 and the ear of the user and the opening size of the leakage structure. The opening size of the leakage structure may affect the listening quality directly. Specifically, the larger the opening of the leakage structure, the more sound components that the sound production component 11 radiate directly outward, and the less sound reaching the listening position.

Figure 13A:
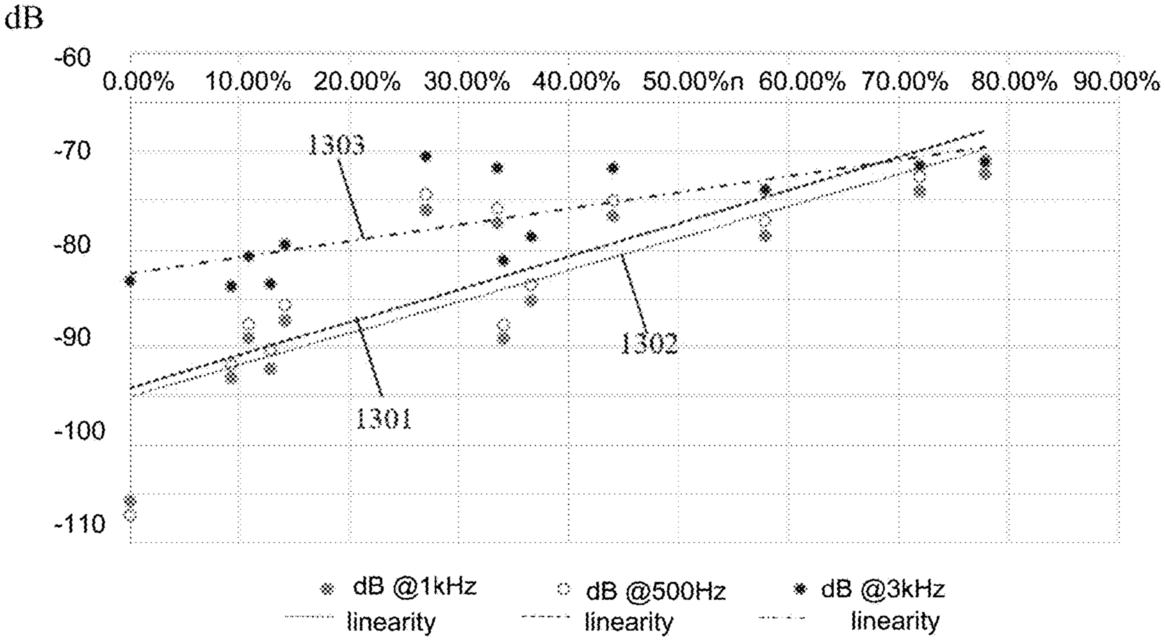
FIG. 13A is a diagram illustrating exemplary frequency response curves corresponding to different overlap ratios each of which is a ratio of a projection area of a first projection to a projection area of a cavity of an auricular concha of a user on a sagittal plane according to some embodiments of the present disclosure.
Figure 13B:
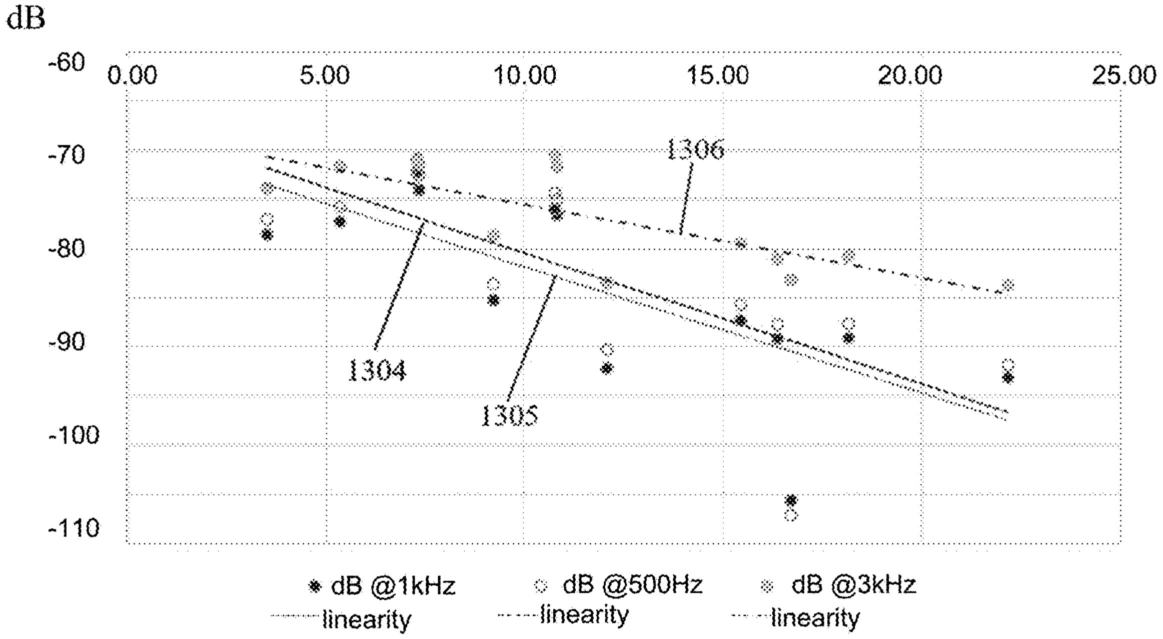
FIG. 13B is a diagram illustrating exemplary frequency response curves corresponding to different distances between a centroid of a first projection and a centroid of a projection of an opening of an ear canal on a sagittal plane according to some embodiments of the present disclosure.

FIG. 13A is a diagram illustrating exemplary frequency response curves corresponding to different overlap ratios each of which is a ratio of an area of a first projection to an area of a projection of a cavity of an auricular concha on a sagittal plane according to some embodiments of the present disclosure. FIG. 13B is a diagram illustrating exemplary frequency response curves corresponding to different distances between a centroid of a first projection of a sound production component 11 on a sagittal plane and a centroid of a projection of an opening of an ear canal on the sagittal plane according to some embodiments of the present disclosure.

Referring to FIG. 13A, an abscissa may represent an overlap ratio of the area of the first projection of the sound production component 11 on the sagittal plane to the area of the projection of the cavity of auricular concha on the sagittal plane, and an ordinate may represent a sound pressure level of sound at the opening of the ear canal corresponding to different overlap ratios. A straight line 1301 may represent a linear relationship obtained by fitting the overlap ratio of the area of the first projection to the area of the projection of the cavity of auricular concha on the sagittal plane with the sound pressure level at the opening of the ear canal when a frequency is 500 Hz. A straight line 1302 may represent a linear relationship obtained by fitting the overlap ratio of the area of the first projection to the area of the projection of the cavity of auricular concha on the sagittal plane with the sound pressure level at the opening of the ear canal when a frequency is 1 kHz. A straight line 1303 may represent a linear relationship obtained by fitting the overlap ratio of the area of the first projection to the area of the projection of the cavity of auricular concha on the sagittal plane with the sound pressure level at the opening of the ear canal when a frequency is 3 kHz. A hollow point shown in FIG. 13A may be test data corresponding to different overlap ratios of which each ratio is the area of the first projection to the area of the projection of the cavity of auricular concha on the sagittal plane when the frequency is 500 Hz. A point with a smaller gray value shown in FIG. 13A may be test data corresponding to different overlap ratios of which each ratio is the area of the first projection to the area of the projection of the cavity of auricular concha on the sagittal plane when the frequency is 1 kHz. A black point shown in FIG. 13A may be test data corresponding to different overlap ratios of which each ratio is the area of the first projection to the area of the projection of the cavity of auricular concha on the sagittal plane when the frequency is 3 kHz. As shown in FIG. 13A, under different frequencies, the overlap ratio of the area of the first projection to the area of the projection of the cavity of auricular concha on the sagittal plane may be substantially positively correlated with the sound pressure level at the opening of the ear canal. When the area of the first projection of the sound production component 11 on the sagittal plane overlaps with the area of the projection of the cavity of auricular concha on the sagittal plane, the sound with a specific frequency (e.g., 500 Hz, 1 kHz, and 3 kHz) measured at the opening of the ear canal may be increased significantly compared with a condition that the area of the first projection of the sound production component 11 on the sagittal plane does not overlap (the overlap ratio is 0) with the area of the projection of the cavity of auricular concha on the sagittal plane. Accordingly, to ensure the acoustic output quality of the sound production component 11, the overlap ratio of the area of the first projection of the sound production component 11 on the sagittal plane to the area of the projection of the cavity of auricular concha on the sagittal plane may be within a range of 44.01%-80%. Referring to FIG. 13A, when the overlap ratio is 22% or 32%, the sound pressure level at the opening of the ear canal may be relatively large. However, as the structure of the sound production component 11 extending into the cavity of auricular concha may be limited, the edge of the cavity of auricular concha may not support and limit the end of the sound production component 11. When the overlap ratio is too large (e.g., greater than 80%), although the sound pressure level at the opening of the ear canal is relatively large, the open state of the opening of the ear canal may be affected. Preferably, in some embodiments, the overlap ratio of the area of the first projection of the sound production component 11 on the sagittal plane to the area of the projection of the cavity of auricular concha on the sagittal plane may be within a range of 45%-71.49%.

Referring to FIG. 13B, an abscissa may represent a distance between a centroid O of the first projection of the sound production component 11 on the sagittal plane and a centroid P' of the projection of the opening of the ear canal on the sagittal plane, and an ordinate may represent a sound pressure level of sound at the opening of the ear canal corresponding to different distances. A straight line 1304 may represent a linear relationship obtained by fitting the distance between the centroid O of the first projection of the sound production component 11 on the sagittal plane and the centroid P' of the projection of the opening of the ear canal on the sagittal plane with the sound pressure level at the opening of the ear canal when a frequency is 500 Hz. A straight line 1305 may represent a linear relationship obtained by fitting the distance between the centroid O of the first projection of the sound production component 11 on the sagittal plane and the centroid P' of the projection of the opening of the ear canal on the sagittal plane with the sound pressure level at the opening of the ear canal when a frequency is 1 kHz. A straight line 1306 may represent a linear relationship obtained by fitting the distance between the centroid O of the first projection of the sound production component 11 on the sagittal plane and the centroid P' of the projection of the opening of the ear canal on the sagittal plane with the sound pressure level at the opening of the ear canal when a frequency is 3 kHz. A hollow point shown in FIG. 13B may be test data corresponding to different distances between the centroid O of the first projection of the sound production component 11 on the sagittal plane and the centroid P' of the projection of the opening of the ear canal on the sagittal plane when the frequency is 500 Hz. A black point shown in FIG. 13B may be test data corresponding to different distances between the centroid O of the first projection of the sound production component 11 on the sagittal plane and the centroid P' of the projection of the opening of the ear canal on the sagittal plane when the frequency is 1 kHz. A point with a smaller gray value shown in FIG. 13B may be test data corresponding to different distances between the centroid O of the first projection of the sound production component 11 on the sagittal plane and the centroid P' of the projection of the opening of the ear canal on the sagittal plane when the frequency is 3 kHz. As shown in FIG. 13B, under different frequencies, the distance between the centroid O of the first projection of the sound production component 11 on the sagittal plane and the centroid P' of the projection of the opening of the ear canal on the sagittal plane may be substantially negatively correlated with the sound pressure level at the opening of the ear canal. As a whole, the sound with a specific frequency (e.g., 500 Hz, 1 kHz, and 3 kHz) measured at the opening of the ear canal may be reduced with an increase of the distance between the centroid O of the first projection of the sound production component 11 on the sagittal plane and the centroid P' of the projection of the opening of the ear canal on the sagittal plane. Referring to FIG. 13A and FIG. 13B, the larger the distance between the centroid O of the first projection of the sound production component 11 on the sagittal plane and the centroid P' of the projection of the opening of the ear canal on the sagittal plane, the less the overlap ratio of the area of the first projection of the sound production component 11 on the sagittal plane to the area of the projection of the opening of the ear canal on the sagittal plane. The overlap ratio may affect a count of the leakage structure of the cavity-like structure formed by the sound production component 11 and the ear of the user and the opening size of the leakage structure. The opening size of the leakage structure may affect the listening quality directly. Specifically, the larger the opening of the leakage structure, the more sound components that the sound production component 11 radiates directly outward, and the less sound reaching the listening position. In addition, when the distance between the centroid O of the first projection of the sound production component 11 on the sagittal plane and the centroid P' of the projection of the opening of the ear canal on the sagittal plane is too small, the overlap ratio of the area of the first projection of the sound production component 11 on the sagittal plane to the area of the projection of the opening of the ear canal on the sagittal plane may be too large, so that the sound production component 11 may cover the opening of the ear canal of the user, thereby affecting the user's access to the sound information in the external environment. As shown in FIG. 13B, taking the frequency 3 kHz as an example, when the distance between the centroid O of the first projection of the sound production component 11 on the sagittal plane and the centroid P' of the projection of the opening of the ear canal on the sagittal plane is 7 mm and 11 mm, the sound pressure level measured at the opening of the ear canal may be −72 dB and −70 dB respectively; when the distance between the centroid O of the first projection of the sound production component 11 on the sagittal plane and the centroid P' of the projection of the opening of the ear canal on the sagittal plane is 18 mm and 22 mm, the sound pressure level measured at the opening of the ear canal may be −80 dB and −84.3 dB respectively. Accordingly, the distance between the centroid O of the first projection of the sound production component 11 on the sagittal plane and the centroid P' of the projection of the opening of the ear canal on the sagittal plane may not be too large. In some embodiments, to ensure the user's access to the sound information in the external environment while ensuring the acoustic output quality (e.g., the sound pressure level at the opening of the ear canal is greater than −80 dB) of the sound production component 11, the distance between the centroid O of the first projection of the sound production component 11 on the sagittal plane and the centroid P' of the projection of the opening of the ear canal on the sagittal plane may be within a range of 3 mm-15 mm. Preferably, the distance between the centroid O of the first projection of the sound production component 11 on the sagittal plane and the centroid P' of the projection of the opening of the ear canal on the sagittal plane may be within a range of 4 mm-13 mm. More preferably, the distance between the centroid O of the first projection of the sound production component 11 on the sagittal plane and the centroid P' of the projection of the opening of the ear canal on the sagittal plane may be within a range of 8 mm-10 mm.

It should be noted that the frequency response curves corresponding to different overlap ratios, the centroid of the first projection, and the centroid of the projection of the opening of the ear canal on the sagittal plane obtained through the measurement in the embodiments of the present disclosure may be obtained through the measurement by changing the wearing position (e.g., translating along the sagittal axis direction) of the sound production component based on a certain wearing angle (an angle between the upper sidewall or the lower sidewall and the horizontal direction), a certain size along the long axis direction, a certain size along the short axis direction, and a certain size along the thickness direction.

It should be noted that a position relationship between the sound production component 11 and the auricle, or between the cavity of auricular concha and the opening of the ear canal provided in the embodiments of the present disclosure may be determined by a following exemplary method. Firstly, an image of a head model including an ear may be captured along a direction facing the sagittal plane at a specific position, and an edge of a cavity of an auricular concha, a contour of an opening of an ear canal, and a contour (e.g., an inner contour and an outer contour) of an auricle may be marked, the marked contour being considered as a projection contour of each structure of the ear on the sagittal plane; then an image of the head model wearing an earphone may be captured from a same angle at the specific position, and a contour of a sound production component may be marked, the contour being considered as a projection of the sound production component on the sagittal plane. The position relationship between the sound production component (e.g., a centroid, an end, etc.) and the edge of the cavity of auricular concha, the opening of the ear canal, the inner contour, or the outer contour may be determined through comparative analysis.

Figure 14:
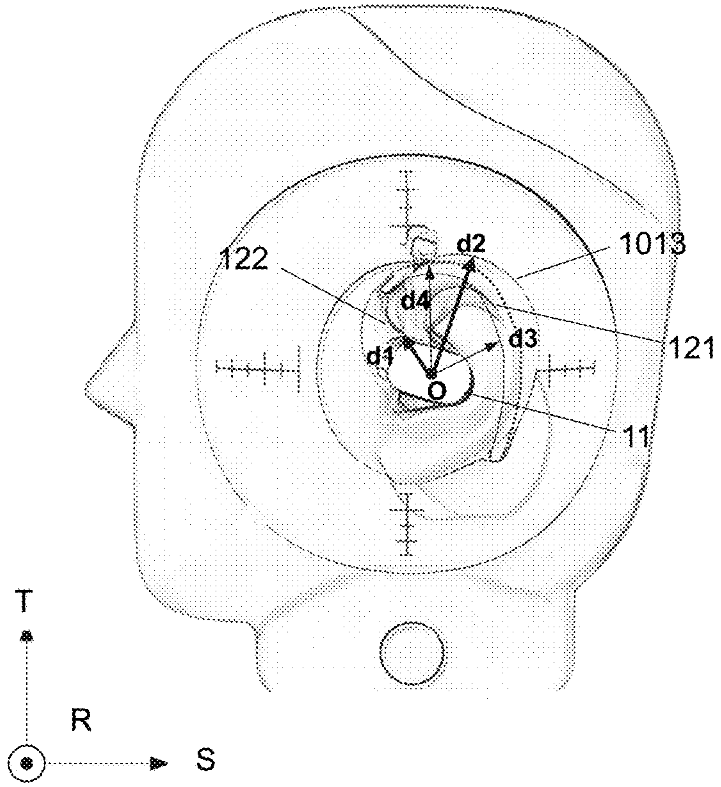
FIG. 14 is a schematic diagram illustrating an exemplary wearing manner of an earphone according to some embodiments of the present disclosure.

FIG. 14 is a schematic diagram illustrating an exemplary wearing manner of an earphone according to some embodiments of the present disclosure.

Referring to FIG. 3 and FIG. 14, when the user wears the earphone 10 and the sound production component 11 extends into the cavity of auricular concha, the centroid O of the first projection may be located in a region enclosed by a contour of the second projection. The contour of the second projection may be understood as a projection of an outer contour of the helix of the user, an earlobe contour, a tragus contour, an intertragic notch, an antitragus apex, a notch between the antitragus and the anthelix, etc. on the sagittal plane. In some embodiments, the listening volume of the sound production component, the sound leakage reduction effect, and the wearing comfort and stability may be improved by adjusting a distance between the centroid O of the first projection and the contour of the second projection. For example, when the sound production component 11 is located at a top of the auricle, the earlobe, a facial region on a front side of the auricle, or between the inner contour 1014 of the auricle and the outer edge of the cavity of auricular concha, it may be specifically embodied as that a distance between the centroid O of the first projection and a point of a certain region of the contour of the second projection is too small, and a distance between the centroid O of the first projection and a point of another region of the contour of the second projection is too large, and the sound production component may not form a quasi-cavity structure (acoustic model in FIG. 4) with the cavity of auricular concha, affecting the acoustic output effect of the earphone 10. In order to ensure the acoustic output quality when the user wears the earphone 10, in some embodiments, the distance between the centroid O of the first projection and the contour of the second projection may be within a range of 10 mm-52 mm, i.e., the distance between the centroid O of the first projection and any point of the contour of the second projection may be within a range of 10 mm-52 mm. Preferably, in order to further improve the wearing comfort of the earphone 10 and optimize the quasi-cavity structure formed by the sound production component 11 and the cavity of auricular concha, the distance between the centroid O of the first projection and the contour of the second projection may be within a range of 12 mm-50.5 mm. More preferably, the distance between the centroid O of the first projection and the contour of the second projection may also be within a range of 13.5 mm-50.5 mm. In some embodiments, by controlling the distance between the centroid O of the first projection and the contour of the second projection to be within a range of 10 mm-52 mm, most of the sound production component 11 may be located near the ear canal of the user, and at least part of the sound production component may extend into the cavity of auricular concha of the user to form the acoustic model in FIG. 4, thereby ensuring that the sound output by the sound production component 11 may be better transmitted to the user. For example, in some embodiments, a minimum distance $d_1$ between the centroid O of the first projection and the contour of the second projection may be 20 mm, and a maximum distance d2 between the centroid O of the first projection and the contour of the second projection may be 48.5 mm.

Referring to FIGS. 13A-14, in the wearing state of the earphone, the distance between the centroid O of the first projection and the centroid P' of the projection of the opening of the ear canal on the sagittal plane may be substantially negatively correlated with the sound pressure level at the opening of the ear canal of the user. When the distance between the centroid O of the first projection of the sound production component 11 on the sagittal plane and the centroid P' of the projection of the opening of the ear canal on the sagittal plane is too small, the overlap ratio of the area of the first projection of the sound production component 11 on the sagittal plane to the area of the projection of the opening of the ear canal on the sagittal plane may be too large, and the sound production component 11 may cover the opening of the ear canal of the user, affecting the user's access to the sound information in the external environment. Considering that the position of the opening of the ear canal of the ear relative to the auricle is fixed, in some embodiments, a ratio of the distance between the centroid O of the first projection and the centroid P' of the projection of the opening of the ear canal on the sagittal plane to the distance between the centroid O of the first projection and the projection of the contour of the second projection on the sagittal plane may reflect a position of the sound production component 11 relative to the auricle and the opening of the ear canal in the wearing state. For example, the smaller the ratio, the closer the centroid O of the first projection is to the opening of the ear canal. In some embodiments, to ensure the listening effect at the opening of the ear canal of the user and maintain the open state of the opening of the ear canal to access the sound information in the external environment, the ratio of the distance between the centroid O of the first projection and the centroid P' of the projection of the opening of the ear canal on the sagittal plane to the distance between the centroid O of the first projection and the projection of the contour of the second projection on the sagittal plane may be within a range of 0.13-0.55. Preferably, the ratio of the distance between the centroid O of the first projection and the centroid P' of the projection of the opening of the ear canal on the sagittal plane to the distance between the centroid O of the first projection and the projection of the contour of the second projection on the sagittal plane may be within a range of 0.2-0.55. Here, by adjusting the ratio of the distance between the centroid O of the first projection and the centroid P' of the projection of the opening of the ear canal on the sagittal plane to the distance between the centroid O of the first projection and the projection of the contour of the second projection on the sagittal plane, the distance between the sound guiding hole of the sound production component and the opening of the ear canal on the premise that the sound production component does not cover the opening of the ear canal as much as possible, thereby ensuring a good listening effect at the opening of the ear canal of the user, and maintaining the open state of the opening of the ear canal to access to the sound information in the external environment. More preferably, the ratio of the distance between the centroid O of the first projection and the centroid P' of the projection of the opening of the ear canal on the sagittal plane to the distance between the centroid O of the first projection and the projection of the contour of the second projection on the sagittal plane may be within a range of 0.25-0.45. By adjusting the ratio of the distance between the centroid O of the first projection and the centroid P' of the projection of the opening of the ear canal on the sagittal plane to the distance between the centroid O of the first projection and the projection of the contour of the second projection on the sagittal plane to be within a suitable range, a good listening effect at the opening of the ear canal may be further improved, thereby ensuring to maintain the open state of the opening of the ear canal to access to the sound information in the external environment.

In some embodiments, considering that when the user wears the earphone 10, if a distance between the centroid O of the first projection and a projection of the first portion 121 of the ear hook on the sagittal plane is too large, it may cause unstable wearing (at this time, an effective clamping of the ear may not be formed between the sound production component 11 and the ear hook), and the problem that the sound production component 11 may not effectively extend into the cavity of auricular concha. If the distance is too small, it may affect the relative position of the sound production component to the cavity of auricular concha of the user and the opening of the ear canal, and may also cause the sound production component 11 or the ear hook to press the ear, resulting in poor wearing comfort. Accordingly, in order to avoid the problems, in some embodiments, the distance between the centroid O of the first projection and the projection of the first portion 121 of the ear hook on the sagittal plane may be within a range of 18 mm-43 mm. By controlling the distance to be within the range of 18 mm-43 mm, the ear hook may fit the ear of the user better, and the sound production component 11 may be ensured to be just located at the cavity of auricular concha of the user, and the acoustic model in FIG. 4 may be formed, thereby ensuring that the sound output by the sound production component 11 may be better transmitted to the user. Preferably, in order to further improve the wearing stability of the earphone and ensure the listening effect of the sound production component 11 at the opening of the ear canal, in some embodiments, the distance between the centroid O of the first projection and the projection of the first portion 121 of the ear hook on the sagittal plane may be within a range of 20 mm-41 mm. More preferably, the distance between the centroid O of the first projection and the projection of the first portion 121 of the ear hook on the sagittal plane may be within a range of 22 mm-40.5 mm. For example, a minimum distance d3 between the centroid O of the first projection and the projection of the first portion 121 of the ear hook on the sagittal plane may be 21 mm, and a maximum distance d4 between the centroid O of the first projection on the sagittal plane of the user and the projection of the first portion 121 of the ear hook on the sagittal plane may be 41.2 mm.

In some embodiments, due to an elasticity of the ear hook, the distance between the sound production component 11 and the ear hook may vary (usually the distance in the non-wearing state may be smaller than that in the wearing state) in the wearing state and the non-wearing state. For example, in some embodiments, when the earphone 10 is in the non-wearing state, a distance between a centroid of a projection of the sound production component 11 on a specific reference plane and a centroid of a projection of the first portion 121 of the ear hook on the specific reference plane may be within a range of 15 mm-38 mm. Preferably, when the earphone 100 is in the non-wearing state, the distance between the centroid of the projection of the sound production component 11 on the specific reference plane and the centroid of the projection of the first portion 121 of the ear hook on the specific reference plane may be within a range of 16 mm-36 mm. In some embodiments, the distance between the centroid of the projection of the sound production component on the specific reference plane and the centroid of the projection of the first portion 121 of the ear hook on the specific reference plane may be slightly smaller in the non-wearing state than in the wearing state, so that when the earphone 100 is in the wearing state, the ear hook may generate a certain clamping force on the ear of the user, thereby improving the wearing stability for the user without affecting the wearing experience of the user. In some embodiments, the specific reference plane may be the sagittal plane. At this time, in the non-wearing state, the centroid of the projection of the sound production component on the sagittal plane may be compared to the centroid of the projection of the sound production component on the specific reference plane. For example, the non-wearing state may be represented by removing the auricle structure from the human head model, and fixing the sound production component on the human head model in a same posture as the wearing state by using a fixing component or adhesive. In some embodiments, the specific reference plane may be an ear hook plane. An ear hook structure may be an arc structure. The ear hook plane may be a plane formed by three most protruding points on the ear hook, i.e., the plane that supports the ear hook when the ear hook is placed freely (i.e., not subject to external force). For example, when the ear hook is freely placed on a horizontal plane, the horizontal plane may support the ear hook, and the horizontal plane may be regarded as the ear hook plane. In other embodiments, the ear hook plane also refers to a plane formed by a bisector that bisects or roughly bisects the ear hook along a length extension direction of the ear hook. In the wearing state, although the ear hook plane has a certain angle relative to the sagittal plane, the ear hook may be approximately regarded as fitting the head at this time, and thus the angle is very small. For ease of calculation and description, it may also be possible to use the ear hook plane as the specific reference plane instead of the sagittal plane.

Figure 15:
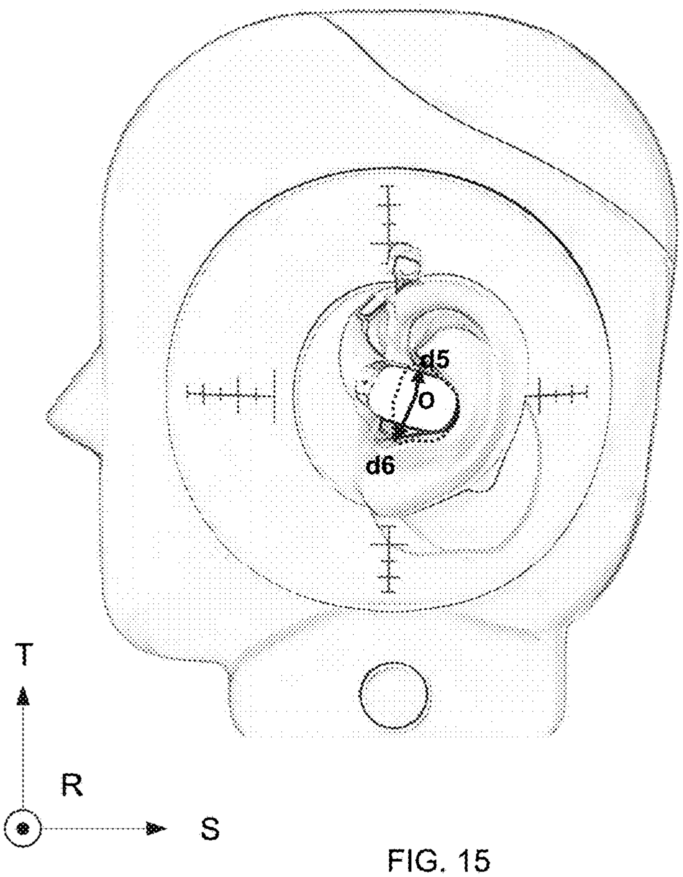
FIG. 15 is a schematic diagram illustrating an exemplary wearing manner of an earphone according to some embodiments of the present disclosure.

FIG. 15 is a schematic diagram illustrating an exemplary wearing manner of an earphone according to some embodiments of the present disclosure.

Referring to FIG. 15, in some embodiments, the projection of the sound production component on the sagittal plane may overlap with the projection of the cavity of auricular concha of the user (e.g., the dotted line in FIG. 9) on the sagittal plane, i.e., when the user wears the earphone, part or the whole of the sound production component may cover the cavity of auricular concha, and when the earphone is in the wearing state, the centroid O of the first projection may be located in a projection region of the cavity of auricular concha of the user on the sagittal plane. The position of the centroid O of the first projection may be related to a size of the sound production component. For example, if the size of the sound production component 11 in the long axis direction Y or the short axis direction Z is too small, a volume of the sound production component 11 may be relatively small, thus an area of the internally arranged diaphragm may also be relatively small, resulting in low efficiency of the diaphragm driving the air inside the housing of the sound production component 11 to produce sound, which may affect the acoustic output effect of the earphone. When the size of the sound production component 11 in the long axis direction Y or the short axis direction Z is too large, the sound production component 11 may exceed the range of the cavity of auricular concha, and may not extend into the cavity of auricular concha or form the quasi-cavity structure, or a total size of the gap formed between the sound production component 11 and the cavity of auricular concha may be very large, affecting the listening volume at the opening of the ear canal when the user wears the earphone 10 and the far-field sound leakage effect. In some embodiments, in order to enable the user to have better acoustic output quality when wearing the earphone 10, a distance between the centroid O of the first projection and a projection of an edge of the cavity of auricular concha of the user on the sagittal plane may be within a range of 4 mm-25 mm. Preferably, the distance between the centroid of the first projection and the projection of the edge of the cavity of auricular concha of the user on the sagittal plane may be within a range of 6 mm-20 mm. More preferably, the distance between the centroid of the first projection and the projection of the edge of the cavity of auricular concha of the user on the sagittal plane may be within a range of 10 mm-18 mm. For example, in some embodiments, a minimum distance $d_5$ between the centroid of the first projection and the projection of the edge of the cavity of auricular concha of the user on the sagittal plane may be 5 mm, and a maximum distance d6 between the centroid of the first projection and the projection of the edge of the cavity of auricular concha of the user on the sagittal plane may be 24.5 mm. In some embodiments, by controlling the distance between the centroid of the first projection and the projection of the edge of the cavity of auricular concha of the user on the sagittal plane to be within the range of 4 mm-25 mm, at least part of the structure of the sound production component 11 may cover the cavity of auricular concha to form a quasi-cavity acoustic model with the cavity of auricular concha. Therefore, the sound output by the sound production component may be better transmitted to the user, and the wearing stability of the earphone 100 may be improved by the force exerted by the cavity of auricular concha on the sound production component 11.

It should be noted that the position relationship between the sound production component 11 and the auricle or the cavity of auricular concha in the embodiments of the present may be determined by a following exemplary method. First, at a specific position, an image of a human head model with ears may be taken in a direction facing the sagittal plane, the edge of the cavity of auricular concha and the contour of the auricle (e.g., inner and outer contours) may be marked, which may be regarded as the projection contours of various structures of the ear on the sagittal plane; then at the specific position, an image of the earphone worn on the human head model may be taken at a same angle, and the contour of the sound production component may be marked, which may be regarded as the projection of the sound production component on the sagittal plane. The position relationship between the sound production component (e.g., a centroid, an end, etc.) and the edge of the cavity of auricular concha and the auricle may be determined through comparative analysis.

Figure 16A:
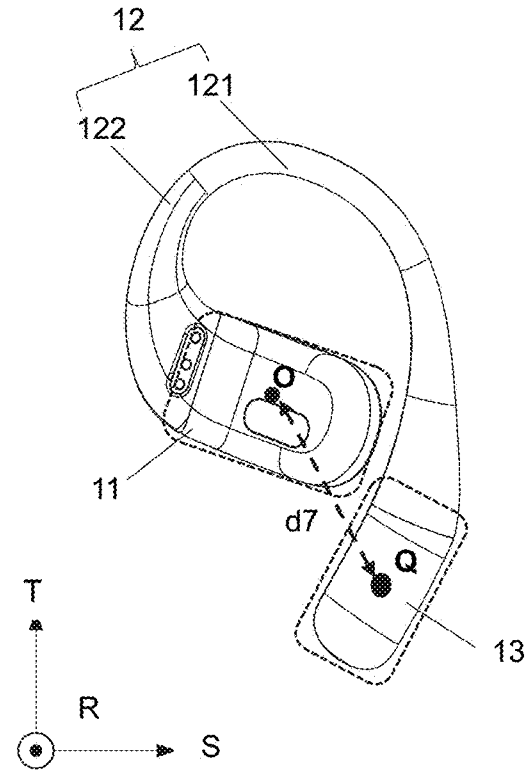
FIG. 16A is a schematic diagram illustrating an exemplary structure of an earphone according to some embodiments of the present disclosure.
Figure 16B:
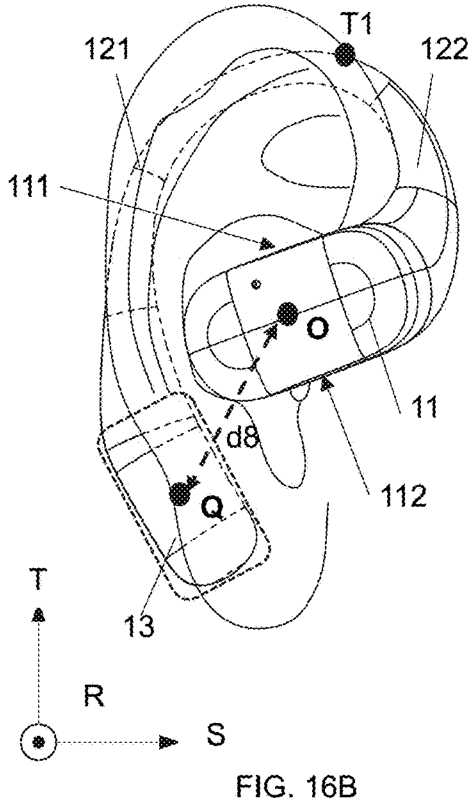
FIG. 16B is a schematic diagram illustrating a user wearing an earphone according to some embodiments of the present disclosure.

FIG. 16A is a schematic diagram illustrating an exemplary structure of an earphone according to some embodiments of the present disclosure. FIG. 16B is a schematic diagram illustrating a user wearing an earphone according to some embodiments of the present disclosure. As shown in FIG. 16A and FIG. 16B, the earphone 10 may include a suspension structure 12, a sound production component 11, and a battery compartment 13. The sound production component 11 and the battery compartment 13 may be respectively located at two ends of the suspension structure 12. In some embodiments, the suspension structure 12 may be the ear hook in FIG. 10A or FIG. 10B. The ear hook may include a first portion 121 and a second portion 122 connected in sequence. The first portion 121 may be hung between a rear inner side of the auricle of the user and the head of the user, and extends toward the neck along the rear inner side of the auricle. The second portion 122 may extend to a front outer side of the auricle and connect the sound production component 11, and the sound production component 11 may be located near the ear canal but not block the opening of the ear canal. An end of the first portion 121 away from the sound production component 11 may be connected with the battery compartment 13, and a battery electrically connected with the sound production component 11 may be arranged in the battery compartment 3. In some embodiments, the ear hook may be an arc structure adapted to a connection part between the auricle and the head. When the user wears the earphone 10, the sound production component 11 and the battery compartment 13 may be respectively located on the front outer side and the rear inner side of the auricle. The sound production component 11 may extend toward the first portion 121 of the ear hook, and the whole or part of the structure of the sound production component 11 may extend into the cavity of auricular concha, and cooperate with the cavity of auricular concha to form a quasi-cavity structure. When a size (length) of the first portion 121 in an extension direction of the first portion 121 is too small, the battery compartment 13 may be near a top of the auricle of the user, then the first portion 121 and the second portion 122 may not provide sufficient contact area to the ear or the head for the earphone 10, causing the earphone 10 to fall off easily from the ear. Therefore, a length of the first portion 121 of the ear hook may be long enough to ensure that the ear hook may provide sufficient contact area to the ear or the head, thereby increasing the resistance of the earphone to falling off from the human ear or the head. In addition, when the distance between the end of the sound production component 11 and the first portion 121 of the ear hook is too large, the battery compartment 13 may be away from the auricle in the wearing state, which may not provide sufficient clamping force for the earphone, and the earphone may be liable to fall off. When the distance between the end of the sound production component 11 and the first portion 121 of the ear hook is too small, the battery compartment 13 or the sound production component 11 may squeeze the auricle, which may affect the wearing comfort when the user wears the earphone for a long time. Taking the user wearing the earphone as an example, the length of the first portion 121 of the ear hook in the extension direction and a distance between the end of the sound production component 11 and the first portion 121 may be represented by a distance between the centroid O of the projection (i.e., the first projection) of the sound production component 11 on the sagittal plane and a centroid Q of a projection of the battery compartment 13 on the sagittal plane. In order to ensure that the ear hook may provide a large enough contact area to the ear or the head, a distance of the centroid Q of the projection of the battery compartment 13 on the sagittal plane relative to the horizontal plane (e.g., the ground plane) may be smaller than a distance of the centroid O of the projection of the sound production component 11 on the sagittal plane relative to the horizontal plane, i.e., in the wearing state, the centroid Q of the projection of the battery compartment 13 on the sagittal plane may be located below the centroid O of the projection of the sound production component 11 on the sagittal plane. In the wearing state, the part or whole position of the sound production component 11 may extend into the cavity of auricular concha, and the position of the sound production component 11 may be relatively fixed. If the distance between the centroid O of the projection of the sound production component 11 on the sagittal plane and the centroid Q of the projection of the battery compartment 13 on the sagittal plane is too small, the battery compartment 13 may be tightly attached to or even press against the rear inner side of the auricle, which may affect the wearing comfort of the user. If the distance between the centroid O of the projection of the sound production component 11 on the sagittal plane and the centroid Q of the projection of the battery compartment 13 on the sagittal plane is too large, the length of the first portion 121 of the ear hook may also be relatively long, causing the user to feel that the part of earphone located on the rear inner side of the auricle is heavy or the position of the battery compartment 13 relative to the auricle is far away when wearing the earphone, the earphone being prone to fall off during exercise of the user, thereby affecting the wearing comfort of the user and the wearing stability of the earphone. In order to make the user have better stability and comfort when wearing the earphone 10, in the wearing state, a fourth distance de between the centroid O of the projection of the sound production component 11 on the sagittal plane and the centroid Q of the projection of the battery compartment 13 on the sagittal plane may be within a range of 20 mm-30 mm. Preferably, the fourth distance de between the centroid O of the projection of the sound production component 11 on the sagittal plane and the centroid Q of the projection of the battery compartment 13 on the sagittal plane may be within a range of 22 mm-28 mm. More preferably, the fourth distance de between the centroid O of the projection of the sound production component 11 on the sagittal plane and the centroid Q of the projection of the battery compartment 13 on the sagittal plane may be within a range of 23 mm-26 mm. Due to the elasticity of the ear hook, the distance between the centroid O of the projection of the sound production component 11 on the sagittal plane and the centroid Q of the projection of the battery compartment 13 on the sagittal plane may vary in the wearing state and the non-wearing state of the earphone. In some embodiments, in the non-wearing state, a third distance d7 between the centroid of the projection of the sound production component 11 on a specific reference plane and the centroid of the projection of the battery compartment 13 on the specific reference plane may be within a range of 16.7 mm-25 mm. Preferably, in the non-wearing state, the third distance d7 between the centroid of the projection of the sound production component 11 on the specific reference plane and the centroid of the projection of the battery compartment 13 on the specific reference plane may be within a range of 18 mm-23 mm. More preferably, in the non-wearing state, the third distance d7 between the centroid of the projection of the sound production component 11 on the specific reference plane and the centroid of the projection of the battery compartment 13 on the specific reference plane may be within a range of 19.6 mm-21.8 mm. In some embodiments, the specific reference plane may be the sagittal plane of the human body or an ear hook plane. In some embodiments, the specific reference plane may be the sagittal plane. At this time, in the non-wearing state, the centroid of the projection of the sound production component on the sagittal plane may be compared to the centroid of the projection of the sound production component on the specific reference plane, and the centroid of the projection of the battery compartment on the sagittal plane may be compared to the centroid of the projection of the battery compartment on the specific reference plane. For example, the non-wearing state may be represented by removing the auricle structure from the human head model, and fixing the sound production component on the human head model in a same posture as the wearing state using a fixing component or adhesive. In some embodiments, the specific reference plane may be the ear hook plane. The ear hook structure may be an arc structure. The ear hook plane may be a plane formed by three most protruding points on the ear hook, i.e., the plane that supports the ear hook when the ear hook is placed freely. For example, when the ear hook is placed on a horizontal plane, the horizontal plane may support the ear hook, and the horizontal plane may be regarded as the ear hook plane. In other embodiments, the ear hook plane also refers to a plane formed by a bisector that bisects or roughly bisects the ear hook along a length extension direction of the ear hook. In the wearing state, although the ear hook plane has a certain angle relative to the sagittal plane, the ear hook may be approximately regarded as fitting the head at this time, and thus the angle may be very small. For ease of calculation and description, it may also be possible to use the ear hook plane as the specific reference plane instead of the sagittal plane.

Taking the specific reference plane as the sagittal plane as an example, the distance between the centroid O of the projection of the sound production component 11 on the sagittal plane and the centroid Q of the projection of the battery compartment 13 on the sagittal plane may vary in the wearing state and the non-wearing state of the earphone 10. A variation value may reflect a softness of the ear hook. When the softness of the ear hook is too large, an overall structure and shape of the earphone 10 may be unstable, and may not provide strong support for the sound production component 11 and the battery compartment 13, the wearing stability may also be poor, and the earphone may be liable to fall off. Considering that the ear hook may be hung at the connection part between the auricle and the head, when the softness of the ear hook is too small, the earphone 10 may not be liable to deform. When the user wears the earphone, the ear hook may closely fit or even press against a region between the ears or the head, affecting the wearing comfort. In order to make the user have better stability and comfort when wearing the earphone 10, in some embodiments, a ratio of a variation value of the distance between the centroid O of the projection of the sound production component 11 on the sagittal plane and the centroid Q of the projection of the battery compartment 13 on the sagittal plane in the wearing state and the non-wearing state of the earphone 10 to the distance between the centroid O of the projection of the sound production component 11 on the sagittal plane and the centroid Q of the projection of the battery compartment 13 on the sagittal plane in the non-wearing state of the earphone may be within a range of 0.3-0.8. Preferably, the ratio of the variation value of the distance between the centroid O of the projection of the sound production component 11 on the sagittal plane and the centroid Q of the projection of the battery compartment 13 on the sagittal plane in the wearing state and the non-wearing state of the earphone 10 to the distance between the centroid O of the projection of the sound production component 11 on the sagittal plane and the centroid Q of the projection of the battery compartment 13 on the sagittal plane in the non-wearing state of the earphone may be within a range of 0.45-0.68.

It should be noted that, the shape and the centroid Q of the projection of the battery compartment 13 on the sagittal plane may be found in the relevant descriptions of the shape and the centroid O of the projection of the sound production component 11 on the sagittal plane in the present disclosure. In addition, the battery compartment 13 and the first portion 121 of the ear hook may be mutually independent structures. The battery compartment 13 and the first portion 121 of the ear hook may be connected in an inserting mode, a clamping mode, etc. The projection of the battery compartment 13 on the sagittal plane may be obtained more accurately by using a splicing point or a splicing line between the battery compartment 13 and the first portion 121 when the projection of the battery compartment 13 is determined.

Figure 17:
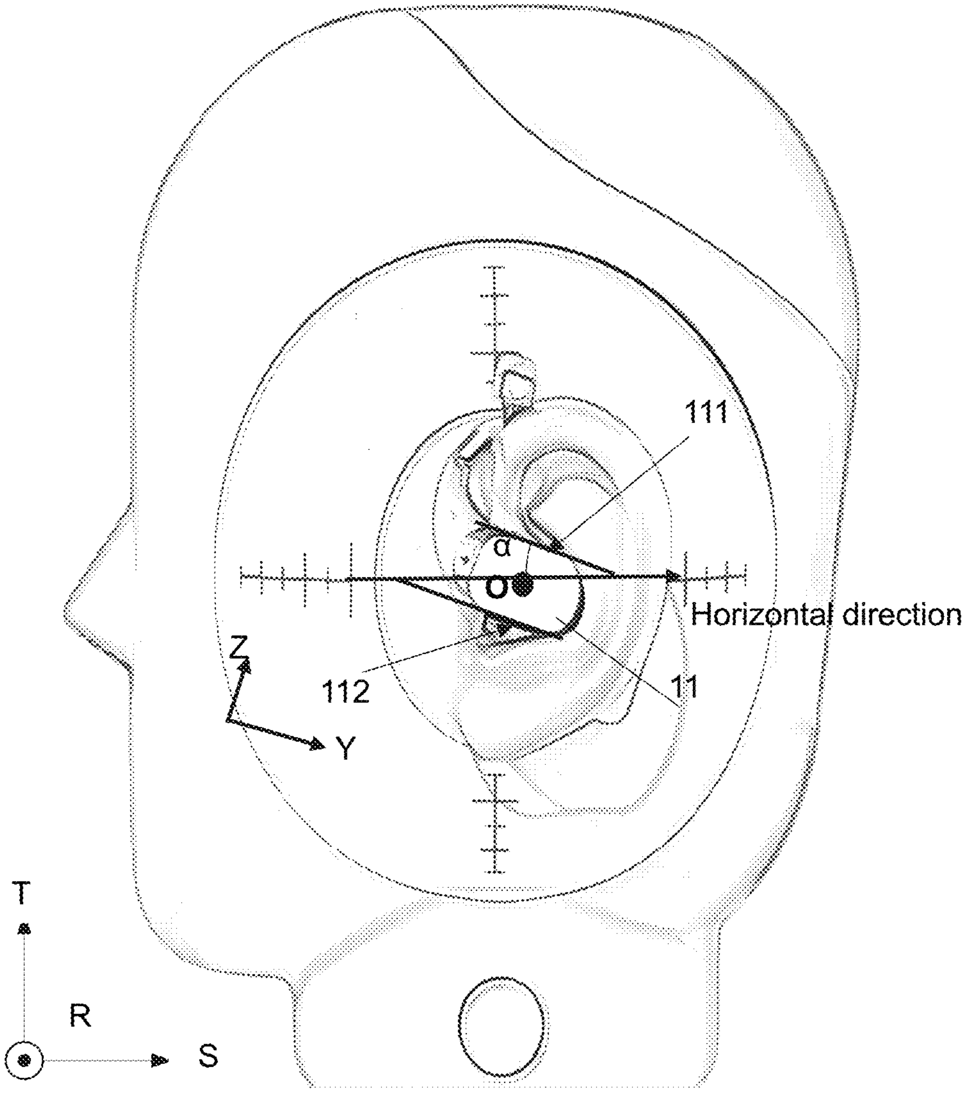
FIG. 17 is a schematic diagram illustrating an exemplary wearing manner of an earphone according to some embodiments of the present disclosure.

In some embodiments, the sound production component 11 may be a cuboid, quasi-cuboid, cylinder, ellipsoid, or other regular or irregular three-dimensional structures. When the sound production component 11 extends into the cavity of auricular concha, as the overall contour of the cavity of auricular concha is an irregular structure similar to an arc, the sound production component 11 may not completely cover or fit the contour of the cavity, thus several gaps may be formed. An overall size of the gaps may be approximately regarded as the opening S of the leakage structure in the quasi-cavity model in FIG. 6. A size of the sound production component 11 fitting or covering the contour of the cavity of auricular concha may be approximately regarded as an unperforated area S0 of the quasi-cavity structure in FIG. 6. As shown in FIG. 7, the larger the relative opening size S/S0, the smaller the listening index. As the larger the relative opening, the more sound components that the contained sound source radiates directly outward, and the less sound reaching the listening position, causing the listening volume to decrease with the increase of the relative opening, which in turn leads to the decrease in the listening index. In some embodiments, while ensuring that the ear canal is not blocked, it may also be necessary to consider that the size of the gaps formed between the sound production component 11 and the cavity of auricular concha may be as small as possible, and an overall volume of the sound production component 11 may not be too large or too small. On the premise that the overall volume or shape of the sound production component 11 is specific, the wearing angle of the sound production component 11 relative to the auricle and the cavity of auricular concha may be considered. For example, when the sound production component 11 is a quasi-cuboid structure and the user wears the earphone 10, and an upper sidewall 111 (also referred to as an upper side) or a lower sidewall 112 (also referred to as a lower side) of the sound production component 11 is parallel or approximately parallel and vertically or approximately vertical (also be understood that a projection of the upper sidewall 111 or the lower sidewall 112 of the sound production component 11 on the sagittal plane is parallel or approximately parallel and vertically or approximately vertical to the sagittal axis) relative to the horizontal plane, a large gap may be formed when the sound production component 11 fits or covers part of the cavity of auricular concha of the ear, which may affect the listening volume of the user. As shown in FIG. 17, In order to make the whole or part of the sound production component 11 extend into the cavity of auricular concha, increase an area of the region of the cavity of auricular concha covered by the sound production component 11, reduce the size of the gap formed between the sound production component 11 and the edge of the cavity of auricular concha, and improve the listening volume at the opening of the ear canal, in some embodiments, in the wearing state of the earphone 10, an inclination angle $\alpha$ between a projection of the upper sidewall 111 or the lower sidewall 112 of the sound production component 11 on the sagittal plane and the horizontal direction may be within a range of 10°-28°. Preferably, in the wearing state of the earphone 10, the inclination angle $\alpha$ between the projection of the upper sidewall 111 or the lower sidewall 112 of the sound production component 11 on the sagittal plane and the horizontal direction may be within a range of 13°-21°. More preferably, in the wearing state of the earphone 10, the inclination angle $\alpha$ between the projection of the upper sidewall 111 or the lower sidewall 112 of the sound production component 11 on the sagittal plane and the horizontal direction may be within a range of 15°-19°. It should be noted that the inclination angle between the projection of the upper sidewall 111 of the sound production component 11 on the sagittal plane and the horizontal direction and the inclination angle between the projection of the lower sidewall 112 of the sound production component 11 on the sagittal plane and the horizontal direction may be the same or different. For example, when the upper sidewall 111 is parallel to the lower sidewall 112 of the sound production component 11, the inclination angle between the projection of the upper sidewall 111 on the sagittal plane and the horizontal direction and the inclination angle between the projection of the lower sidewall 112 on the sagittal plane and the horizontal direction may be the same. As another example, when the upper sidewall 111 is not parallel to the lower sidewall 112 of the sound production component 11, or one of the upper sidewall 111 or the lower sidewall 112 is a planar wall, and the other of the upper sidewall 111 or the lower sidewall 112 is a non-planar wall (e.g., a curved wall), the inclination angle between the projection of the upper sidewall 111 on the sagittal plane and the horizontal direction and the inclination angle between the projection of the lower sidewall 112 on the sagittal plane and the horizontal direction may be different. In addition, when the upper sidewall 111 or the lower sidewall 112 is a curved surface, the projection of the upper sidewall 111 or the lower sidewall 112 on the sagittal plane may be a curved line or a broken line. At this time, the inclination angle between the projection of the upper sidewall 111 on the sagittal plane and the horizontal direction may be an included angle between a tangent line to a point at which the curved line or the broken line has a greatest distance from the ground plane and the horizontal direction, and the inclination angle between the projection of the lower sidewall 111 on the sagittal plane and the horizontal direction may be an included angle between a tangent line to a point at which the curved line or the broken line has a smallest distance from the ground plane and the horizontal direction. In some embodiments, when the upper sidewall 111 or the lower sidewall 112 is the curved surface, a tangent line parallel to the long axis direction Y on the projection may also be selected, and an included angle between the tangent line and the horizontal direction may be used to represent the inclination angle between the projection of the upper sidewall 111 or the lower sidewall 112 on the sagittal plane and the horizontal direction.

It should be noted that one end of the sound production component 11 in the embodiments of the present disclosure may be connected to the second portion 122 of the suspension structure. The end may be referred to as a fixed end. An end of the sound production component 11 away from the fixed end may be referred to as a free end or an end. The end of the sound production component 11 may face the first portion 121 of the ear hook. In the wearing state, the suspension structure 12 (e.g., the ear hook) may have an upper vertex (e.g., an upper vertex T1 in FIG. 16B), i.e., a position with a highest distance relative to the horizontal plane. The upper vertex T1 may be close to a connection part between the first portion 121 and the second portion 122. The upper sidewall may be a sidewall of the sound production component 11 (e.g., the upper sidewall 111 in FIG. 16B and FIG. 17) other than the fixed end and the end, a center point (e.g., a geometric center point) of which has a least distance from the upper vertex of the ear hook in the vertical axis direction. Correspondingly, the lower sidewall may be a sidewall opposite to the upper sidewall of the sound production component 11, i.e., a sidewall of sound production component 11 (e.g., the lower sidewall 112 in FIG. 16B and FIG. 17) other than the fixed end and the end, a center point (e.g., the geometric center point) of which has a greatest distance from the upper vertex of the ear hook in the vertical axis direction.

Figure 18:
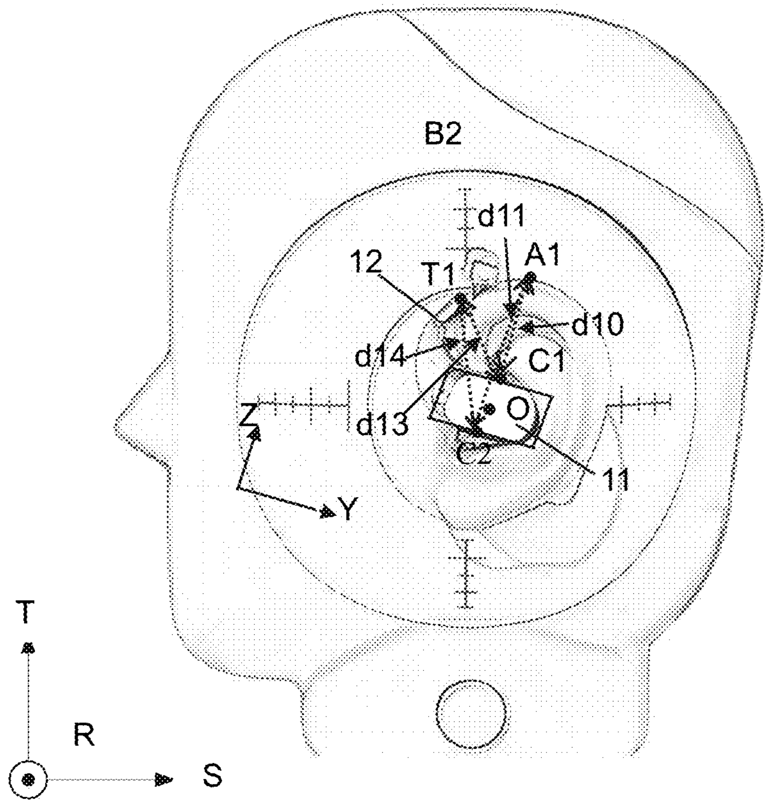
FIG. 18 is a schematic diagram illustrating an exemplary wearing manner of an earphone according to some embodiments of the present disclosure.

The whole or part structure of the sound production component 11 may extend into the cavity of auricular concha to form the quasi-cavity structure as shown in FIG. 4. The listening volume when the user wears the earphone 10 may be related to the size of the gap formed between the sound production component 11 and the edge of the cavity of auricular concha. The smaller the size of the gap, the greater the listening volume at the opening of the ear canal of the user. The size of the gap formed between the sound production component 11 and the edge of the cavity of auricular concha may not only be related to the inclination angle between the projection of the upper sidewall 111 or the lower sidewall 112 of the sound production component 11 on the sagittal plane and the horizontal plane, but also be related to the size of the sound production component 11. For example, if the size of the sound production component 11 (especially the size along the short axis direction Z in FIG. 12) is too small, the gap formed between the sound production component 11 and the edge of the cavity of auricular concha may be too large, affecting the listening volume at the opening of the ear canal of the user. When the size of the sound production component 11 (especially the size along the short axis direction Z in FIG. 12) is too large, the sound production component 11 may have few parts extending into the cavity of auricular concha, or the sound production component 11 may completely cover the cavity of auricular concha. At this time, the opening of the ear canal may be equivalent to being blocked, the connection between the opening of the ear canal and the external environment may not be realized, and the original design intention of the earphone may not be achieved. In addition, the excessively large size of the sound production component 11 may affect the wearing comfort of the user and the convenience of carrying around. As shown in FIG. 18, a ratio of a distance between a midpoint of the projection of the upper sidewall 111 and the lower sidewall 112 of the sound production component 11 on the sagittal plane and a highest point of the second projection to a distance between the centroid O of the first projection and the highest point of the second projection may reflect the size of the sound production component 11 along the short axis direction Z (the direction indicated by an arrow Z in FIG. 18) and a position of the sound production component 11 relative to the cavity of auricular concha. For example, when the size of the sound production component 11 along the short axis direction Z is a fixed value, the farther the sound production component 11 away from the auricle, the larger a ratio of a distance between a midpoint C1 of the projection of the upper sidewall 111 of the sound production component 11 on the sagittal plane and a highest point A1 of the second projection to a distance between the centroid O of the first projection and the highest point A1 of the second projection, and the smaller a ratio of a distance between a midpoint C2 of the projection of the lower sidewall 112 of the sound production component 11 on the sagittal plane and the highest point A1 of the second projection to the distance between the centroid O of the first projection and the highest point A1 of the second projection. Similarly, when the distance between the centroid O of the first projection of the sound production component 11 and the highest point A1 of the second projection of the auricle is a fixed value, the larger the size of the sound production component 11 along the short axis direction Z, the smaller the ratio of the distance between the midpoint C1 of the projection of the upper sidewall 111 of the sound production component 11 on the sagittal plane and the highest point A1 of the second projection to the distance between the centroid O of the first projection and the highest point A1 of the second projection, and the larger the ratio of the distance between the midpoint C2 of the projection of the lower sidewall 112 of the sound production component 11 on the sagittal plane and the highest point A1 of the second projection to the distance between the centroid O of the first projection and the highest point A1 of the second projection. In order to improve the listening effect of the earphone 10 while ensuring that the earphone 10 does not block the opening of the ear canal of the user, in some embodiments, taking the upper sidewall 111 of the sound production component 11 as a reference for description, the ratio of the distance between the midpoint C1 of the projection of the upper sidewall 111 of the sound production component 11 on the sagittal plane and the highest point A1 of the second projection to the distance between the centroid O of the first projection and the highest point A1 of the second projection may be within a range of 0.75-0.9; or taking the lower sidewall 112 of the sound production component 11 as a reference for description, the ratio of the distance between the midpoint C2 of the projection of the lower sidewall 112 of the sound production component 11 on the sagittal plane and the highest point A1 of the second projection to the distance between the centroid O of the first projection and the highest point A1 of the second projection may be within a range of 1.1-1.35. Preferably, the ratio of the distance between the midpoint C1 of the projection of the upper sidewall 111 of the sound production component 11 on the sagittal plane and the highest point A1 of the second projection to the distance between the centroid O of the first projection and the highest point A1 of the second projection may be within a range of 0.78-0.85, or the ratio of the distance between the midpoint C2 of the projection of the lower sidewall 112 of the sound production component 11 on the sagittal plane and the highest point A1 of the second projection to the distance between the centroid O of the first projection and the highest point A1 of the second projection may be within a range of 1.15-1.3. By adjusting the ratio of the distance between the midpoint C1 of the projection of the upper sidewall 111 of the sound production component 11 on the sagittal plane and the highest point A1 of the second projection to the distance between the centroid O of the first projection and the highest point A1 of the second projection, or the ratio of the distance between the midpoint C2 of the projection of the lower sidewall 112 of the sound production component 11 on the sagittal plane and the highest point A1 of the second projection to the distance between the centroid O of the first projection and the highest point A1 of the second projection, the distance between the sound guiding hole of the sound production component and the opening of the ear canal may be further reduced on the premise of ensuring that the sound production component does not cover the opening of the ear canal as much as possible, thereby ensuring a good listening effect at the opening of the ear canal of the user and the open state of the opening of the ear canal to access to the sound information in the external environment.

In some embodiments, the distance between the midpoint of the projection of the upper sidewall 111 and the lower sidewall 112 of the sound production component 11 on the sagittal plane and the highest point of the second projection may also reflect the size of the sound production component 11 along the short axis direction Z (indicated by the arrow Z shown in FIG. 18) and the position of the sound production component 11 relative to the cavity of auricular concha. In order to improve the listening effect of the earphone 10 while ensuring that the earphone 10 does not block the opening of the ear canal of the user, in some embodiments, a distance d10 between midpoint C1 of the projection of the upper sidewall 111 of the sound production component 11 on the sagittal plane and the highest point A1 of the second projection may be within a range of 20 mm-38 mm, and a distance d11 between the midpoint C2 of the projection of the lower sidewall 112 of the sound production component 11 on the sagittal plane and the highest point A1 of the second projection may be within a range of 32 mm-57 mm. Preferably, the distance d10 between the midpoint C1 of the projection of the upper sidewall 111 of the sound production component 11 on the sagittal plane and the highest point A1 of the second projection may be within a range of 24 mm-36 mm, and the distance d11 between the midpoint C2 of the projection of the lower sidewall 112 of the sound production component 11 on the sagittal plane and the highest point A1 of the second projection may be within a range of 36 mm-54 mm. More preferably, the distance between the midpoint C1 of the projection of the upper sidewall 111 of the sound production component 11 on the sagittal plane and the highest point A1 of the second projection may be within a range of 27 mm-34 mm, and the distance between the midpoint C2 of the projection of the lower sidewall 112 of the sound production component 11 on the sagittal plane and the highest point A1 of the second projection may be within a range of 38 mm-50 mm. It should be noted that, when the projection of the upper sidewall 111 of the sound production component 11 on the sagittal plane is the curved line or the broken line, the midpoint C1 of the projection of the upper sidewall 111 of the sound production component 11 on the sagittal plane may be selected by a following exemplary. A line segment may be drawn by selecting two farthest points on the projection of the upper sidewall 111 on the sagittal plane along the long axis direction, a mid-perpendicular line may be drawn by selecting a midpoint on the line segment, and an intersecting point of the mid-perpendicular line and the projection may be the midpoint of the projection of the upper sidewall 111 of the sound production component 11 on the sagittal plane. In some alternative embodiments, a point of the projection of the upper sidewall 111 on the sagittal plane with a smallest distance from the highest point of the second projection may be selected as the midpoint C1 of the projection of the upper sidewall 111 of the sound production component 11 on the sagittal plane. The midpoint of the projection of the lower sidewall 112 of the sound production component 11 on the sagittal plane may be selected in the same manner as above. For example, a point of the projection of the lower sidewall 112 on the sagittal plane with a greatest distance from the highest point of the second projection may be selected as the midpoint C2 of the projection of the lower sidewall 112 of the sound production component 11 on the sagittal plane.

In some embodiments, the distance between the midpoint of the projection of the upper sidewall 111 and the lower sidewall 112 of the sound production component 11 on the sagittal plane and the projection of the upper vertex of the ear hook on the sagittal plane may reflect the size of the sound production component 11 along the short axis direction Z (the direction indicated by the arrow Z in FIG. 3). The upper vertex of the ear hook may be a position on the ear hook that has a greatest distance relative to a specific point on the neck of the user in the vertical axis direction when the user wears the earphone, e.g., the upper vertex T1 in FIG. 10B. In order to improve the listening effect of the earphone 10 while ensuring that the earphone 10 does not block the opening of the ear canal of the user, in some embodiments, a distance d13 between the midpoint C1 of the projection of the upper sidewall 111 of the sound production component 11 on the sagittal plane and the projection of the upper vertex T1 of the ear hook on the sagittal plane may be within a range of 17 mm-36 mm, and a distance d14 between the midpoint C2 of the projection of the lower sidewall 112 of the sound production component 11 on the sagittal plane and the projection of the upper vertex of the ear hook on the sagittal plane may be within a range of 28 mm-52 mm. Preferably, the distance d13 between the midpoint C1 of the projection of the upper sidewall 111 of the sound production component 11 on the sagittal plane and the projection of the upper vertex T1 of the ear hook on the sagittal plane may be within a range of 21 mm-32 mm, and the distance d14 between the midpoint C2 of the projection of the lower sidewall 112 of the sound production component 11 on the sagittal plane and the projection of the upper vertex T1 of the ear hook on the sagittal plane may be within a range of 32 mm-48 mm. More preferably, the distance d13 between the midpoint C1 of the projection of the upper sidewall 111 of the sound production component 11 on the sagittal plane and the projection of the upper vertex T1 of the ear hook on the sagittal plane may be within a range of 24 mm-30 mm, and the distance d14 between the midpoint C2 of the projection of the lower sidewall 112 of the sound production component 11 on the sagittal plane and the projection of the upper vertex T1 of the ear hook on the sagittal plane may be within a range of 35 mm-45 mm.

In some embodiments, the distance between the centroid O of the first projection and the projection of the upper vertex T1 of the ear hook on the sagittal plane may also reflect the size of the sound production component 11 along the short axis direction Z. In order to improve the listening effect of the earphone 10 while ensuring that earphone 10 does not block the opening of the ear canal of the user, in some embodiments, the distance between the centroid O of the first projection and the projection of the upper vertex T1 of the ear hook on the sagittal plane may be within a range of 29 mm-38 mm. Preferably, the distance between the centroid O of the first projection and the projection of the upper vertex T1 of the ear hook on the sagittal plane may be within a range of 32 mm-36 mm. By adjusting the distance between the centroid O of the first projection and the projection of the upper vertex T1 of the ear hook on the sagittal plane, the distance between the sound guiding hole of the sound production component and the opening of the ear canal may be further reduced on the premise of ensuring that the sound production component does not cover the opening of the ear canal as much as possible, thereby ensuring a good listening effect at the opening of the ear canal of the user and the open state of the opening of the ear canal to access to the sound information in the external environment. Because the ear hook is an elastic structure, the distance between the centroid O of the first projection and the projection of the upper vertex T1 of the ear hook on the sagittal plane in the non-wearing state may be smaller relative to the distance between the centroid O of the first projection and the projection of the upper vertex T1 of the ear hook on the sagittal plane in the wearing state. In some embodiments, the distance between the centroid O of the first projection and the projection of the upper vertex T1 of the ear hook on the sagittal plane may be within a range of 27 mm-36 mm in the non-wearing state. Preferably, the distance between the centroid O of the first projection and the projection of the upper vertex T1 of the ear hook on the sagittal plane may be within a range of 29 mm-35 mm in the non-wearing state. More preferably, the distance between the centroid O of the first projection and the projection of the upper vertex T1 of the ear hook on the sagittal plane may be within a range of 30 mm-34 mm in the non-wearing state. The technical effects regarding the distance between the centroid O of the first projection and the projection of the upper vertex T1 of the ear hook on the sagittal plane may refer to the relevant descriptions in the wearing state. It should be noted that the distance between the centroid O of the first projection and the projection of the upper vertex T1 of the ear hook on the sagittal plane in the non-wearing state may be measured by removing the auricle structure from the human head model as referred to in the present disclosure, and using a fixing member or adhesive to fix the sound production component to the human head model in the same posture as in the wearing state for measurement.

Figure 19A:
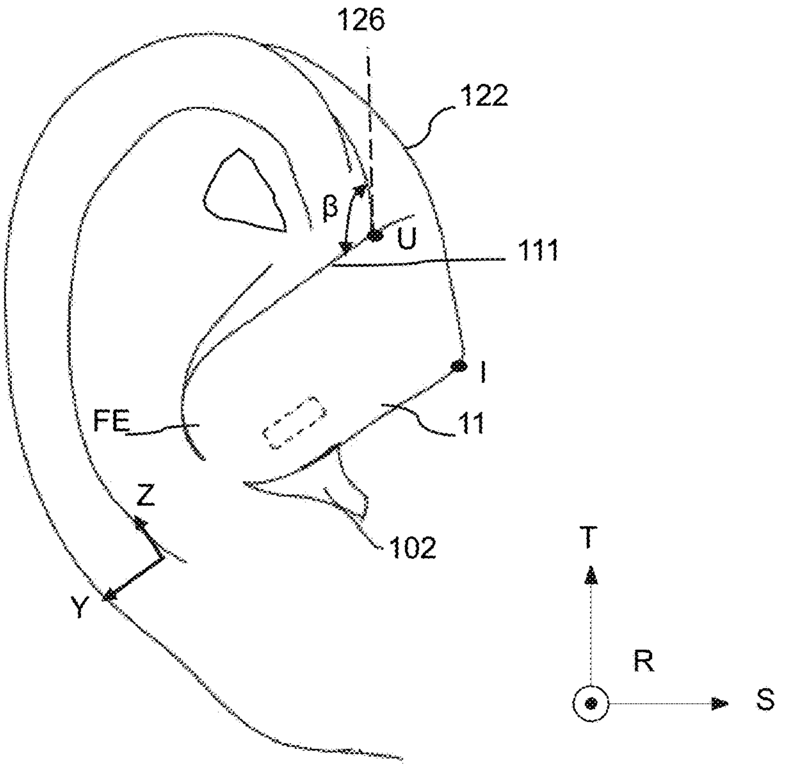
FIG. 19A is a schematic diagram illustrating an exemplary wearing manner of an earphone according to some embodiments of the present disclosure.
Figure 19B:
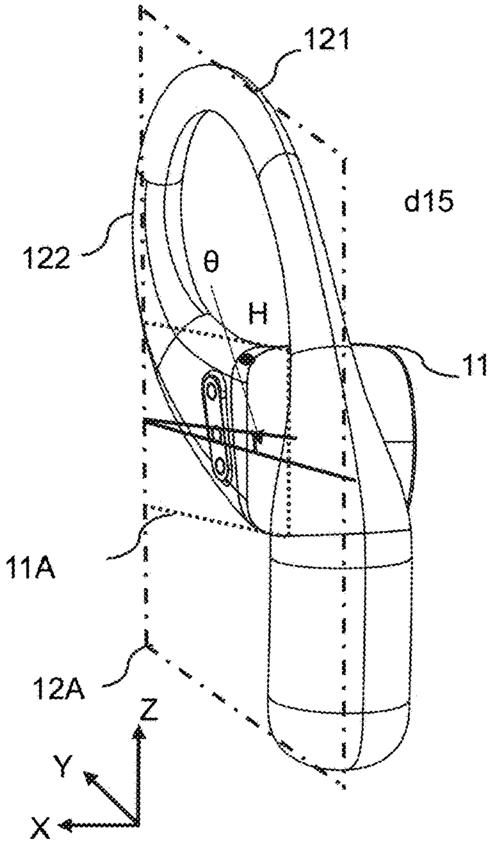
FIG. 19B is a schematic structural diagram illustrating an earphone in a non-wearing state according to some embodiments of the present disclosure.

FIG. 19A is a schematic diagram illustrating an exemplary wearing manner of an earphone according to some embodiments of the present disclosure. FIG. 19B is a schematic structural diagram illustrating an earphone in a non-wearing state according to some embodiments of the present disclosure.

Referring to FIG. 14A, in some embodiments, when the user wears the earphone, part or the whole structure of the sound production component may extend into the cavity of auricular concha, and a certain included angle may be formed between the upper sidewall 111 of the sound production component 11 and the second portion 122 of the ear hook. The included angle may be expressed by an included angle β between a tangent line 126 of the projection of the upper sidewall 111 of the sound production component 11 on the sagittal plane and a tangent line 126 of a projection of a connection part between the second portion 122 of the ear hook and the upper sidewall 111 of the sound production component 11 on the sagittal plane. Specifically, the upper sidewall of the sound production component 11 and the second portion 122 of the ear hook may have the connection part. The projection of the connection part on the sagittal plane may be a point U. The tangent line 126 of the projection of the second portion 122 of the ear hook may be drawn through the point U. When the upper sidewall 111 is the curved surface, the projection of the upper sidewall 111 on the sagittal plane may be the curved line or the broken line. At this time, the included angle between the projection of the upper sidewall 111 on the sagittal plane and the tangent line 126 may be an included angle between a tangent line to a point at which the curved line or the broken line has a greatest distance from the ground plane and the tangent line 126. In some embodiments, when the upper sidewall 111 is the curved surface, a tangent line parallel to the long axis direction Y on the projection may also be selected. An included angle between the tangent line and the horizontal direction may represent an inclination angle between the projection of the upper sidewall 111 on the sagittal plane and the tangent line 126. In some embodiments, the included angle β may be within a range of 100°-150°. Preferably, the included angle β may be within a range of 110°-150°. More preferably, the included angle β may be within a range of 110°-140°. Further preferably, the included angle β may be within a range of 120°-135°

The human head is approximately regarded as a quasi-sphere structure, and the auricle is a structure that protrudes relative to the head. When the user wears the earphone, part of the ear hook 12 may be attached to the head of the user. In order to make the sound production component 11 extend into the cavity of auricular concha 102, a certain inclination angle may be formed between the sound production component 11 and the ear hook plane. The inclination angle may be represented by an included angle between a plane corresponding to the sound production component 11 and the ear hook plane. In some embodiments in the present disclosure, the ear hook plane refers to a plane (e.g., a plane where the dotted line 12A in FIG. 14B is located) formed by a bisector that bisects or roughly bisects the ear hook 12 along a length extension direction of the ear hook 12. In some embodiments, the ear hook plane may also be a plane formed by the three most protruding points on the ear hook, i.e., a plane that supports the ear hook when the ear hook is placed freely (without external force). For example, when the ear hook is placed on a horizontal plane, the horizontal plane may support the ear hook, and the horizontal plane may be regarded as the ear hook plane. In some embodiments, the plane 11A corresponding to the sound production component 11 may include a sidewall (also referred to as an inner side) of the sound production component 11 facing the front outer side of the auricle of the user, or a sidewall (also referred to as an outer side) away from the front outer side of the auricle of the user. When the sidewall of the sound production component 11 facing the front outer side of the auricle of the user or the sidewall of the sound production component 11 away from the front outer side of the auricle of the user is a curved surface, the plane corresponding to the sound production component 11 refers to a tangent plane corresponding to the curved surface at a center position, or a plane approximately coinciding with a curve enclosed by a contour of an edge of the curved surface. Taking the sound production component 11 facing the plane 11A where the sidewall of the front outer side of the auricle of the user is located as an example, the included angle θ formed between the plane 11A and the ear hook plane 12A may be the inclination angle θ of the sound production component 11 relative to the ear hook plane. In some embodiments, the included angle θ may be measured by the following exemplary method. The projection of the sidewall (hereinafter referred to as the inner side) of the sound production component 11 close to the ear hook 12 on an X-Y plane and the projection of the ear hook 12 on the X-Y plane may be obtained along the short axis direction Z, respectively. A first straight line may be drawn by selecting two most protruding points of a side of the projection of the ear hook 12 on the X-Y plane close to (or away from) the projection of the inner side of the sound production component 11 on the X-Y plane. When the projection of the inner side of the sound production component 11 on the XY plane is a straight line, an included angle between the first straight line and the projection of the inner side on the X-Y plane may be the included angle θ. When the inner side of the sound production component 11 is the curved line, the included angle between the first straight line and the long axis direction Y may be approximately regarded as the included angle θ. It should be noted that the inclination angle θ of the sound production component 11 relative to the ear hook plane in both the wearing state and the non-wearing state of the earphone may be measured using the method. The difference lies in that in the non-wearing state, the inclination angle θ may be directly measured using the method; in the wearing state, the inclination angle θ may be measured using the method when the earphone is worn on the human head model or an ear model. Considering that if the angle is too large, the contact area between the sound production component 11 and the front outer side of the auricle of the user may be small, which may not provide sufficient contact resistance, and the earphone may be prone to fall off when the user wears the earphone. In addition, the size of the gap formed in the quasi-cavity structure between the sound production component 11 and the cavity of auricular concha 102 of the user may be too large, which may affect the listening volume at the opening of the ear canal of the user. If the angle is too small, the sound production component 11 may not effectively extend into the cavity of auricular concha when the user wears the earphone. In order to ensure that the user has a better listening effect when wearing the earphone 10 and ensure the wearing stability, in some embodiments, when the earphone is in the wearing state, the inclination angle θ of the sound production component 11 relative to the ear hook plane may be within a range of 15°-28°. Preferably, the inclination angle θ of the sound production component 11 relative to the ear hook plane may be within a range of 16°-25°. More preferably, the inclination angle θ of the sound production component 11 relative to the ear hook plane may be within a range of 18°-23°.

Due to the elasticity of the ear hook, the inclination angle of the sound production component 11 relative to the ear hook plane 12A may vary to a certain extent in the wearing state and the non-wearing state. For example, the inclination angle in the non-wearing state may be smaller than that in the wearing state. In some embodiments, when the earphone is in the non-wearing state, the inclination angle of the sound production component 11 relative to the ear hook plane may be within a range of 15°-23°, and the ear hook of the earphone 10 may produce a certain clamping force on the ear of the user when the earphone 10 is in the wearing state, thereby improving the wearing stability for the user without affecting the wearing experience of the user. Preferably, in the non-wearing state, the inclination angle of the sound production component 11 relative to the ear hook plane 12A may be within a range of 16.5°-21°. More preferably, in the non-wearing state, the inclination angle of the sound production component 11 relative to the ear hook plane 12A may be within a range of 18°-20°.

When the size of the sound production component 11 in the thickness direction X is too small, a volume of the front cavity and the rear cavity formed by the diaphragm and the housing of the sound production component 11 may be too small, a vibration amplitude of the vibration may be limited, and a large sound volume may not be provided. When the size of the sound production component 11 in the thickness direction X is too large, the end FE of the sound production component 11 may not completely abut against the edge of the cavity of auricular concha 102 in the wearing state, causing the earphone to easily fall off. A sidewall of the sound production component 11 facing the ear of the user in the coronal axis direction may have an inclination angle relative to the ear hook plane. A distance between a point on the sound production component 11 farthest from the ear hook plane and the ear hook plane may be the size of the sound production component 11 in the thickness direction X. As the sound production component 11 is arranged obliquely relative to the ear hook plane, the point on the sound production component 11 farthest from the ear hook plane refers to an intersecting point I of the fixed end connected to the ear hook, the lower sidewall, and the outer side of the sound production component 11. Further, the extent to which the sound production component 11 extends into the cavity of auricular concha 11 may be determined by the distance between a point on the sound production component 11 closest to the ear hook plane and the ear hook plane. It may ensure the size of the gap formed between the sound production component 11 and the cavity of auricular concha is small and the wearing comfort for the user by setting the distance between the point on the sound production component 11 closest to the ear hook plane and the ear hook plane to be within an appropriate range. The point on the sound production component 11 closest to the ear hook plane refers to an intersecting point H of the end FE, the upper sidewall, and the inner side of the sound production component 11. In some embodiments, in order to ensure that the sound production component 11 has a better acoustic output effect and the wearing stability and comfort, when the earphone is in the wearing state, the distance between a point I on the sound production component 11 farthest from the ear hook plane 12A and the ear hook plane 12A may be within a range of 11.2 mm-16.8 mm, and the distance between a point H on the sound production component 11 closest to the ear hook plane 12A and the ear hook plane 12A may be within a range of 3 mm-5.5 mm. Preferably, the distance between the point I on the sound production component 11 farthest from the ear hook plane 12A and the ear hook plane 12A may be within a range of 12 mm-15.6 mm, and the distance between the point H on the sound production component 11 closest to the ear hook plane 12A and the ear hook plane 12A may be within a range of 3.8 mm-5 mm. More preferably, the distance between the point I on the sound production component 11 farthest from the ear hook plane 12A and the ear hook plane 12A may be within a range of 13 mm-15 mm, and the distance between the point H on the sound production component 11 closest to the ear hook plane 12A and the ear hook plane 12A may be within a range of 4 mm-5 mm.

Figure 20:
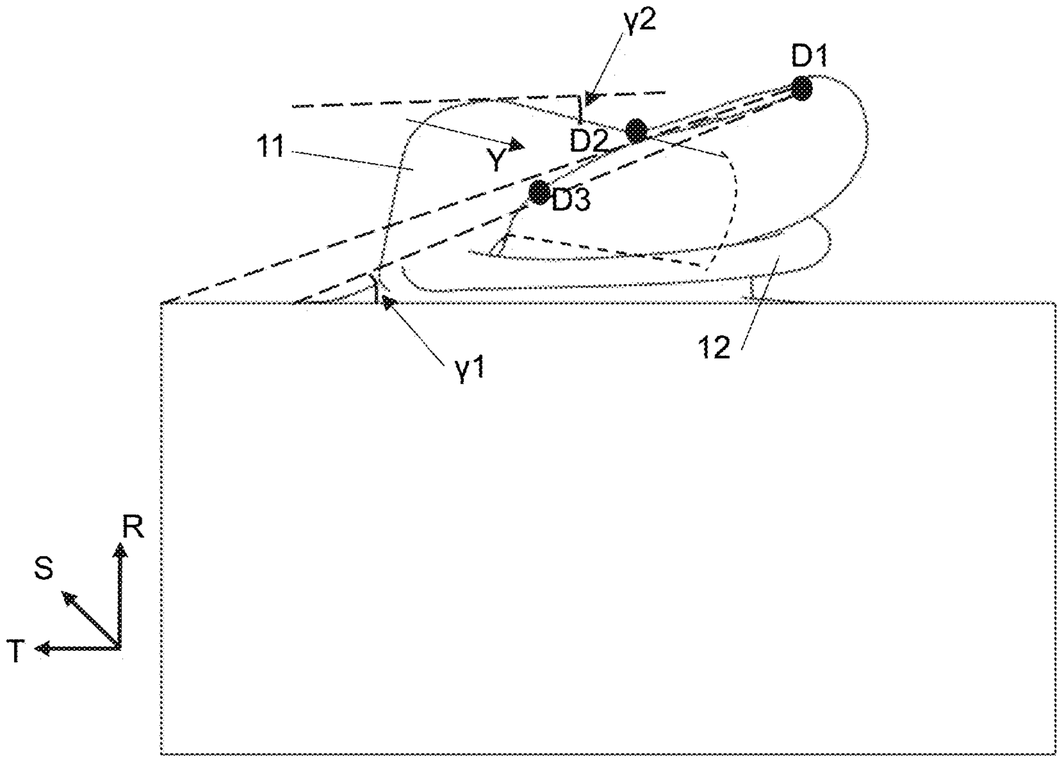
FIG. 20 is a schematic diagram illustrating an exemplary wearing manner of an earphone according to some other embodiments of the present disclosure.

FIG. 20 is a schematic diagram illustrating an exemplary wearing manner of an earphone according to some embodiments of the present disclosure.

Referring to FIG. 15, in some embodiments, when the earphone is in the wearing state, at least part of the sound production component 11 of the earphone may extend into the cavity of auricular concha of the user to ensure the acoustic output effect of the sound production component 11 while improving the wearing stability of the earphone through the force exerted by the cavity of auricular concha on the sound production component 11. At this time, the sidewall of the sound production component 11 away from the head of the user or facing the opening of the ear canal of the user may have a certain inclination angle relative to an auricle surface of the user. It should be noted that the sidewall of the sound production component 11 away from the head of the user or facing the opening of the ear canal of the user may be a plane or a curved surface. When the sidewall is the curved surface, the inclination angle of the sidewall of the sound production component 11 away from the head of the user or facing the opening of the ear canal of the user relative to the auricle surface of the user may be represented by an inclination angle of a tangent plane (or a plane roughly coincides with a curve formed by an edge contour of the curved surface) corresponding to the curved surface at a center position relative to the auricle surface of the user. It should be noted that in some embodiments of the present disclosure, the auricle surface of the user refers to a plane (e.g., a plane on which points D1, D2, and D3 are located in FIG. 15) on which three points farthest from the sagittal plane of the user are located in different regions (e.g., the top region of the auricle, the tragus region, and the antihelix) on the auricle of the user.

As the projection of the sound production component 11 on the sagittal plane is much smaller than the projection of the auricle on the sagittal plane, and the cavity of auricular concha is concave in the structure of the auricle, when the inclination angle of the sound production component 11 relative to the auricle surface is small, e.g., when the sidewall of the sound production component 11 away from the head of the user or facing the opening of the ear canal of the user is approximately parallel to the auricle surface, the sound production component 11 may not extend into the cavity of auricular concha, or the size of the gap of the quasi-cavity structure formed between the sound production component 11 and the cavity of auricular concha may be very large, and the user may not obtain a good listening effect when wearing the earphone. Meanwhile, the sound production component 11 may not abut against the edge of the cavity of auricular concha, and the earphone may be liable to fall off when the user wears the earphone. When the inclination angle of the sound production component 11 relative to the auricle surface is large, the sound production component 11 may excessively extend into the cavity of auricular concha and squeeze the ear of the user, and the user may feel a strong sense of discomfort after wearing the earphone for a long time. In order to make the user experience a better acoustic output effect when wearing the earphone and ensure the wearing stability and comfort, the inclination angle of the sidewall of the sound production component 11 away from the head of the user or facing the opening of the ear canal of the user relative to the auricle surface of the user may be within a range of 40°-60°. Part of or the whole structure of the sound production component 11 may extend into the cavity of auricular concha of the user. At this time, the sound production component 11 may have relatively good acoustic output quality, and the contact force between the sound production component 11 and the ear canal of the user may be relatively moderate, thereby achieving more stable wearing relative to the ear of the user, and making the user have a more comfortable wearing experience. Preferably, in some embodiments, in order to further optimize the acoustic output quality and the wearing experience of the earphone in the wearing state, the inclination angle of the sound production component 11 relative to the auricle surface may be controlled to be within a range of 42°-55°. More preferably, in some embodiments, in order to further optimize the acoustic output quality and the wearing experience of the earphone in the wearing state, the inclination angle of the sound production component 11 relative to the auricle surface may be controlled to be within a range of 44°-52°.

It should be noted that referring to FIG. 15, the auricle surface may be inclined upward relative to the sagittal plane, and the inclination angle between the auricle surface and the sagittal plane may be $\gamma 1$. In order to make the end of the sound production component 11 extend into the cavity of auricular concha concave relative to the auricle, the outer side or the inner side of the sound production component 11 may be inclined downward relative to the sagittal plane. The inclination angle between the outer side or the inner side of the sound production component 11 and the sagittal plane may be $\gamma 2$. An included angle between the sound production component 11 and the auricle surface may be a sum of the inclination angle $\gamma 1$ between the auricle surface and the sagittal plane and the inclination angle $\gamma 2$ between the long axis direction Y of the sound production component 11 and the sagittal plane. That is to say, the inclination angle of the outer side or the inner side of the sound production component 11 relative to the auricle surface of the user may be determined by calculating the inclination angle $\gamma 1$ between the auricle surface and the sagittal plane, and the inclination angle $\gamma 2$ between the outer side or the inner side of the sound production component 11 and the sagittal plane. The inclination angle between the outer side or the inner side of the sound production component 11 and the sagittal plane may be approximately regarded as the inclination angle between the long axis direction Y of the sound production component 11 and the sagittal plane. In some embodiments, the inclination angle may also be calculated by an included angle between a projection of the auricle surface on a plane formed by a T-axis and an R-axis (hereinafter referred to as a T-R plane) and a projection of the outer side or the inner side of the sound production component 11 on the T-R plane. When the outer side or the inner side of the sound production component 11 is a plane, the projection of the outer side or the inner side of the sound production component 11 on the T-R plane may be a straight line. An included angle between the straight line and the projection of the auricle surface on the T-R plane may be the inclination angle of the sound production component 11 relative to the auricle surface. When the outer side or the inner side of the sound production component 11 is a curved surface, the inclination angle of the sound production component 11 relative to the auricle surface may be approximately regarded as the included angle between the long axis direction Y of the sound production component 11 and the projection of the auricle surface on the T-R plane.

It should be noted that a position relationship between the sound production component 11 and the auricle or the cavity of auricular concha in the embodiments of the present may be determined by a following exemplary method. First, at a specific position, an image of a human head model with ears may be taken in a direction facing the sagittal plane, the edge of the cavity of auricular concha, the contour of the opening of the ear canal, and the contour of the auricle (e.g., inner and outer contours) may be marked, which may be regarded as the projection contours of various structures of the ear on the sagittal plane; then at the specific position, an image of the earphone worn on the human head model may be taken at a same angle, and the contour of the sound production component may be marked, which may be regarded as the projection of the sound production component on the sagittal plane. The position relationship between the sound production component (e.g., the centroid, the end, etc.) and the edge of the cavity of auricular concha, the opening of the ear canal, and the inner and outer contours may be determined through comparative analysis.

FIGS. 3-20 and the related descriptions illustrated above may be related to the sound production component whose whole or part of the structure extends into the cavity of auricular concha when the earphone is in the wearing state. In some embodiments, the sound production component may also not extend into the cavity of auricular concha. For example, at least part of the sound production component 11 shown in FIG. 14 may cover the antihelix region. As another example, the sound production component 11 shown in FIG. 16E may not cover the antihelix region, and the sound production component 11 may be arranged to be suspended relative to the cavity of auricular concha. The following specific illustrations may be provided combined with FIGS. 21-27B.

Figure 21:
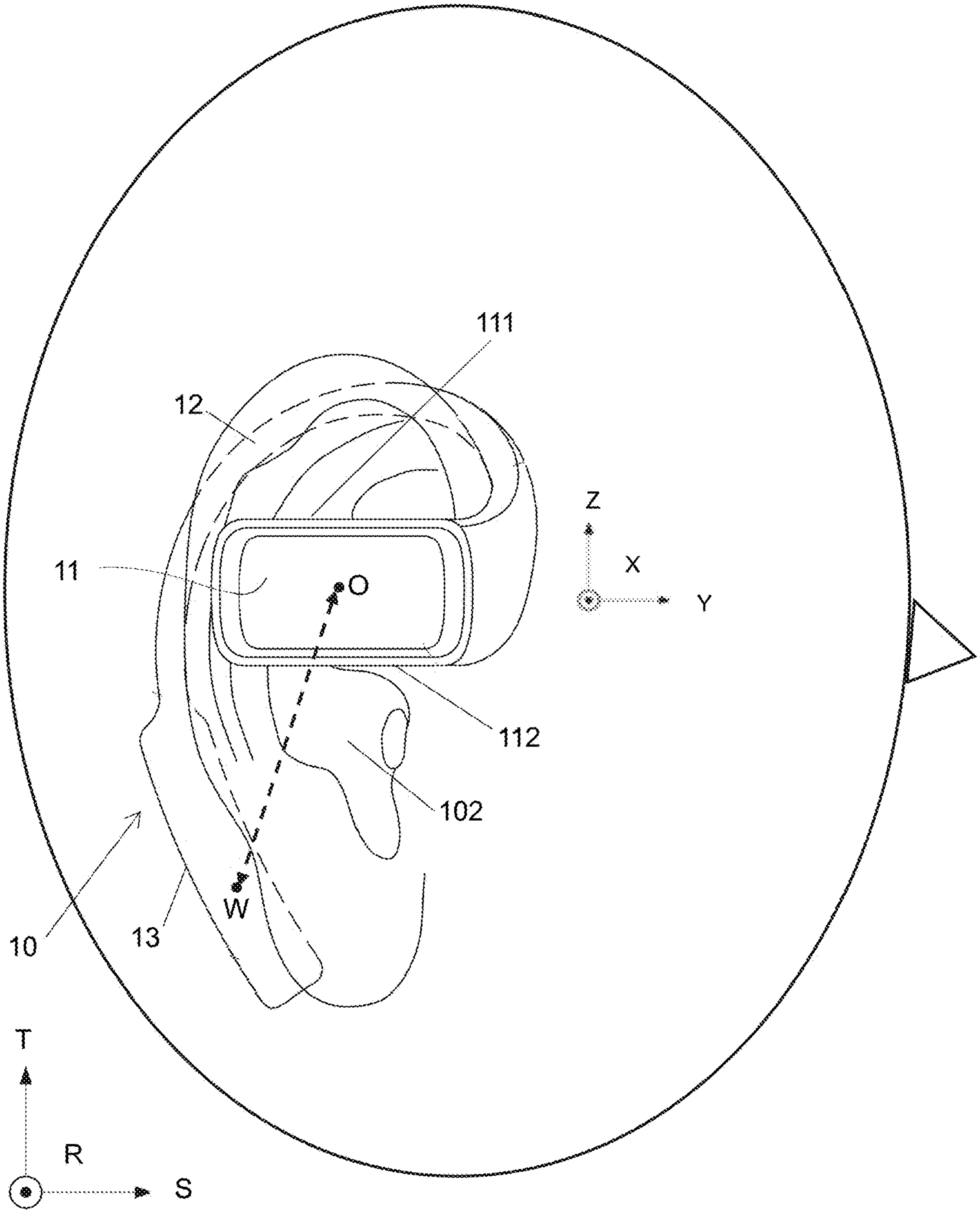
FIG. 21 is a schematic diagram illustrating an exemplary wearing manner that a sound production component of an earphone covers an antihelix region according to some embodiments of the present disclosure.

FIG. 21 is a schematic diagram illustrating an exemplary wearing manner of an earphone according to some embodiments of the present disclosure. Referring to FIG. 21, in some embodiments, when the earphone is in the wearing state, at least part of the sound production component 11 may cover the antihelix region of the user. The antihelix region may include any one or more of the antihelix 105, the superior crura of antihelix 110, and the inferior crura of antihelix 111 in FIG. 1. At this time, the sound production component 11 may be located above the cavity of auricular concha 102 and the opening of the ear canal, and the opening of the ear canal of the user may be in an open state. In some embodiments, the housing of the sound production component 11 may include at least a sound guiding hole and a pressure relief hole. The sound guiding hole may be acoustically coupled with a front cavity of the earphone 10, and the pressure relief hole may be acoustically coupled with a rear cavity of the earphone 10. The sound output from the sound guiding hole and the sound output from the pressure relief hole may be approximately regarded as two sound sources. The sounds of the two sound sources may have anti-phases to form a dipole. When the user wears the earphone, the sound guiding hole may be located on a sidewall of the sound production component 11 toward or close to the opening of the ear canal of the user, and the pressure relief hole may be located on a sidewall of the sound production component 11 away from the opening of the ear canal of the user. The housing of the sound production component 11 may act as a baffle to increase a sound path difference from the sound guiding hole and the pressure relief hole to an external ear canal 101, thereby increasing a sound intensity at the external ear canal 101. Furthermore, in the wearing state, the inner side of the sound production component 11 may be in contact with the antihelix region, and a concave-convex structure of the antihelix region may also act as a baffle, which may increase a sound path of the sound emitted from the pressure relief hole to the external ear canal 101, thereby increasing the sound path difference from the sound guiding hole and the pressure relief hole to the external ear canal 101.

Figure 22:
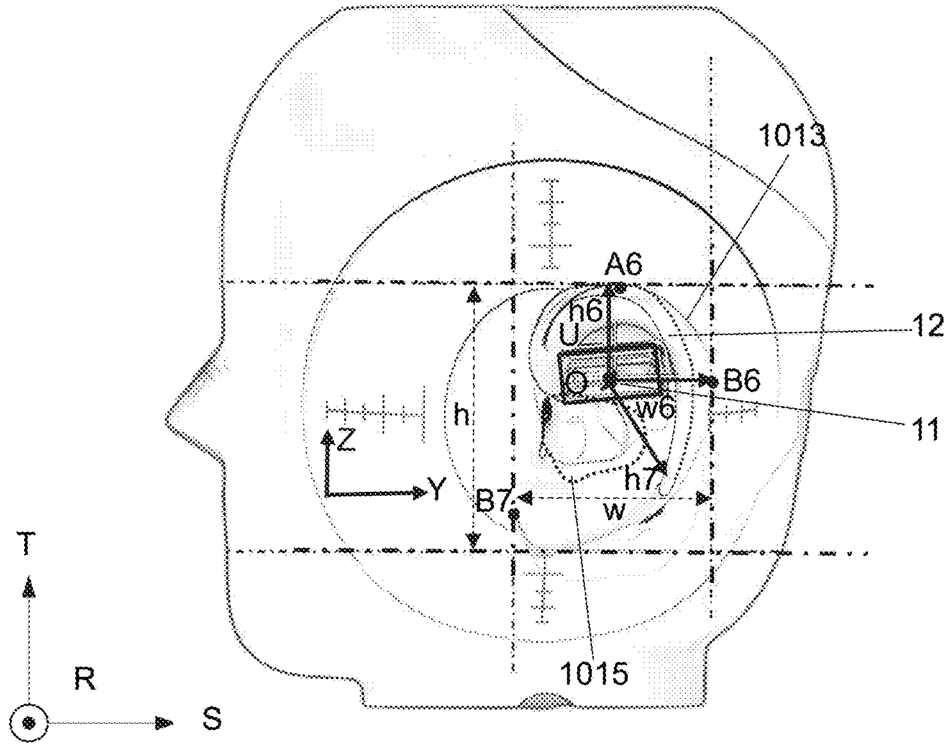
FIG. 22 is a schematic diagram illustrating an exemplary wearing manner of an earphone according to some embodiments of the present disclosure.
Figure 23:
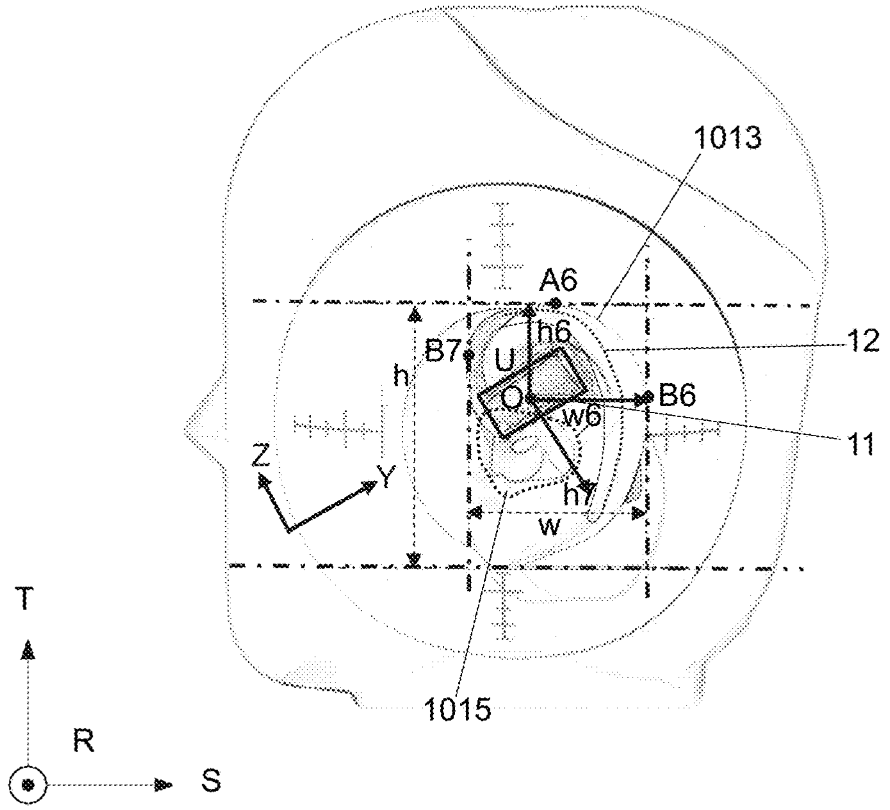
FIG. 23 is a schematic diagram illustrating an exemplary wearing manner of an earphone according to some embodiments of the present disclosure.

FIG. 22 and FIG. 23 are schematic diagrams illustrating an exemplary wearing manner of an earphone according to some embodiments of the present disclosure. As shown in FIG. 22 and FIG. 23, in some embodiments, when the earphone 10 is in the wearing state, the sound production component may be approximately parallel or inclined at a certain angle relative to the horizontal direction. In some embodiments, when the earphone 10 is in the wearing state, the sound production component 11 and the auricle of the user may have a first projection (a rectangular region defined by a solid line box U in FIG. 22 and FIG. 23 may be approximately equivalent to the first projection) and a second projection on the sagittal plane (e.g., an S-T plane in FIG. 22 and FIG. 23) of the head of the user, respectively. In order to make the whole or part structure of the sound production component 11 cover the antihelix region of the user (e.g., the position of the antihelix, the triangular fossa, the superior crura of antihelix, or the inferior crura of antihelix), a ratio of a distance $h_6$ between the centroid O of the first projection and a highest point A6 of the second projection in the vertical axis direction (e.g., a T-axis direction in FIG. 22 and FIG. 23) to a height h of the second projection in the vertical axis direction may be within a range of 0.25-0.4. A ratio of a distance $w_6$ between the centroid O of the first projection U and an end point B6 of the second projection in the sagittal axis direction (e.g., an S-axis direction in FIG. 22 and FIG. 23) to a width w of the second projection in the sagittal axis direction may be within a range of 0.4-0.6. In some embodiments, the position of the sound production component 11 relative to the auricle may also be reflected by the distance between the centroid O of the first projection and the highest point A6 of the second projection in the vertical axis and the distance between the centroid O of the first projection and the end point A6 of the second projection. In order to make the whole or part structure of the sound production component 11 cover the antihelix region of the user and make the sound guiding hole of the sound production component 11 close to the opening of the ear canal, in some embodiments, the distance $h_6$ (also referred to as a second distance) between the centroid O of the first projection and the highest point A6 of the second projection in the vertical axis direction may be within a range of 17 mm-29 mm, and the distance $w_6$ between the centroid O of the first projection U and the end point B6 of the second projection in the sagittal axis direction may be within a range of 20 mm-31 mm.

Considering that the sidewall of the sound production component 11 may abut against the antihelix region, in order to make the sound production component 11 abut against a larger antihelix region, the concave-convex structure of the region may also act as a baffle, to increase the sound path of the sound emitted from the pressure relief hole to the external ear canal 101, thereby increasing the sound path difference between the sound guiding hole and the pressure relief hole to the external ear canal 101, increasing the sound intensity at the external ear canal 101, and reducing the volume of the far-field leakage sound. Accordingly, in order to balance the listening volume and the sound leakage volume of the sound production component 11 to ensure the acoustic output quality of the sound production component 11, the sound production component 11 may be fit as closely as possible to the antihelix region of the user. In some embodiments, the acoustic output quality of the sound production component 11 may be ensured, and the sound production component 11 may be fit as closely as possible to the antihelix region of the user by adjusting the distance $h_6$ between the centroid O of the first projection and the highest point A6 of the second projection in the vertical axis direction and the distance we between the centroid O of the first projection U and the end point B6 of the second projection in the sagittal axis direction. In some embodiments, the distance $h_6$ between the centroid O of the first projection and the highest point A6 of the second projection in the vertical axis direction may be within a range of 17 mm-29 mm, and the distance $w_6$ between the centroid O of the first projection U and the end point B6 of the second projection in the sagittal axis direction may be within a range of 20 mm-31 mm. At this time, the ratio of the distance $h_6$ between the centroid O of the first projection of the sound production component 11 on the sagittal axis plane of the head of the user and the highest point A6 of the second projection of the auricle of the user on the sagittal axis plane to the height h of the second projection in the vertical axis direction may be within a range of 0.25-0.4, and the ratio of the distance $w_6$ between the centroid O of the first projection of the sound production component 11 on the sagittal axis plane and an end point B6 of the second projection of the auricle of the user on the sagittal axis plane to the width w of the second projection in the sagittal axis direction may be within a range of 0.4-0.6. In order to improve the wearing comfort of the earphone while ensuring the acoustic output quality of the sound production component 11, the distance $h_6$ between the centroid O of the first projection and the highest point A6 of the second projection in the vertical axis direction may be within a range of 17 mm-25 mm, and the distance $w_6$ between the centroid O of the first projection and the end point B6 of the second projection in the sagittal axis direction may be within a range of 21 mm-31 mm. At this time, the ratio of the distance $h_6$ between the centroid O of the first projection of the sound production component 11 on the sagittal axis plane and the highest point A6 of the second projection on the sagittal axis plane to the height h of the second projection in the vertical axis direction may be within a range of 0.25-0.35, and the ratio of the distance $w_6$ between the centroid O of the first projection and the end point B6 of the second projection on the sagittal axis plane to the width w (a distance between an end point B6 of the auricle and a front end point B7 of the auricle in FIG. 22) of the second projection in the sagittal axis direction may be within a range of 0.42-0.6. At this time, more of the sound production component 11 may fit with the antihelix region, especially the superior crura of antihelix, the inferior crura of antihelix, and the triangular fossa, and the effect that the sound production component 11 forms a baffle with the antihelix region may be stronger. Meanwhile, the end FE of the sound production component 11 may be closer to the inner contour relative to the auricle, and an acoustic short circuit region between the end FE of the sound production component 11 and the inner contour of the auricle may be significantly reduced, thereby significantly increasing the listening volume at the opening of the ear canal of the user. More preferably, the distance $h_6$ between the centroid O of the first projection and the highest point A6 of the second projection in the vertical axis direction may be within a range of 17 mm-24 mm, the distance $w_6$ between the centroid O of the first projection and the end point B6 of the second projection in the sagittal axis direction may be within a range of 21 mm-28 mm, the ratio of the distance $h_6$ between the centroid O of the first projection and the highest point A6 of the second projection in the vertical axis direction to the height h of the second projection in the vertical axis direction may be within a range of 0.25-0.34, and the ratio of the distance $w_6$ between the centroid O of the first projection and the end point B6 of the second projection in the sagittal axis direction to the width w of the second projection in the sagittal axis direction may be within a range of 0.42-0.55. At this time, the sound production component 11 may fully fit with the antihelix region, and the sound production component 11 does not cover the opening of the ear canal of the user, so that the opening of the ear canal of the user may keep fully open for the user's access to the external sound. In addition, the end FE of the sound production component 11 may be closer to or abut against the inner contour of the auricle relative to the inner contour of the auricle, the acoustic short circuit region between the end FE of the sound production component 11 and the inner contour of the auricle may be significantly reduced, thereby significantly increasing the listening volume at the opening of the ear canal of the user. Further, the end FE of the sound production component 11 may be closer to the inner contour of the auricle relative to the inner contour of the auricle, and inner contour of the auricle may support the sound production component 11, thereby increasing the wearing stability for the user.

Similarly, when the shapes and the sizes of the ears of users are different, the ratio may fluctuate within a certain range. For example, when the earlobe of the user is long, the height h of the second projection in the vertical axis direction be larger than that of a general situation. At this time, when the user wears the earphone 10, the ratio of the distance $h_6$ between the centroid O of the first projection and the highest point A6 of the second projection in the vertical axis direction to the height h of the second projection in the vertical axis direction may be smaller, e.g., which may be within a range of 0.2-0.35. Similarly, in some embodiments, when the helix of the user is bent forward, the width w of the second projection in the sagittal axis direction may be smaller than that of the general situation, and the distance we between the centroid O of the first projection and the end point B6 of the second projection in the sagittal axis direction may also be smaller. At this time, when the user wears the earphone 10, the ratio of the distance $w_6$ between the centroid O of the first projection and the end point B6 of the second projection in the sagittal axis direction to the width w of the second projection in the sagittal axis direction may be larger, e.g., which may be within a range of 0.4-0.7.

The opening of the ear canal is located in the cavity of auricular concha, and when the user wears the earphone, in order to make the sound guiding hole of the sound production component 11 close to the opening of the ear canal, the sound production component needs to be close to the cavity of auricular concha or be suspended at the cavity of auricular concha, to ensure the listening effect at the opening of the ear canal of the user. In some embodiments, an overlap part between an area of the first projection of the sound production component 11 on the sagittal plane and an area of the projection of the cavity of auricular concha on the sagittal plane may be controlled to be within a certain range, to ensure that the sound guiding hole is close to the opening of the ear canal of the user, and the opening of the ear canal of the user may remain fully open. In some embodiments, an extent to which the sound production component 11 covers the cavity of auricular concha may be represented by a ratio of the overlap part of the area of the first projection and the area of the projection of the cavity of auricular concha on the sagittal plane to the area of the first projection. For example, the larger the ratio, the greater the part of the cavity of auricular concha covered by the sound production component 11. Accordingly, in some embodiments, the ratio of the overlap part of the area of the first projection and the area of the projection of the cavity of auricular concha on the sagittal plane to the area of the first projection may be not less than 0.18. Considering that when the ratio of the overlap part of the area of the first projection and the area of the projection of the cavity of auricular concha on the sagittal plane to the area of the first projection is large, part of the opening of the ear canal of the user may be covered, affecting the degree of opening of the ear canal, and then affecting the user's access to the sound information in the external environment. When the ratio of the overlap part of the area of the first projection and the area of the projection of the cavity of auricular concha on the sagittal plane to the area of the first projection is small, the sound guiding hole of the sound production component 11 may be relatively far away from the opening of the ear canal, affecting the listening effect at the opening of the ear canal of the user. Preferably, the ratio of the overlap part of the area of the first projection and the area of the projection of the cavity of auricular concha on the sagittal plane to the area of the first projection may be within the range of 0.2-0.8. By adjusting the ratio of the overlap part of the area of the first projection and the area of the projection of the cavity of auricular concha on the sagittal plane to the area of the first projection, the sound guiding hole of the sound production component 11 may be close to the opening of the ear canal of the user on the premise of ensuring a large degree of opening of the ear canal, thereby ensuring the listening effect at the opening of the ear canal of the user. Preferably, the ratio of the overlap part of the area of the first projection and the area of the projection of the cavity of auricular concha on the sagittal plane to the area of the first projection may be within the range of 0.3-0.7. The ratio of the overlap part of the area of the first projection and the area of the projection of the cavity of auricular concha on the sagittal plane to the area of the first projection may be set in a more suitable range, so that the overall comprehensive performance of the earphone may be improved while considering the degree of opening of the opening of the ear canal and the ensuring the sound guiding hole of the sound production component 11 to be close to the opening of the ear canal. Accordingly, more preferably, the ratio of the overlap part of the area of the first projection and the area of the projection of the cavity of auricular concha on the sagittal plane to the area of the first projection may be within the range of 0.4-0.6. In some embodiments, the extent to which the cavity of auricular concha is covered by the sound production component may also be reflected by a ratio (also referred to as the overlap ratio) of the overlap part of the area of the first projection and the area of the projection of the cavity of auricular concha on the sagittal plane to the area of the projection of the cavity of auricular concha on the sagittal plane, which will be further described in FIG. 24.

Figure 24:
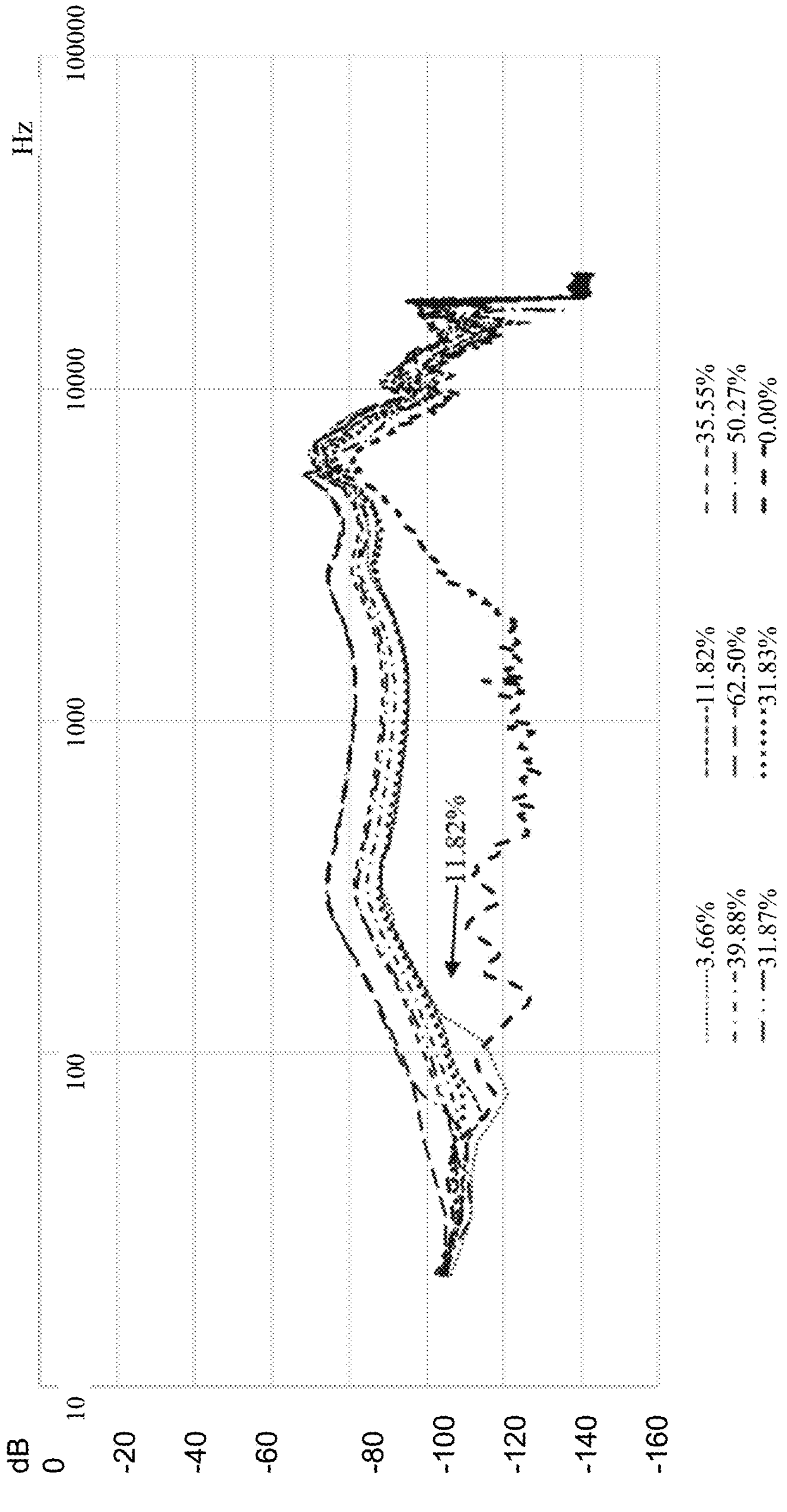
FIG. 24 is a diagram illustrating exemplary frequency response curves corresponding to different overlap ratios each of which is a ratio of a projection area of a first projection to a projection area of a cavity of an auricular concha on a sagittal plane according to some embodiments of the present disclosure.

FIG. 24 is a diagram illustrating exemplary frequency response curves corresponding to different overlap ratios of a projection of a first projection to a projection of a cavity of auricular concha on a sagittal plane in a wearing manner that at least part of the sound production component covers the antihelix region according to some embodiments of the present disclosure. As shown in FIG. 24, an abscissa may represent a frequency (unit: Hz), and an ordinate may represent a sound pressure level (unit: dB) at the opening of the ear canal corresponding to different frequencies. As shown in FIG. 24, in a specific experiment, since the sound production device 11 has a certain three-dimensional structure and an overall size, to ensure that the area of the first projection of the sound production component 11 on the sagittal plane is a fixed value, an experimental value with different overlap ratios may be obtained through a translation manner along the sagittal axis direction and/or the vertical axis direction. The position of the sound production component 11 relative to the antihelix region may be changed through the translation manner. Correspondingly, an action of a baffle formed by the sound production component 11 and the antihelix region may be weakened. In the wearing state, the sound guiding hole may be usually arranged at a sidewall of the sound production component 11 facing or close to the opening of the ear canal, and a greater overlap ratio of the area of the first projection of the sound production component 11 on the sagittal plane to the area of the projection of the cavity of auricular concha on the sagittal plane may indicate that the sound guiding hole of the sound production component 11 may usually closer to the opening of the ear canal. Therefore, even though the action of the baffle formed by the sound production component 11 and the antihelix region is weakened, the listening volume at the opening of the ear canal may also be improved. As shown in FIG. 24, the listening volume at the opening of the ear canal may be significantly improved when the overlap ratio of the area of the first projection of the sound production component 11 on the sagittal plane to the area of the projection of the cavity of auricular concha on the sagittal plane is not less than 11.82% compared with an overlap ratio that is less than 11.821%. That is, a good frequency response may also be generated when the sound production component 11 covers part of the cavity of auricular concha and the antihelix region. Accordingly, in some embodiments, to ensure a good listening effect when the user wears the earphone, the overlap ratio of the area of the first projection of the sound production device 11 on the sagittal plane to the area of the projection of the cavity of auricular concha on the sagittal plane may be not less than 11.82% under a condition that the sound production component 11 covers the antihelix. Preferably, in some embodiments, the overlap ratio of the area of the first projection of the sound production device 11 on the sagittal plane to the area of the projection of the cavity of auricular concha on the sagittal plane may be not less than 31.83%. Considering that when the overlap ratio of the area of the first projection of the sound production device 11 on the sagittal plane to the area of the projection of the cavity of auricular concha on the sagittal plane is too large, the sound production component 11 may cover the opening of the ear canal, and the opening of the ear canal may be not able to remain the fully open state, affecting the user's access to the sound in the external environment. More preferably, in some embodiments, the overlap ratio of the area of the first projection of the sound production device 11 on the sagittal plane to the area of the projection of the cavity of auricular concha on the sagittal plane may be within a range of 11.82%-62.50%. Further preferably, in some embodiments, the overlap ratio of the area of the first projection of the sound production device 11 on the sagittal plane to the area of the projection of the cavity of auricular concha on the sagittal plane may be within a range of 31.83%-50.07%. Further preferably, the overlap ratio of the area of the first projection of the sound production device 11 on the sagittal plane to the area of the projection of the cavity of auricular concha on the sagittal plane may be within a range of 35.55%-45%. It should be noted that the frequency response curves corresponding to the overlap ratio of the area of the first projection to the area of the projection of the cavity of auricular concha of the user on the sagittal plane obtained through the measurement in the embodiments of the present disclosure may be obtained through the measurement by changing the wearing position (e.g., translation along the sagittal axis direction) of the sound production component based on a certain wearing angle (an angle between the upper sidewall or the lower sidewall and the horizontal direction, e.g., an angle between the upper sidewall and the horizontal direction is 0°) and a certain size of the sound production component.

In the wearing manner that at least part of the sound production component 11 covers the antihelix of the user, since the sound production component 11 does not extend into the cavity of auricular concha, the angle between the sound production component 11 and the sagittal plane may be relatively smaller compared with a wearing manner that at least part of the sound production component 11 of the earphone extends into the cavity of auricular concha shown in FIG. 3. Therefore, in the wearing manner that at least part of the sound production component 11 covers the antihelix region of the user, the area of the projection of the sound production component of the earphone on the sagittal plane shown in FIG. 14 may be relatively larger than the area of the projection of the sound production component of the earphone on the sagittal plane shown in FIG. 3. For example, in some embodiments, in the wearing state, the area of the first projection of the sound production component 11 on the sagittal plane may be within a range of 236 $mm^2$-565 $mm^2$. In some embodiments, to avoid a generated worse action of the baffle caused by a too small area of the first projection of the sound production 11 on the sagittal plane, and to avoid affecting the user's access to the sound from the external environment caused by a too large area of the first projection of the sound production component 11 on the sagittal plane covering the opening of the ear canal, in the wearing state, the area of the first projection of the sound production component 11 on the sagittal plane may be within a range of 250 $mm^2$-550 $mm^2$. Preferably, in the wearing state, the area of the first projection of the sound production component 11 on the sagittal plane may be within a range of 270 $mm^2$-500 $mm^2$. More preferably, in the wearing state, the area of the first projection of the sound production component 11 on the sagittal plane may be within a range of 290 $mm^2$-450 $mm^2$. Further preferably, in the wearing state, the area of the first projection of the sound production component 11 on the sagittal plane may be within a range of 320 $mm^2$-410 $mm^2$.

Referring to FIG. 22, a projection shape of the first projection of the sound production component 11 on the sagittal plane may include a long axis direction and a short axis direction. In some embodiments, considering that when a size of the sound production component 11 along the long axis direction Y or the short axis direction Z is too small, a volume of the sound production component 11 may be small relatively, and an area of a diaphragm arranged in the sound production component 11 may also be smaller relatively, which causes a low efficiency of generating the sound by driving the air in the housing of the sound production component 11 through the diaphragm, thereby affecting an acoustic output effect of the earphone. Furthermore, when the size of the sound production component 11 along the long axis direction Y or the short axis direction Z is too small, a distance between the sound guiding hole and the pressure relief hole of the sound production component 11 may be too small, which causes a relatively small sound path difference between sound at the sound guiding hole and sound at the pressure relief hole, thereby affecting the listening volume at the opening of the ear canal the user. However, when the size of the sound production component 11 along the long axis direction Y is too large, the sound production component 11 may be beyond the auricle of the user, which causes an uncomfortable wearing experience. In addition, when the size of the sound production component 11 along the long axis direction Y is too small, a gap may be formed between the end FE of the sound production component 11 and the inner contour 1014 of the auricle, a short circuit of the sound emitted from the sound guiding hole and the sound emitted from the pressure relief hole may occur at a region between the end FE of the sound production component 11 and the inner contour 1014 of the auricle, so that the listening volume at the opening of the ear canal of the user may be reduced. The larger the region between the end FE of the sound production component 11 and the inner contour 1014 of the auricle, the more obvious the phenomenon of the acoustic short circuit. When the size of the sound production component 11 along the short axis direction Z is too large, the sound production component 11 may cover the opening of the ear canal of the user, to affect the user's access to the sound information in the external environment. In some embodiments, in order to ensure a good acoustic output quality and a wearing comfortability when the user wears the earphone 10, a size of the shape of the first projection along the long axis direction Y may be within a range of 21 mm-33 mm. Preferably, the size of the shape of the first projection along the long axis direction Y may be within a range of 21.5 mm-31 mm. More preferably, the size of the shape of the first projection along the long axis direction Y may be within a range of 21.5 mm-26.5 mm. Correspondingly, a size of the shape of the first projection along the short axis direction Z may be within a range of 11 mm-18 mm. Preferably, the size of the shape of the first projection along the short axis direction Z may be within a range of 11.5 mm-16.5 mm. More preferably, the size of the shape of the first projection along the short axis direction Z may be within a range of 11.5 mm-16 mm. To further illustrate the effect of the shape of the first projection of the sound production component 11 on the sagittal plane on the listening effect when the user wears the earphone, the following may be an exemplary illustration of a ratio of the size of the shape of the first projection of the sound production component 11 on the sagittal plane along the long axis direction Y to the size of the shape of the first projection of the sound production component 11 on the sagittal plane along the short axis direction Z.

In a certain wearing manner (e.g., a fixed wearing position and a fixed wearing angle), for the wearing manner that the sound production component covers the antihelix, an effect of the ratio of the size of the shape of the first projection along the long axis direction Y to the size of the shape of the first projection along the short axis direction Z on the acoustic output effect of the sound production component 11 may be considered substantially the same as the wearing manner that the sound production component 11 extends into the cavity of auricular concha. When the ratio of the size of the shape of the first projection along the long axis direction Y to the size of the shape of the first projection along the short axis direction Z is within a range of 1.0-3.0, a frequency response curve of the sound production component 11 may be generally smooth, and the frequency response may be good within a range of medium and low frequency band. When the frequency is within a range of high frequency band, the greater the ratio of the size of the shape of the first projection along the long axis direction Y to the size of the shape of the first projection along the short axis direction Z, the faster the sound frequency response of the sound production component 11 decreases at the opening of the ear canal. Accordingly, in some embodiments, in order to ensure a good acoustic output effect when the user wears the earphone, the ratio of the size of the shape of the first projection of the sound production component 11 on the sagittal plane along the long axis direction Y to the size of the shape of the first projection of the sound production component 11 on the sagittal plane along the short axis direction Z may be within a range of 1.0-3.0. Similarly, in order to ensure the wearing stability and comfort, in some embodiments, the ratio of the size of the shape of the first projection of the sound production component 11 on the sagittal plane along the long axis direction Y to the size of the shape of the first projection of the sound production component 11 on the sagittal plane along the short axis direction Z may be within a range of 1.4-2.5. Preferably, the ratio of the size of the shape of the first projection of the sound production component 11 on the sagittal plane along the long axis direction Y to the size of the shape of the first projection of the sound production component 11 on the sagittal plane along the short axis direction Z may be within a range of 1.4-2.3. More preferably, the ratio of the size of the shape of the first projection of the sound production component 11 on the sagittal plane along the long axis direction Y to the size of the shape of the first projection of the sound production component 11 on the sagittal plane along the short axis direction Z may be within a range of 1.45-2.0.

It should be noted that the frequency response curves corresponding to different sizes along the long axis direction Y and the short axis direction Z obtained through the measurement in the embodiments of the present disclosure may be obtained through the measurement by changing the size along the long axis direction and the short axis direction based on a certain wearing angle (an angle between the upper sidewall or the lower sidewall and the horizontal direction) and a wearing position.

Similarly, in a certain wearing manner (e.g., a fixed wearing position and a fixed wearing angle), for the wearing manner that the sound production component covers the antihelix, an effect of a thickness of the sound production component 11 on the acoustic output effect of the sound production component 11 may be considered substantially the same as the wearing manner that the sound production component 11 extends into the cavity of auricular conch. A size (also referred to as the thickness) of the sound production component 11 along the thickness direction X may be proportional to a size of the front cavity of the sound production component 11 along the thickness direction X. The smaller the size of the front cavity along the thickness direction X, the greater the resonance frequency corresponding to a resonant peak of the front cavity, and a frequency response curve within a lower frequency band range (100 Hz-1000 Hz) may be smoother. In some embodiments, the sound guiding hole may be acoustically coupled with the front cavity, and sound in the front cavity may be transmitted to the opening of the ear canal of the user through the sound guiding hole and received by the auditory system of the user. If the size of the sound production component 11 along the thickness direction X is too large, the resonance frequency corresponding to the resonant peak of the front cavity corresponding to the sound production component 11 may be too small. In addition, in the wearing state, when an overall size or weight of the sound production device 11 is relatively large, the wearing stability and comfort may be affected. When the size of the sound production component 11 along the thickness direction X is too large, the acoustic performance of the sound production component 11 within a lower frequency range may be affected. When the size of the sound production component 11 along the thickness direction X is too small, a space of the front cavity and the rear cavity of the sound production component 11 may be limited, affecting a vibration amplitude of the diaphragm, thereby limiting lower frequency output of the sound production component 11. Accordingly, in order to ensure a good acoustic output effect and the wearing stability of the sound production component 11, in some embodiments, the thickness (a size along the thickness direction of the sound production component 11) of the sound production component 11 may be within a range of 2 mm-20 mm. Preferably, the thickness of the sound production component 11 may be within a range of 5 mm-15 mm. More preferably, the thickness of the sound production component 11 may be within a range of 8 mm-12 mm. It should be noted that, in the wearing state, when at least one wall surface of two sidewalls (i.e., an inner side facing outside of the ear of the user and an outer side away from the outside of the ear of the user) of the sound production component 11 oppositely arranged along the thickness direction X is a non-planar surface, the thickness of the sound production component 11 may be a maximum distance between the inner side and the outer side of the sound production component 11 along the thickness direction X.

It should be noted that the frequency response curves corresponding to different thickness obtained through the measurement in the embodiments of the present disclosure may be obtained through the measurement by changing the size along the thickness axis direction based on a certain wearing angle (an angle between the upper sidewall or the lower sidewall and the horizontal direction, e.g., an angle between the upper sidewall and the horizontal direction is 0°), a certain wearing position, a certain size along the long axis direction, and a certain size along the short axis direction.

Figure 25A:
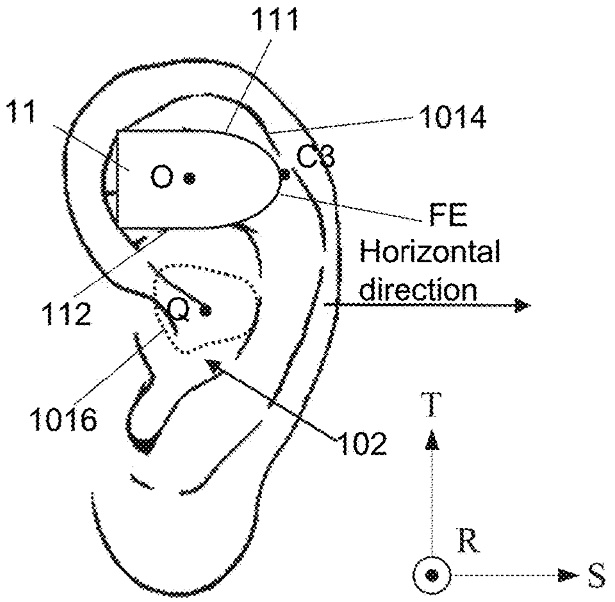
FIG. 25A is a schematic diagram illustrating an exemplary fitting position between an earphone and an ear canal of a user according to some embodiments of the present disclosure.
Figure 25B:
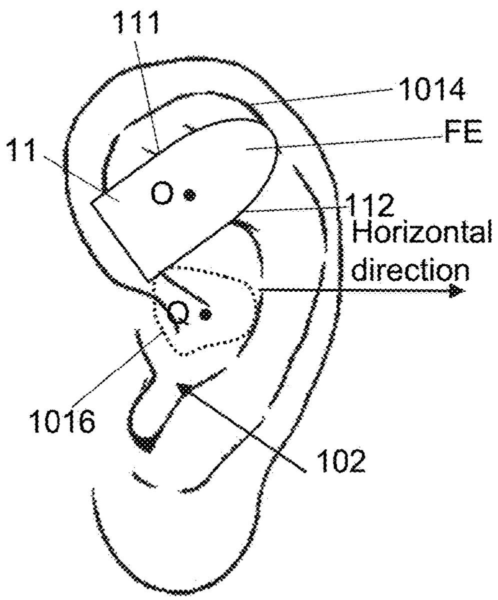
FIG. 25B is a schematic diagram illustrating an exemplary fitting position between an earphone and an ear canal of a user according to some embodiments of the present disclosure.
Figure 25C:
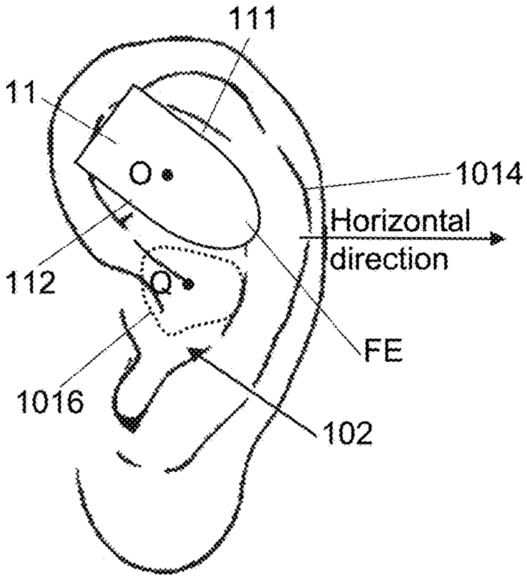
FIG. 25C is a schematic diagram illustrating an exemplary fitting position between an earphone and an ear canal of a user according to some embodiments of the present disclosure.
Figure 25D:
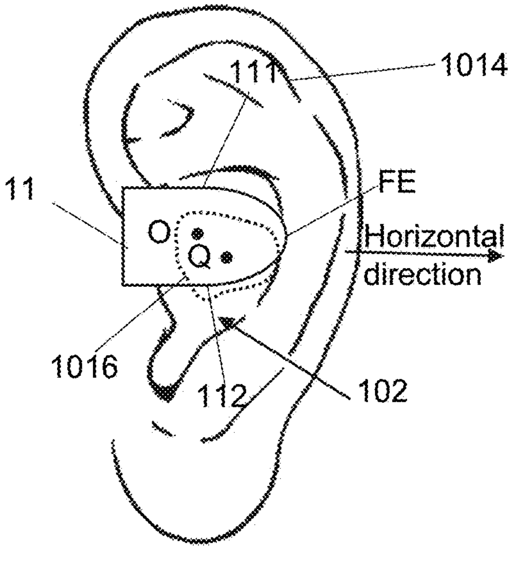
FIG. 25D is a schematic diagram illustrating an exemplary fitting position between an earphone and an ear canal of a user according to some embodiments of the present disclosure.

FIGS. 25A-25E are schematic diagrams illustrating exemplary wearing manners of an earphone according to some embodiments of the present disclosure. As shown in FIG. 16A, FIG. 16D, and FIG. 16E, in some embodiments, in the wearing state, the upper sidewall 111 (also referred to as the upper side surface) or the lower sidewall 112 (also referred to as the lower side surface) of the sound production component 11 may be parallel to or substantially parallel to the horizontal plane. As shown in FIG. 25A, in some embodiments, the projection of the end FE of the sound production component 11 on the sagittal plane may be located in a region between a projection of the inner contour 1014 of the auricle on the sagittal plane and a projection of the edge of the cavity of auricular concha 102 on the sagittal plane. That is, a midpoint of the projection of the end FE of the sound production component 11 on the sagittal plane may be located between the projection of the inner contour 1014 of the auricle on the sagittal plane and the projection of the edge of the cavity of auricular concha 102 on the sagittal plane. As shown in FIG. 25D, in some embodiments, the end FE of the sound production component 11 may be abutted against the edge of the cavity of auricular concha 102. A fixed end of the sound production component 11 may be located at a front side of the tragus, and at least part of the sound production component 11 may cover the cavity of auricular concha 102 of the user. As shown in FIG. 16E, in some embodiments, the midpoint of the projection of the end FE of the sound production component 11 on the sagittal plane may be located in a projection region of the cavity of auricular concha 102 on the sagittal plane, and a projection of the fixed end of the sound production component 11 on the sagittal plane may be located outside a projection region of the auricle of the user on the sagittal plane.

Referring to FIGS. 25B-25C, in some embodiments, in the wearing state, the upper sidewall 111 or the lower sidewall 112 of the sound production component 11 may be tilted with a certain angle relative to the horizontal plane. As shown in FIG. 25B, in some embodiments, the end FE of the sound production component 11 may be tilted toward a region of a top of the auricle relative to the fixed end of the sound production component 11, and the end FE of the sound production component 11 may abut against the inner contour 1014 of the auricle. As shown in FIG. 25C, in some embodiments, the fixed end of the sound production component 11 may be tilted toward the region of the top of the auricle relative to the end FE of the sound production component 11, and the end FE of the sound production component 11 may be located between the edge of the cavity of auricular concha 102 and the inner contour 1014 of the auricle. That is, the midpoint C3 of the projection of the end FE of the sound production component 11 on the sagittal plane may be located between the projection of the inner contour 1014 of the auricle on the sagittal plane and the projection of the edge of the cavity of auricular concha 102 on the sagittal plane.

It should be understood that, when the user wears the earphone, if a distance from the midpoint C3 of the projection of the end FE of the sound production component 11 on the sagittal plane to the projection of the inner contour 1014 of the auricle on the sagittal plane is too large, the end FE of the sound production component 11 may be unable to abut against the inner contour 1014 of the auricle, which in turn causes that the sound production component 11 may be not limited, and the earphone may easily fall off. In addition, if a distance between the centroid O of the first projection and a point of a certain region of a boundary of a second projection is too large, the gap may be formed between the end FE of the sound production component 11 and the inner contour 1014 of the auricle, and the short circuit of the sound emitted from the sound guiding hole and the sound emitted from the pressure relief hole may occur at the region between the end FE of the sound production component 11 and the inner contour 1014 of the auricle, so that the listening volume at the opening of the ear canal may be reduced. The larger the region between the end FE of the sound production component 11 and the inner contour 1014 of the auricle, the more obvious the phenomenon of the acoustic short circuit. It should be noted that the inner contour 1014 of the auricle may be the inner wall of the helix. Correspondingly, the outer contour 1013 of the auricle may be the outer wall of the helix. In some embodiments, to ensure a good wearing stability of the earphone, the distance from the midpoint C3 of the projection of the end FE of the sound production component 11 on the sagittal plane to the projection of the inner contour 1014 of the auricle on the sagittal plane may be not greater than 8 mm. Preferably, the distance from the midpoint C3 of the projection of the end FE of the sound production component 11 on the sagittal plane to the projection of the inner contour 1014 of the auricle on the sagittal plane may be within a range of 0 mm-6 mm. More preferably, the distance from the midpoint C3 of the projection of the end FE of the sound production component 11 on the sagittal plane to the projection of the inner contour 1014 of the auricle on the sagittal plane may be within a range of 0 mm-5.5 mm. In some embodiments, the distance from the midpoint C3 of the projection of the end FE of the sound production component 11 on the sagittal plane to the projection of the inner contour 1014 of the auricle on the sagittal plane may be 0. When the distance is 0, the end FE of the sound production component 11 may abut against the inner contour 1014 of the auricle. At this time, the sound production component 11 may abut against the inner contour 1014 of the auricle in the wearing state to improve the wearing stability of the earphone. In addition, the region between the end FE of the sound production component 11 and the inner contour 1014 of the auricle may be reduced as much as possible, to reduce the acoustic short circuit region around the sound production component 11, thereby improving the listening volume at the opening of the ear canal of the user. It should be noted that, in a specific scenario, another point of the projection of the end FE of the sound production component 11 on the sagittal plane other than the midpoint C3 may be abutted against the inner contour 1014 of the auricle. At this time, the distance between the midpoint C3 of the projection of the end FE of the sound production component 11 on the sagittal plane and the projection of the inner contour 1014 of the auricle on the sagittal plane may be greater than 0 mm. In some embodiments, the distance between the midpoint C3 of the projection of the end FE of the sound production component 11 on the sagittal plane and the projection of the inner contour 1014 of the auricle on the sagittal plane may be within a range of 2 mm-10 mm. Preferably, the distance between the midpoint C3 of the projection of the end FE of the sound production component 11 on the sagittal plane and the projection of the inner contour 1014 of the auricle on the sagittal plane may be within a range of 4 mm-8 mm.

It should also be noted that, in the present disclosure, the end FE of the sound production component 11 refers to an end of the sound production device 11 far away from a connection between the sound production component 11 and the ear hook. When the projection of the end FE of the sound production component 11 on the sagittal plane is a curved line or a broken line, the midpoint C3 of the projection of the end FE of the sound production component 11 on the sagittal plane may be selected through a following exemplary method. A line segment may be determined through a start point and an end point of the projection of the end FE of the sound production component 11 on the sagittal plane, a vertical centerline may be determined through a midpoint on the line segment, and an intersecting point between the vertical centerline and the projection may be determined as the midpoint C3 of the projection of the end FE of the sound production component 11 on the sagittal plane. In some embodiments, when the end FE of the sound production component 11 is a curved surface, a tangent point on a tangent line of the projection parallel to the short axis direction Z may be determined as the midpoint of the projection of the end FE of the sound production component 11 on the sagittal plane.

In addition, in the embodiments of the present disclosure, the distance between the midpoint of the projection of the end FE of the sound production component 11 on the sagittal plane and the projection of the inner contour 1014 of the auricle on the sagittal plane may be a minimum distance between the projection of the end FE of the sound production component 11 on the sagittal plane and the projection region of the inner contour 1014 of the auricle on the sagittal plane. Alternatively, the distance between the midpoint C3 of the projection of the end FE of the sound production component 11 on the sagittal plane and the projection of the inner contour 1014 of the auricle on the sagittal plane may be a distance between the midpoint C3 of the projection of the end FE of the sound production component 11 on the sagittal plane and the projection of the inner contour 1014 of the auricle on the sagittal plane along the sagittal axis.

A length of a baffle formed by the sound production component 11 and the antihelix region may be related to the distance between the midpoint C3 of the projection of the end FE of the sound production component 11 on the sagittal plane and the projection of the inner contour 1014 of the auricle on the sagittal plane. For example, the smaller the distance between the midpoint C3 of the projection of the end FE of the sound production component 11 on the sagittal plane and the projection of the inner contour 1014 of the auricle on the sagittal plane, the greater the length of the baffle formed by the sound production component 11 and the antihelix region, the greater the sound path difference from the sound guiding hole and the pressure relief hole to the external ear canal 101, and the stronger the sound intensity of the sound received at the external ear canal 101. In addition, an inclination angle of the projection of the upper sidewall 111 or the lower sidewall 112 of the sound production component 11 on the sagittal plane relative to the horizontal direction may also affect the position of the sound guiding hole relative to the opening of the ear canal. For example, the smaller the inclination angle of the projection of the upper sidewall 111 or the lower sidewall 112 of the sound production component 11 on the sagittal plane relative to the horizontal direction, the closer the sound guiding hole is to the opening of the ear canal. The following specific illustrations may be provided based on the FIGS. 25A-25E.

Figure 25E:
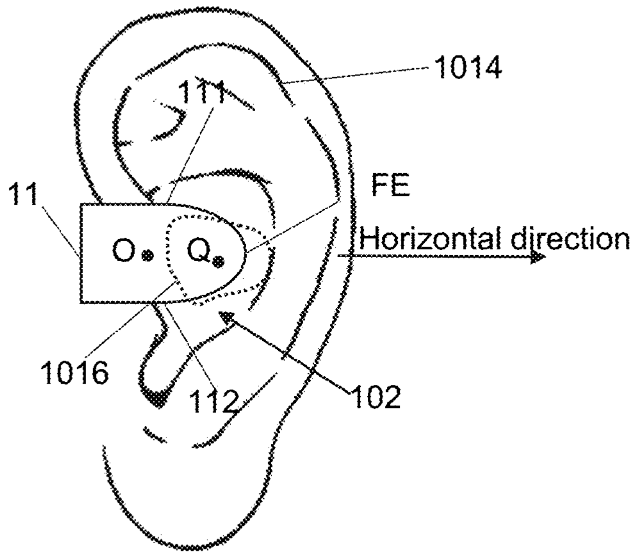
FIG. 25E is a schematic diagram illustrating an exemplary fitting position between an earphone and an ear canal of a user according to some embodiments of the present disclosure.

In some embodiments, the shape of the sound production component 11 may include a cuboid shape, a quasi-cuboid shape (e.g., a racetrack shape), a cylinder shape, or the like, or other irregular shapes. As shown in FIG. 25A, FIG. 25D, and FIG. 25E, in some embodiments, when the sound production component 11 is a quasi-cuboid shape structure, the upper sidewall 111 or the lower sidewall 112 of the sound production component 11 in the wearing state may be parallel or substantially parallel to the horizontal direction. At this time, the inclination angle of the projection of the upper sidewall 111 or the lower sidewall 112 of the sound production component 11 on the sagittal plane relative to the horizontal direction may be within a range of 0°-20°, and the distance between the midpoint C3 of the projection of the end FE of the sound production component 11 on the sagittal plane and the projection of the inner contour 1014 of the auricle on the sagittal plane may be within a range of 0 mm-18 mm. Merely by way of example, when the wearing manner is a wearing manner shown in FIG. 25A, the inclination angle of the projection of the upper sidewall 111 or the lower sidewall 112 of the sound production component 11 on the sagittal plane relative to the horizontal direction may be within a range of 5°-15°, and the distance between the midpoint C3 of the projection of the end FE of the sound production component 11 on the sagittal plane and the projection of the inner contour 1014 of the auricle on the sagittal plane may be within a range of 0 mm-11 mm. When the wearing manner is a wearing manner shown in FIG. 25D, the inclination angle of the projection of the upper sidewall 111 or the lower sidewall 112 of the sound production component 11 on the sagittal plane relative to the horizontal direction may be within a range of 7°-12°, and the distance between the midpoint C3 of the projection of the end FE of the sound production component 11 on the sagittal plane and the projection of the inner contour 1014 of the auricle on the sagittal plane may be within a range of 3 mm-12 mm. When the wearing manner is a wearing manner shown in FIG. 25E, the inclination angle of the projection of the upper sidewall 111 or the lower sidewall 112 of the sound production component 11 on the sagittal plane relative to the horizontal direction may be within a range of 8°-10°, and the distance between the midpoint C3 of the projection of the end FE of the sound production component 11 on the sagittal plane and the projection of the inner contour 1014 of the auricle on the sagittal plane may be within a range of 8 mm-12 mm. In some embodiments, when the earphone is in the wearing state, the end FE of the sound production component 11 may abut against the inner contour 1014 of the auricle. Meanwhile, the ear hook may fit with the rear side of the ear of the user, so that the sound production component 11 and the ear hook may cooperate to clamp the ear of the user from the front side and the rear side, thereby increasing the resistance of the earphone 10 falling off from the ear, and improving the wearing stability of the earphone 10.

Referring to FIGS. 25B and 25C, in some embodiments, the upper sidewall 111 or the lower sidewall 112 of the sound production component 11 may be tilted with a certain angle relative to the horizontal plane. However, when the inclination angle of the upper sidewall 111 or the lower sidewall 112 of the sound production component 11 relative to the horizontal direction is too large, the sound production component 11 may be beyond the auricle of the user, which causes wearing discomfort and wearing instability. Accordingly, in order to ensure the area of the antihelix region covered by the sound production component 11 and a good sound intensity at the opening of the ear canal, and also to ensure a good wearing stability and wearing comfort of the earphone, in some embodiments, in the wearing state of the earphone 10, the inclination angle of the projection of the upper sidewall 111 or the lower sidewall 112 of the sound production component 11 on the sagittal plane relative to the horizontal direction may be not greater than 43°. In some embodiments, when the wearing manner is a wearing manner shown in FIG. 25B and FIG. 25C, the inclination angle of the projection of the upper sidewall 111 or the lower sidewall 112 of the sound production inclination 11 on the sagittal plane relative to the horizontal direction may be within a range of 0°-43°, and the distance between the midpoint C3 of the projection of the end FE of the sound production inclination 11 on the sagittal plane and the projection of the inner contour 1014 of the auricle on the sagittal plane may be within a range of 0 mm-15 mm. Merely by way of example, when the wearing manner is a wearing manner shown in FIG. 25B, the inclination angle of the projection of the upper sidewall 111 or the lower sidewall 112 of the sound production inclination 11 on the sagittal plane relative to the horizontal direction may be within a range of 30°-45°, and the distance between the midpoint C3 of the projection of the end FE of the sound production inclination 11 on the sagittal plane and the projection of the inner contour 1014 of the auricle on the sagittal plane may be within a range of 0 mm-10 mm. When the wearing manner is a wearing manner shown in FIG. 25C, the inclination angle of the projection of the upper sidewall 111 or the lower sidewall 112 of the sound production device 11 on the sagittal plane relative to the horizontal direction may be within a range of 25°-45°, and the distance between the midpoint C3 of the projection of the end FE of the sound production inclination 11 on the sagittal plane and the projection of the inner contour 1014 of the auricle on the sagittal plane may be within a range of 3 mm-11 mm.

It should be noted that an inclination angle between the projection of the upper sidewall 111 of the sound production component 11 on the sagittal plane and the horizontal direction may be the same as or different from an inclination angle between the projection of the lower sidewall 112 of the sound production component 11 on the sagittal plane and the horizontal direction. For example, when the upper sidewall 111 of the sound production component 11 is parallel to the lower sidewall 112, the inclination angle between the projection of the upper sidewall 111 of the sound production component 11 on the sagittal plane and the horizontal direction may be the same as the inclination angle between the projection of the lower sidewall 112 of the sound production component 11 on the sagittal plane and the horizontal direction. As another example, when the upper sidewall 111 of the sound production component 11 is not parallel to the lower sidewall 112, or one of the upper sidewall 111 and the lower sidewall 112 is a planar wall, the other of the upper sidewall 111 and the lower sidewall 112 is a non-planar wall (e.g., the curved wall), the inclination angle between the projection of the upper sidewall 111 of the sound production component 11 on the sagittal plane and the horizontal direction may be different from the inclination angle between the projection of the lower sidewall 112 of the sound production component 11 on the sagittal plane and the horizontal direction. In addition, when the upper sidewall 111 or the lower sidewall 112 is a curved surface or a concave-convex surface, the projection of the upper sidewall 111 or the lower sidewall 112 on the sagittal plane may be a curved line or a broken line. At this time, the inclination angle between the projection of the upper sidewall 111 of the sound production component 11 on the sagittal plane and the horizontal direction may be an angle between a tangent line of a point on the curved line or broken line farthest from the ground plane and the horizontal direction, and the inclination angle between the projection of the lower sidewall 112 of the sound production component 11 on the sagittal plane and the horizontal direction may be an angle between a tangent line of a point on the curved line or the broken line nearest to the ground plane and the horizontal direction.

It should be noted that the sound production component 11 of the earphone 11 shown in FIG. 21 may also not cover the antihelix region. For example, taking the wearing position shown in FIG. 25E as an example, the sound production component 11 may be extended into the cavity of auricular concha. However, the sound production component 11 may face a sidewall of the outside of the ear of the user and may be arranged to be suspended relative to the cavity of auricular concha of the user. That is, the sound production component 11 may act as the baffle. The greater the overlap ratio of the area of the first projection of the sound production component 11 on the sagittal plane to the area of the projection of the cavity of auricular concha on the sagittal plane, the closer the sound guiding hole of the sound production component 11 to the opening of the ear canal, and the larger the listening volume at the opening of the ear canal of the user. The distance between the projection of the end FE of the sound production component 11 on the sagittal plane and the projection of the edge of the cavity of auricular concha on the sagittal plane may be proportional to the overlap ratio of the area of the first projection of the sound production component 11 on the sagittal plane to the area of the projection of the cavity of auricular concha on the sagittal plane. Further, the position of the sound guiding hole of the sound production component 11 relative to the opening of the ear canal may be proportional to the distance between the projection of the end FE of the sound production component 11 on the sagittal plane and the projection of the edge of the cavity of auricular concha on the sagittal plane. The following specific illustration may be provided in FIG. 26.

Figure 26:
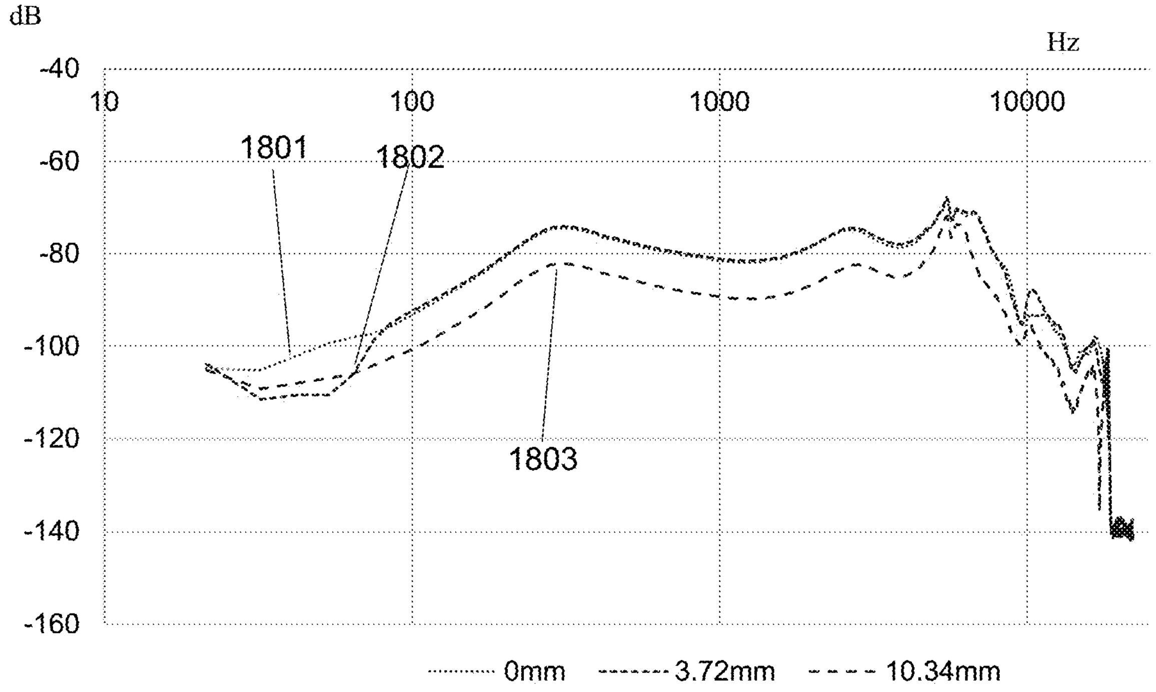
FIG. 26 is a diagram illustrating exemplary frequency response curves corresponding to different distances between a projection of an end of a sound production component shown in FIG. 25E and a projection of an edge of a cavity of an auricular concha on a sagittal plane according to some embodiments of the present disclosure.

FIG. 26 is a diagram illustrating exemplary frequency response curves corresponding to different distances between a projection of an end of a sound production component shown in FIG. 25E and a projection of an edge of a cavity of auricular concha on a sagittal plane according to some embodiments of the present disclosure. As shown in FIG. 26, an abscissa may represent a frequency (unit: Hz), and an ordinate may represent a sound pressure level (unit: dB) at the opening of the ear canal corresponding to different frequencies. A curve 1801 refers to a frequency response curve when the distance between the projection of the end of the sound production component 11 on the sagittal plane and the projection of the edge of the cavity of auricular concha on the sagittal plane is 0. A curve 1802 refers to a frequency response curve when the distance between the projection of the end of the sound production component 11 on the sagittal plane and the projection of the edge of the cavity of auricular concha y on the sagittal plane is 3.72 mm. A curve 1803 refers to a frequency response curve when the distance between the projection of the end of the sound production component 11 on the sagittal plane and the projection of the edge of the cavity of auricular concha on the sagittal plane is 10.34 mm. As shown in FIG. 26, the frequency response when the distance between the projection of the end of the sound production component 11 on the sagittal plane and the projection of the edge of the cavity of auricular concha on the sagittal plane is 0 and 3.72 mm may be better than the frequency response when the distance between the projection of the end of the sound production component 11 on the sagittal plane and the projection of the edge of the cavity of auricular concha cavity on the sagittal plane is 10.34 mm. Accordingly, in some embodiments, to ensure a good listening effect of the earphone 10, the distance between the projection of the end FE of the sound production component 11 on the sagittal plane and the projection of the edge of the cavity of auricular concha on the sagittal plane may be not greater than 10.34 mm. Preferably, the distance between the projection of the end FE of the sound production component 11 on the sagittal plane and the projection of the edge of the cavity of auricular concha on the sagittal plane may be within a range of 0 mm-7 mm. More preferably, the distance between the projection of the end FE of the sound production component 11 on the sagittal plane and the projection of the edge of the cavity of auricular concha on the sagittal plane may be within a range of 0 mm-5 mm. More preferably, the distance between the projection of the end FE of the sound production component 11 on the sagittal plane and the projection of the edge of the cavity of auricular concha on the sagittal plane may be within a range of 0 mm-3.72 mm. It should be noted that, in a specific scenario, another point of the projection of the end FE of the sound production component 11 on the sagittal plane other than the midpoint C3 may also abut against the edge of the cavity of auricular concha. At this time, the distance between the midpoint C3 of the projection of the end of the sound production component 11 on the sagittal plane and the projection of the edge of the cavity of auricular concha on the sagittal plane may be greater than 0 mm. In some embodiments, the distance between the midpoint C3 of the projection of the end of the sound production component 11 on the sagittal plane and the projection of the edge of the cavity of auricular concha on the sagittal plane may be within a range of 2 mm-7 mm. Preferably, the distance between the midpoint C3 of the projection of the end of the sound production component 11 on the sagittal plane and the projection of the edge of the cavity of auricular concha on the sagittal plane may be within a range of 2 mm-3.74 mm.

It should be noted that, when the projection of the end FE of the sound production component 11 on the sagittal plane is a curved line or a broken line, the midpoint C3 of the projection of the end FE of the sound production component 11 on the sagittal plane may be selected by a following exemplary method. A line segment may be determined through two points with a maximum distance of the projection of the end FE of the sound production component 11 on the sagittal plane along the short axis direction, a vertical centerline may be determined through a midpoint on the line segment, and an intersecting point between the vertical centerline and the projection may be determined as the midpoint C3 of the projection of the end FE of the sound production component 11 on the sagittal plane. In some embodiments, when the end FE of the sound production component 11 is a curved surface, a tangent point on a tangent line of the projection that is parallel to the short axis direction Z may be determined as the midpoint of the projection of the end FE of the sound production component 11 on the sagittal plane. In addition, in some embodiments of the present disclosure, the distance between the midpoint C3 of the projection of the end FE of the sound production component 11 on the sagittal plane and the projection of the edge of the cavity of auricular concha on the sagittal plane may be a minimum distance between the distance between the midpoint of the projection of the end FE of the sound production component 11 on the sagittal plane and the projection region of the edge of the cavity of auricular concha on the sagittal plane. Alternatively, the distance between the midpoint C3 of the projection of the end FE of the sound production component 11 on the sagittal plane and the projection of the edge of the cavity of auricular concha on the sagittal plane may be a distance between the distance between the midpoint C3 of the projection of the end FE of the sound production component 11 on the sagittal plane and the projection of the edge of the cavity of auricular concha along the sagittal axis.

The frequency response curves corresponding to different distances between the midpoint of the projection of the end of the sound production component 11 on the sagittal plane and the projection of the edge of the cavity of auricular concha on the sagittal plane obtained through the measurement in the embodiments of the present disclosure may be obtained through the measurement by changing the wearing position (e.g., translation along the sagittal axis direction) of the sound production component based on a certain wearing angle (an angle between the upper sidewall or the lower sidewall and the horizontal direction, e.g., an angle between the upper sidewall and the horizontal direction is 0°), a certain size along the long axis direction, a certain size along the short axis direction, and a certain size along the thickness direction.

Referring to FIGS. 25A-25C, when the size of the sound production component 11 and the auricle of the user is a fixed value, and the inclination angle of the sound production device 11 relative to the horizontal direction in the wearing state is a fixed value, a distance between the centroid O of the first projection of the sound production component 11 on the sagittal plane and a centroid P' of a projection of the opening of the ear canal (e.g., a region 1016 enclosed by dotted lines shown in FIGS. 25A-25E) on the sagittal plane may affect an action of the baffle formed by the sound production component 11 and the antihelix region and the position of the sound production component 11 relative to the opening of the ear canal, thereby affecting the listening intensity at the opening of the ear canal. For example, the smaller the distance between the centroid O of the first projection of the sound production component 11 on the sagittal plane and the centroid P' of the projection of the opening of the ear canal on the sagittal plane, the smaller a contact region between the sound production component 11 and the antihelix region, and the weaker the action of the baffle formed by the sound production component 11 and the antihelix region. However, when the overlap ratio of the area of the first projection of the sound production component 11 on the sagittal plane to the area of the projection of the cavity of auricular concha on the sagittal plane increases, the sound guiding hole of the sound production component 11 may be closer to the opening of the ear canal, thereby also improving the listening effect at the opening of the ear canal. Accordingly, when the overall size and the wearing manner of the sound production component 11 are fixed, the distance between the centroid O of the first projection of the sound production component 11 on the sagittal plane and the centroid P' of the projection of the opening of the ear canal on the sagittal plane may also be considered significantly.

Figure 27A:
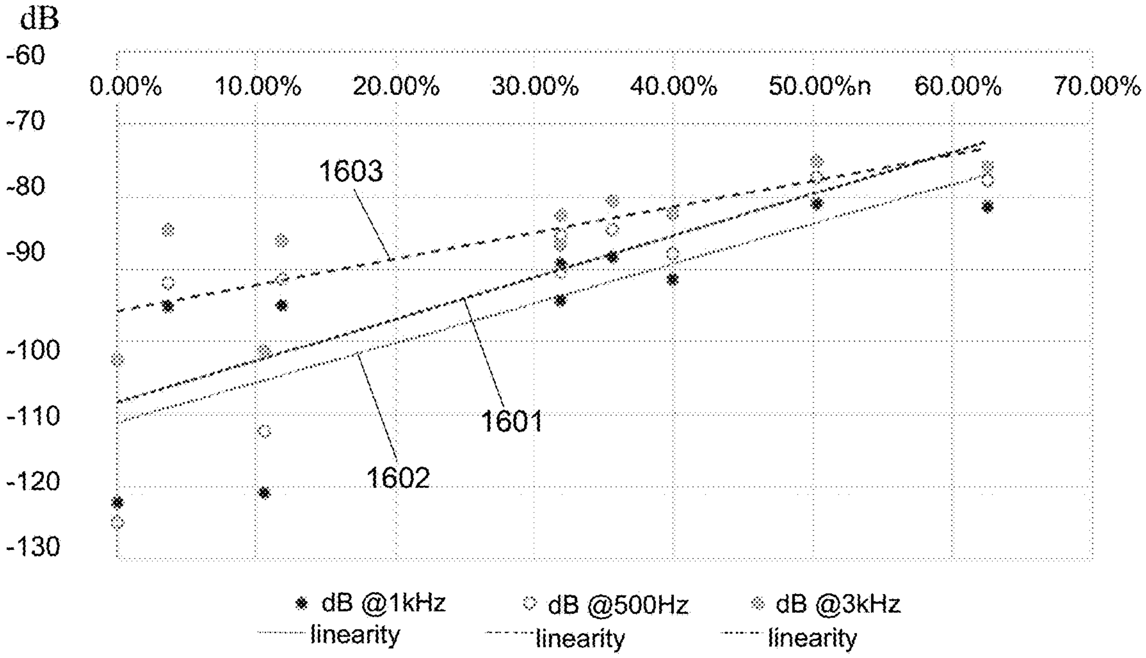
FIG. 27A is a diagram illustrating exemplary frequency response curves corresponding to different overlap ratios each of which is a ratio of an area of a first projection of a sound production component on a sagittal plane to an area of a cavity of an auricular concha of a user on the sagittal plane under a wearing scenario that the sound production component is not inserted into the cavity of auricular concha according to some embodiments of the present disclosure.
Figure 27B:
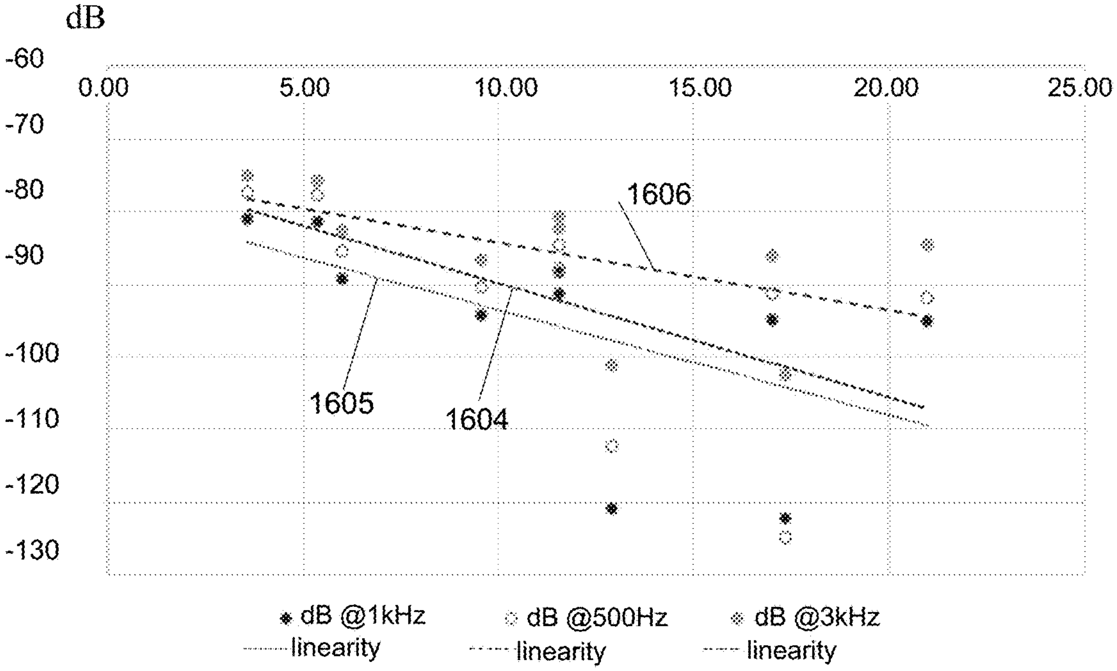
FIG. 27B is a diagram illustrating exemplary frequency response curves corresponding to different distances between a centroid of a first projection of a sound production component on a sagittal plane and a centroid of a projection of an opening of an ear canal on the sagittal plane under a wearing scenario that the sound production component is not inserted into a cavity of an auricular concha according to some embodiments of the present disclosure.

FIG. 27A is a diagram illustrating exemplary frequency response curves corresponding to different overlap ratios each of which is a ratio of an area of a first projection of a sound production component on a sagittal plane to an area of a projection of a cavity of auricular concha of a user on the sagittal plane under a wearing scenario that the sound production component does not extend into the cavity of auricular concha according to some embodiments of the present disclosure. FIG. 27B is a diagram illustrating exemplary frequency response curves corresponding to different distances between a centroid of a first projection of a sound production component on a sagittal plane and a centroid of a projection of an opening of an ear canal on the sagittal plane under a wearing scenario that the sound production component does not extend into a cavity of auricular concha according to some embodiments of the present disclosure.

Referring to FIG. 27A, an abscissa may represent an overlap ratio of the area of the first projection of the sound production component 11 on the sagittal plane to the area of the projection of the cavity of auricular concha on the sagittal plane, and an ordinate may represent a sound pressure level at the opening of ear canal corresponding to different overlap ratios. A straight line 1601 may represent a linear relationship obtained by simulating the overlap ratio of the area of the first projection to the area of the projection of the cavity of auricular concha on the sagittal plane with the sound pressure level at the opening of the ear canal when a frequency is 500 Hz. A straight line 1602 may represent a linear relationship obtained by simulating the overlap ratio of the area of the first projection to the area of the projection of the cavity of auricular concha on the sagittal plane with the sound pressure level at the opening of the ear canal when a frequency is 1 kHz. A straight line 1603 may represent a linear relationship obtained by simulating the overlap ratio of the area of the first projection to the area of the projection of the cavity of auricular concha on the sagittal plane with the sound pressure level at the opening of the ear canal when a frequency is 3 kHz. A hollow point shown in FIG. 27A may be test data corresponding to different overlap ratios of which each ratio is the area of the first projection to the area of the projection of the cavity of auricular concha on the sagittal plane when the frequency is 500 Hz. A black circular point shown in FIG. 27A may be test data corresponding to different overlap ratios of which each ratio is the area of the first projection to the area of the projection of the cavity of auricular concha on the sagittal plane when the frequency is 1 kHz. A circular point with a smaller gray value shown in FIG. 18A may be test data corresponding to different overlap ratios of which each ratio is the area of the first projection to the area of the projection of the cavity of auricular concha on the sagittal plane when the frequency is 3 kHz. As shown in FIG. 27A, under different frequencies, the overlap ratio of the area of the first projection to the area of the projection of the cavity of auricular concha on the sagittal plane and the sound pressure level at the opening of the ear canal may be substantially linear. When the overlap ratio of the area of the first projection of the sound production component 11 on the sagittal plane to the area of the projection of the cavity of auricular concha on the sagittal plane is greater than 10%, the sound with a specific frequency (e.g., 500 Hz, 1 kHz, and 3 kHz) measured at the opening of the ear canal may be increased significantly compared with that of a condition that the area of the first projection of the sound production component 11 on the sagittal plane does not overlap (the overlap ratio is 0) with the area of the projection of the cavity of auricular concha on the sagittal plane. In addition, when the overlap ratio of the area of the first projection of the sound production component 11 on the sagittal plane to the area of the projection of the cavity of auricular concha on the sagittal plane is too large, the open state of the opening of the ear canal may be affected, which in turn affects the user's access to the sound in the external environment. Accordingly, the overlap ratio of the area of the first projection of the sound production component 11 on the sagittal plane to the area of the projection of the cavity of auricular concha on the sagittal plane may not be too large. For example, the overlap ratio of the area of the first projection of the sound production component 11 on the sagittal plane to the area of the projection of the cavity of auricular concha on the sagittal plane may be not greater than 62%. Accordingly, in order to ensure the acoustic output quality of the sound production component 11, the overlap ratio of the area of the first projection of the sound production component 11 on the sagittal plane to the area of the projection of the cavity of auricular concha on the sagittal plane may be within a range of 10%-60%. Preferably, the overlap ratio of the area of the first projection of the sound production component 11 on the sagittal plane to the area of the projection of the cavity of auricular concha on the sagittal plane may be within a range of 10%-45%. More preferably, the overlap ratio of the area of the first projection of the sound production component 11 on the sagittal plane to the area of the projection of the cavity of auricular concha on the sagittal plane may be within a range of 11.82%-40%. Preferably, the overlap ratio of the area of the first projection of the sound production component 11 on the sagittal plane to the area of the projection of the cavity of auricular concha on the sagittal plane may be within a range of 18%-38%. More preferably, the overlap ratio of the area of the first projection of the sound production component 11 on the sagittal plane to the area of the projection of the cavity of auricular concha on the sagittal plane may be within a range of 25%-38%.

Referring to FIG. 27B, an abscissa may represent a distance between a centroid O of the first projection of the sound production component 11 on the sagittal plane and a centroid P' of the projection of the opening of the ear canal on the sagittal plane, and an ordinate may represent a sound pressure level at the opening of the ear canal corresponding to different distances. A straight line 1604 may represent a linear relationship between the distance between the centroid O of the first projection of the sound production component 11 on the sagittal plane and the centroid P' of the projection of the opening of the ear canal on the sagittal plane and the sound pressure level at the opening of the ear canal when the frequency is 500 Hz under an ideal state. A straight line 1605 may represent a linear relationship between the distance between the centroid O of the first projection of the sound production component 11 on the sagittal plane and the centroid P' of the projection of the opening of the ear canal on the sagittal plane and the sound pressure level at the opening of the ear canal when the frequency is 1 kHz. A straight line 1606 may represent a linear relationship between the distance between the centroid O of the first projection of the sound production component 11 on the sagittal plane and the centroid P' of the projection of the opening of the ear canal on the sagittal plane and the sound pressure level at the opening of the ear canal when the frequency is 3 kHz. A hollow circular point shown in FIG. 27B may be test data corresponding to different distances between the centroid O of the first projection of the sound production component 11 on the sagittal plane and the centroid P' of the projection of the opening of the ear canal on the sagittal plane when the frequency is 500 Hz. A black circular point shown in FIG. 27B may be test data corresponding to different distances between the centroid O of the first projection of the sound production component 11 on the sagittal plane and the centroid P' of the projection of the opening of the ear canal on the sagittal plane when the frequency is 1 kHz. A circular point with a smaller gray value shown in FIG. 27B may be test data corresponding to different distances between the centroid O of the first projection of the sound production component 11 on the sagittal plane and the centroid P' of the projection of the opening of the ear canal on the sagittal plane when the frequency is 3 kHz. As shown in FIG. 27B, under different frequencies, the distance between the centroid O of the first projection of the sound production component 11 on the sagittal plane and the centroid P' of the projection of the opening of the ear canal on the sagittal plane may be substantially negatively correlated with the sound pressure level at the opening of the ear canal. As a whole, the sound with a specific frequency (e.g., 500 Hz, 1 kHz, and 3 kHz) measured at the opening of the ear canal may be reduced with an increase of the distance between the centroid O of the first projection of the sound production component 11 on the sagittal plane and the centroid P' of the projection of the opening of the ear canal on the sagittal plane. Referring to FIG. 27A and FIG. 27B, the greater the distance between the centroid O of the first projection of the sound production component 11 on the sagittal plane and the centroid P' of the projection of the opening of the ear canal on the sagittal plane, the less the overlap ratio of the area of the first projection of the sound production component 11 on the sagittal plane to the area of the projection of the opening of the ear canal on the sagittal plane. The overlap ratio may affect a relative position between the sound guiding hole of the sound production component 11 and the opening of the ear canal. For example, the greater the distance between the centroid O of the first projection of the sound production component 11 on the sagittal plane and the centroid P' of the projection of the opening of the ear canal on the sagittal plane, the greater the overlap ratio. At this time, the sound guiding hole of the sound production component 11 may be closer to the opening of the ear canal, and the listening effect at the opening of the ear canal may be better. In addition, when the distance between the centroid O of the first projection of the sound production component 11 on the sagittal plane and the centroid P' of the projection of the opening of the ear canal on the sagittal plane is too small, the overlap ratio of the area of the first projection of the sound production component 11 on the sagittal plane to the area of the projection of the opening of the ear canal on the sagittal plane may be too large, and the sound production component 11 may cover the opening of the ear canal of the user, affecting the user's access to the sound information in the external environment. As shown in FIG. 27B, taking the frequency 3 kHz as an example, when the distance between the centroid O of the first projection of the sound production component 11 on the sagittal plane and the centroid P' of the projection of the opening of the ear canal on the sagittal plane is 4 mm, 5.8 mm, and 12 mm, the sound pressure level measured at the opening of the ear canal may be −73 dB, −76 dB, and −82 dB respectively. When the distance between the centroid O of the first projection of the sound production component 11 on the sagittal plane and the centroid P' of the projection of the opening of the ear canal on the sagittal plane is 17 mm and 22 mm, the sound pressure level measured at the opening of the ear canal may be −85 dB and −83 dB, respectively. Accordingly, the distance between the centroid O of the first projection of the sound production component 11 on the sagittal plane and the centroid P' of the projection of the opening of the ear canal on the sagittal plane may not be too large. In some embodiments, in order to ensure a good acoustic output quality (e.g., the sound pressure level at the opening of the ear canal is greater than −82 dB) in the wearing state of the earphone and to ensure the user's access to the sound information in the external environment, the distance between the centroid O of the first projection of the sound production component 11 on the sagittal plane and the centroid P' of the projection of the opening of the ear canal on the sagittal plane may be within a range of 3 mm-13 mm. Preferably, the distance between the centroid O of the first projection of the sound production component 11 on the sagittal plane and the centroid P' of the projection of the opening of the ear canal on the sagittal plane may be within a range of 4 mm-10 mm. Preferably, the distance between the centroid O of the first projection of the sound production component 11 on the sagittal plane and the centroid P' of the projection of the opening of the ear canal on the sagittal plane may be within a range of 4 mm-7 mm. Preferably, the distance between the centroid O of the first projection of the sound production component 11 on the sagittal plane and the centroid P' of the projection of the opening of the ear canal on the sagittal plane may be within a range of 4 mm-6 mm.

It should be noted that the frequency response curves corresponding to different overlap ratios, the centroid of the first projection, and the centroid of the projection of the opening of the ear canal on the sagittal plane obtained through the measurement in the embodiments of the present disclosure may be obtained through the measurement by changing the wearing position (e.g., translation along the sagittal axis direction) of the sound production component based on a certain wearing angle (an angle between the upper sidewall or the lower sidewall and the horizontal direction, e.g., an angle between the upper sidewall and the horizontal direction is 0°), a certain size along the long axis direction, a certain size along the short axis direction, and a certain size along the thickness direction.

Referring to FIG. 22, In some embodiments, the listening volume of the sound production component 11, the sound leakage reduction effect, and the wearing comfort and stability may also be improved by adjusting the distance between the centroid O of the first projection and the contour of the second projection. For example, when the sound production component 11 is located at the top of the auricle, the earlobe, the facial region on the front side of the auricle, or between the inner contour of the auricle and the edge of the cavity of auricular concha, it may be specifically embodied as that the distance between the centroid O of the first projection and a point of a certain region of the edge of the second projection may be too small, the distance between the centroid O of the first projection and a point of another region of the edge of the second projection may too large, and the antihelix region may not cooperate with the sound production component 11 to act as the baffle, affecting the acoustic output effect of the earphone. In addition, if the distance between the centroid O of the first projection and the point of the certain region of the edge of the second projection is too large, a gap may be formed between the end FE of the sound production component 11 and the inner contour 1014 of the auricle, and the sound emitted from the sound guiding hole and the sound emitted from the pressure relief hole may produce an acoustic short circuit in a region between the end FE of the sound production component 11 and the inner contour 1014 of the auricle, resulting in a decrease in the listening volume at the opening of the ear canal of the user. The larger the region between the end FE of the sound production component 11 and the inner contour 1014 of the auricle, the more obvious the acoustic short circuit. In some embodiments, when the wearing state of the earphone 10 is that at least part of the sound production component 11 covers the antihelix region of the user, the centroid O of the first projection of the sound production component 11 on the sagittal plane of the head of the user may also be located in a region enclosed by the contour of the second projection, but compared with at least part of the sound production component 11 extending into the cavity of auricular concha of the user, in the wearing state, the distance between the centroid O of the first projection of the sound production component 11 on the sagittal plane of the head of the user and the contour of the second projection may be different. In the earphones in FIGS. 23-25E, at least part of the structure of the sound production component 11 may cover the antihelix region, which may fully expose the opening of the ear canal, and make the user better receive the sound from the external environment. In some embodiments, in order to consider the listening volume of the sound production component 11, the sound leakage reduction effect, the effect of receiving the sound from the external environment, and reducing the region between the end FE of the sound production component 11 and the inner contour 1014 of the auricle as much as possible in the wearing manner, to make the sound production component 11 have better acoustic output quality, the distance between the centroid O of the first projection and the contour of the second projection may be within a range of 13 mm-54 mm. Preferably, the distance between the centroid O of the first projection and the contour of the second projection may be within a range of 18 mm-50 mm. More preferably, the distance between the centroid O of the first projection and the contour of the second projection may be within a range of 20 mm-45 mm. In some embodiments, by controlling the distance between the centroid O of the first projection of the sound production component 11 on the sagittal plane of the head of the user and the contour of the second projection to be within a range of 23 mm-40 mm, the sound production component 11 may be roughly located in the antihelix region of the user, and at least part of the sound production component 11 may form the baffle with the antihelix region, to increase the sound path of the sound emitted from the pressure relief hole to the external ear canal 101, thereby increasing the sound path difference from the sound guiding hole and the pressure relief hole to the external ear canal 101, increasing the sound intensity at the external ear canal 101, and reducing the volume of far-field sound leakage.

Referring to FIG. 22 and FIG. 27B, in the wearing state of the earphone, the distance between the centroid O of the first projection and the centroid P' of the projection of the opening of the ear canal on the sagittal plane may be substantially negatively correlated with the sound pressure level at the opening of the ear canal of the user. When the distance between the centroid O of the first projection of the sound production component 11 on the sagittal plane and the centroid P' of the projection of the opening of the ear canal on the sagittal plane is too small, the overlap ratio of the area of the first projection of the sound production component 11 on the sagittal plane to the area of the projection of the opening of the ear canal on the sagittal plane may be too large, and the sound production component 11 may cover the opening of the ear canal of the user, affecting the user's access to the sound information in the external environment. Considering that the position of the opening of the ear canal of the human ear relative to the auricle is fixed, in some embodiments, a ratio of the distance between the centroid O of the first projection and the centroid P' of the projection of the opening of the ear canal on the sagittal plane to the distance between the centroid O of the first projection and the projection of the contour of the second projection on the sagittal plane may reflect the position of the sound production component 11 relative to the auricle and the opening of the ear canal when the user wears the earphone. For example, the smaller the ratio, the closer the centroid O of the first projection is to the opening of the ear canal. In some embodiments, in order to ensure the listening effect at the opening of the ear canal of the user and keep the open state of the opening of the ear canal for accessing the sound information in the external environment, the ratio of the distance between the centroid O of the first projection and the centroid P' of the projection of the opening of the ear canal on the sagittal plane to the distance between the centroid of the first projection and the projection of the contour of the second projection on the sagittal plane may be within a range of 0.07-0.54. Preferably, the ratio of the distance between the centroid O of the first projection and the centroid P' of the projection of the opening of the ear canal on the sagittal plane to the distance between the centroid of the first projection and the projection of the contour of the second projection on the sagittal plane may be within a range of 0.15-0.54. By adjusting the ratio of the distance between the centroid O of the first projection and the centroid P' of the projection of the opening of the ear canal on the sagittal plane to the distance between the centroid of the first projection and the projection of the contour of the second projection on the sagittal plane, the distance between the sound guiding hole of the sound production component and the opening of the ear canal may be further reduced on the premise of ensuring that the sound production component does not cover the opening of the ear canal as much as possible, thereby ensuring a good listening effect at the opening of the ear canal of the user and keeping the open state of the opening of the ear canal for accessing to the sound information in the external environment. More preferably, the ratio of the distance between the centroid O of the first projection and the centroid P' of the projection of the opening of the ear canal on the sagittal plane to the distance between the centroid of the first projection and the projection of the contour of the second projection on the sagittal plane may be within a range of 0.2-0.4. By adjusting the ratio of the distance between the centroid O of the first projection and the centroid P' of the projection of the opening of the ear canal on the sagittal plane to the distance between the centroid of the first projection and the projection of the contour of the second projection on the sagittal plane to be within a suitable range, a good listening effect at the opening of the ear canal of the user may be further improved, and the open state of the opening of the ear canal of the user may be kept to access to the sound information in the external environment.

In some embodiments, in order to avoid that the distance between the centroid O of the first projection and the projection of the first portion 121 of the ear hook on the sagittal plane is too large to cause unstable wearing and the problem that the region between the end FE of the sound production component 11 and the inner contour 1014 of the auricle is relatively large, and avoid that the distance between the centroid O of the first projection and the projection of the first portion 121 of the ear hook 12 on the sagittal plane is too small to cause poor wearing comfort and be unable to match with the antihelix region to achieve relatively good acoustic output quality, the distance between the centroid O of the first projection of the sound production component 11 on the sagittal plane of the user and the first portion 121 of the ear hook on the sagittal plane may be controlled to be within 8 mm-45 mm. It can be understood that by controlling the distance to be within the range of 8 mm-45 mm, the first portion 121 of the ear hook may fit well with the rear inner side of the auricle of the user when wearing the earphone, and the sound production component 11 may be ensured to be just located in the antihelix region of the user, to make the sound production component 11 form the baffle with the antihelix region and increase the sound path of the sound emitted from the pressure relief hole to the external ear canal 101, thereby increasing the sound path difference between the sound guiding hole and the pressure relief hole to the external ear canal 101, increasing the sound intensity at the external ear canal 101, and reducing the volume of far-field sound leakage. In addition, the distance between the centroid O of the first projection of the sound production component 11 on the sagittal plane of the user and the projection of the first portion 121 of the ear hook on the sagittal plane may be controlled to be within the range of 8 mm-45 mm, which may make the region between the end FE of the sound production component 11 and the inner contour 1014 of the auricle minimized to reduce the acoustic short circuit region around the sound production component 11, thereby increasing the listening volume at the opening of the ear canal of the user. Preferably, in order to further improve the wearing stability of the earphone, in some embodiments, the distance between the centroid O of the first projection of the sound production component 11 on the sagittal plane of the user and the first portion 121 of the ear hook on the sagittal plane may be within a range of 10 mm-41 mm. More preferably, the distance between the centroid O of the first projection of the sound production component 11 on the sagittal plane of the user and the first portion 121 of the ear hook on the sagittal plane may be within a range of 13 mm-37 mm. More preferably, the distance between the centroid O of the first projection of the sound production component 11 on the sagittal plane of the user and the first portion 121 of the ear hook on the sagittal plane may be within a range of 15 mm-33 mm. Further preferably, the distance between the centroid O of the first projection of the sound production component 11 on the sagittal plane of the user and the first portion 121 of the ear hook on the sagittal plane may be within a range of 20 mm-25 mm.

In some embodiments, the ear hook 12 may be elastic, and may deform to a certain extent in the wearing state compared with the non-wearing state. For example, in some embodiments, the distance between the centroid O of the first projection of the sound production component 11 on the sagittal plane of the user and the first portion 121 of the ear hook on the sagittal plane in the wearing state may be greater than that in the non-wearing state. Exemplarily, in some embodiments, when the earphone 10 is in the non-wearing state, the distance between the centroid of the projection of the sound production component 11 on a specific reference plane and the first portion 121 of the ear hook on the specific reference plane may be within a range of 6 mm-40 mm. Preferably, the distance between the centroid of the projection of the sound production component 11 on the specific reference plane and the first portion 121 of the ear hook on the specific reference plane may be within a range of 9 mm-32 mm. It can be understood that in some embodiments, by making the distance between the centroid of the projection of the sound production component 11 on the specific reference plane and the first portion 121 of the ear hook on the specific reference plane in the non-wearing state slightly smaller than that in the wearing state, when the earphone 10 is in the wearing state, the ear hook and the sound production component may product a certain clamping force on the ear of the user, to improve the wearing stability for the user without affecting the wearing experience of the user. The content regarding the specific reference plane may be found elsewhere in the present disclosure, which is not repeated here.

In some embodiments, when the wearing state of the earphone 10 is that at least part of the sound production component 11 covers the antihelix region of the user, the centroid O of the first projection of the sound production component 11 on the sagittal plane of the user may be located outside a projection region of the opening of the ear canal on the sagittal plane, making the opening of the ear canal fully open to better receive sound information from the external environment. The position of the centroid O of the first projection may be related to the size of the sound production component. If the size of the sound production component 11 in the long axis direction Y or the short axis direction Z is too small, the volume of the sound production component 11 may be relatively small, and then an area of a diaphragm inside the sound production component 11 may also be relatively small, resulting in low efficiency of the diaphragm driving the air inside the housing of the sound production component 11 to produce sound, which may affect the acoustic output effect of the earphone. When the size of the sound production component 11 in the long axis direction Y is too large, the sound production component 11 may exceed the auricle, the inner contour of the auricle may not support and limit the sound production component 11, and thus the earphone may be liable to fall off in the wearing state. In addition, when the size of the sound production component 11 in the long axis direction Y is too small, a gap may be formed between the end FE of the sound production component 11 and the inner contour 1014 of the auricle, and the sound emitted from the sound guiding hole and the sound emitted from the pressure relief hole may have an acoustic short circuit in the region between the end FE of the sound production component 11 and the inner contour 1014 of the auricle, resulting in a decrease in the listening volume at the opening the ear canal of the user. The larger the region between the end FE of the sound production component 11 and the inner contour 1014 of the auricle, the more obvious the acoustic short circuit. When the size of the sound production component 11 in the short axis direction Z is too large, the sound production component 11 may cover the opening of the ear canal of the user, affecting the user's access to the sound information from the external environment. In some embodiments, in order to make the sound production component have better acoustic output quality, when the earphone is in the wearing state, the distance between the centroid of the first projection of the sound production component on the sagittal plane of the user and the centroid of the projection of the opening of the ear canal of the user on the sagittal plane may not be greater than 25 mm. Preferably, the distance between the centroid of the first projection of the sound production component on the sagittal plane of the user and the centroid of the projection of the opening of the ear canal of the user on the sagittal plane may be within a range of 5 mm-23 mm. More preferably, the distance between the centroid of the first projection of the sound production component on the sagittal plane of the user and the centroid of the projection of the opening of the ear canal of the user on the sagittal plane may be within a range of 8 mm-20 mm. In some embodiments, by controlling the distance between the centroid of the first projection of the sound production component on the sagittal plane of the user and the centroid of the projection of the opening of the ear canal of the user on the sagittal plane to be within the range of 10 mm-17 mm, the centroid O of the first projection may be roughly located in the antihelix region of the user. Therefore, the sound output by the sound production component may be better transmitted to the user, the opening of the ear canal may keep fully open to obtain the sound information from the external environment. Meanwhile, the inner contour of the auricle may also make at least part of the sound production component 11 be subjected to a force that hinders its downward movement, thereby improving the wearing stability of the earphone 10 to a certain extent. It should be noted that the shape of the projection of the opening of the ear canal on the sagittal plane may be approximately regarded as an ellipse. Correspondingly, the centroid of the projection of the opening of the ear canal on the sagittal plane may be a geometric center of the ellipse.

In some embodiments, when the earphone 10 is in the wearing state and at least part of the sound production component 11 covers the antihelix region of the user, a distance between the centroid O of the first projection and a centroid W of a projection of the battery compartment 13 on the sagittal plane may vary to a certain extent compared with the wearing manner in which at least part of the sound production component 11 extends into the cavity of auricular concha of the user. It may be the same as the wearing manner in which at least part of the sound production component 11 extends into the cavity of auricular concha of the user. Referring to FIGS. 25A-25E, in order to make the user have better stability and comfort when the user wears the earphone 10, in the wearing state, the distance (a sixth distance) between the centroid O of the projection of the sound production component 11 on the sagittal plane and the centroid W of the projection of the battery compartment 13 on the sagittal plane may be controlled to be within a range of 20 mm-31 mm. Preferably, the distance between the centroid O of the projection of the sound production component 11 on the sagittal plane and the centroid W of the projection of the battery compartment 13 on the sagittal plane may be within a range of 22 mm-28 mm. More preferably, the distance between the centroid O of the projection of the sound production component 11 on the sagittal plane and the centroid W of the projection of the battery compartment 13 on the sagittal plane may be within a range of 23 mm-26 mm. Due to the elasticity of the ear hook, in the wearing state and the non-wearing state of the earphone 10, the distance between the centroid O of the projection corresponding to the sound production component 11 and the centroid W of the projection corresponding to the battery compartment 13 may vary. In some embodiments, in the non-wearing state, a distance (a fifth distance) between the centroid O of the projection of the sound production component 11 on a specific reference plane and the centroid W of the projection of the battery compartment 13 on the specific reference plane may be within a range of 16.7 mm-25 mm. Preferably, in the non-wearing state, the distance between the centroid O of the projection of the sound production component 11 on the specific reference plane and the centroid W of the projection of the battery compartment 13 on the specific reference plane may be within a range of 18 mm-23 mm. More preferably, in the non-wearing state, the distance between the centroid O of the projection of the sound production component 11 on the specific reference plane and the centroid W of the projection of the battery compartment 13 on the specific reference plane may be within a range of 19.6 mm-21.8 mm.

Taking the specific reference plane as the sagittal plane for an example, in some embodiments, when the earphone 10 is in the wearing state and the non-wearing state, a variation value (a ratio of a difference between the fourth distance and the third distance to the third distance) of the distance between the centroid O of the projection corresponding to the sound production component 11 and the centroid W of the projection corresponding to the battery compartment 13 may reflect a softness of the ear hook. It can be understood that when the softness of the ear hook is too large, the overall structure and shape of the earphone 10 may not be stable, the sound production component 11 and the battery compartment 13 may not be strongly supported, the wearing stability may also be poor, and the earphone 10 may be liable to fall off. Considering that the ear hook needs to be hung at a connection part between the auricle and the head, when the softness of the ear hook is too small, the earphone 10 may not be liable to deform, and when the user wears the earphone, the ear hook may stick tightly and even compress a region between the human ear and/or head, affecting the wearing comfort. Accordingly, in order to make the user have better stability and comfort when wearing the earphone 10, in some embodiments, a ratio of the variation value of the distance between the centroid O of the first projection U and the centroid W of the projection of the battery compartment 13 on the sagittal plane in the wearing state and the non-wearing state of the earphone 10 to the distance between the centroid O of the first projection U and the centroid W of the projection of the battery compartment 13 on the sagittal plane in the non-wearing state of the earphone may be within a range of 0.3-0.7. Preferably, the ratio of the variation value of the distance between the centroid O of the projection on the sagittal plane and the centroid W of the projection of the battery compartment 13 on the sagittal plane in the wearing state and the non-wearing state of the earphone 10 to the distance between the centroid O of the projection and the centroid W of the projection of the battery compartment 13 in the non-wearing state of the earphone may be within a range of 0.45-0.68. The content regarding the specific reference plane may be found elsewhere in the present disclosure (e.g., FIG. 10A and FIG. 10 and corresponding content thereof).

In addition, while ensuring that the ear canal is not blocked, it is also considered that the size (especially the size along the long axis direction Y of the first projection) of the baffle formed by the sound production component 11 and the antihelix region may be as large as possible, and the overall volume of the sound production component 11 may not be too large or too small. Therefore, a wearing angle of the sound production component 11 relative to the antihelix region may also be considered on the premise that the overall volume or shape of the sound production component 11 is a fixed value.

The whole or part structure of the sound production component 11 may cover the antihelix region to form the baffle. The listening effect when the user wears the earphone 10 may be related to a distance between the sound guiding hole and the pressure relief hole of the sound production component 11. The closer the distance between the sound guiding hole and the pressure relief hole, the more the sound emitted from the sound guiding hole and the sound emitted from the pressure relief hole may be cancelled at the opening of the ear canal of the user, and the smaller the listening volume at the opening of the ear canal of the user. The distance between the sound guiding hole and the pressure relief hole may be related to the size of the sound production component 11. For example, the sound guiding hole may be arranged on a sidewall (e.g., the lower sidewall or the inner side) of the sound production component 11 close to the opening of the ear canal of the user, and the pressure relief hole may be arranged on a side wall (e.g., the upper side wall or the outer side) of the sound production component 11 away from the opening of the ear canal of the user. Accordingly, the size of the sound production component may affect the listening volume at the opening of the ear canal of the user. For example, when the size is too large, most regions of the ear may be pressed, affecting the wearing comfort and the convenience of carrying around for the user. A ratio of a distance between a midpoint of a projection of the upper sidewall 111 and the lower sidewall 112 of the sound production component 11 on the sagittal plane and a highest point of the second projection to a distance between the centroid O of the first projection and the highest point of the second projection may reflect the size of sound production component 11 along the short axis direction Z and the position of the sound production component 11 relative to the opening of the ear canal. For example, when the size of sound production component 11 along the short axis direction Z is a fixed value, the farther the sound production component 11 is away from the highest point of the auricle, the larger the ratio of the distance between the midpoint of the projection of the upper sidewall 111 of the sound production component 11 on the sagittal plane and the highest point of the second projection to the distance between the centroid O of the first projection and the highest point of the second projection, and the smaller the ratio of the distance between the midpoint of the projection of the lower sidewall 112 of the sound production component 11 on the sagittal plane and the highest point of the second projection to the distance between the centroid of the first projection and the highest point of the second projection. Similarly, when the distance between the centroid O of the first projection of the sound production component 11 and the highest point of the second projection of the auricle is a fixed value, the larger the size of the sound production component 11 along the short axis direction Z, the smaller the ratio of the distance between the midpoint of the projection of the upper sidewall 111 of the sound production component 11 on the sagittal plane and the highest point of the second projection to the distance between the centroid O of the first projection and the highest point of the second projection, and the larger the ratio of the distance between the midpoint of the projection of the lower sidewall 112 of the sound production component 11 on the sagittal plane and the highest point of the second projection to the distance between the centroid O of the first projection and the highest point of the second projection. In order to improve the listening effect of the earphone 10 while ensuring that the earphone 10 does not block the opening of the ear canal of the user, in some embodiments, the ratio of the distance between the midpoint of the projection of the upper sidewall 111 of the sound production component 11 on the sagittal plane and the highest point of the second projection to the distance between the centroid O of the first projection and the highest point of the second projection may be within a range of 0.65-0.85, or the ratio of the distance between the midpoint of the projection of the lower sidewall 112 of the sound production component 11 on the sagittal plane and the highest point of the second projection to the distance between the centroid O of the first projection and the highest point of the second projection may be within a range of 1.17-1.4. Preferably, the ratio of the distance between the midpoint of the projection of the upper sidewall 111 of the sound production component 11 on the sagittal plane and the highest point of the second projection to the distance between the centroid O of the first projection and the highest point of the second projection may be within a range of 0.7-0.8, or the ratio of the distance between the midpoint of the projection of the lower sidewall 112 of the sound production component 11 on the sagittal plane and the highest point of the second projection to the distance between the centroid O of the first projection and the highest point of the second projection may be within a range of 1.2-1.3. By adjusting the ratio of the distance between the midpoint C1 of the projection of the upper sidewall 111 of the sound production component 11 on the sagittal plane and the highest point A1 of the second projection to the distance between the centroid O of the first projection and the highest point A1 of the second projection, or the ratio of the distance between the midpoint C2 of the projection of the lower sidewall 112 of the sound production component 11 on the sagittal plane and the highest point A1 of the second projection to the distance between the centroid O of the first projection and the highest point A1 of the second projection, the distance between the sound guiding hole of the sound production component and the opening of the ear canal may be further reduced on the premise that the sound production component does not cover the opening of the ear canal as much as possible, thereby ensuring a good listening effect at the opening of the ear canal of the user and keeping the open state of the opening of the ear canal to access to the sound information from the external environment.

In some embodiments, the distance between the midpoint of the projection of the upper sidewall 111 and the lower sidewall 112 of the sound production component 11 on the sagittal plane and the highest point of the second projection may reflect the size of the sound production component 11 along the short axis direction Z. Accordingly, in order to improve the listening effect of the earphone 10 while ensuring that the earphone 10 does not block the opening of the ear canal of the user, in some embodiments, when the wearing state of the earphone 10 is that at least part of the sound production component 11 covers the antihelix region of the user, the distance between the midpoint of the projection of the upper sidewall 111 of the sound production component 11 on the sagittal plane and the highest point of the second projection may be within a range of 12 mm-24 mm, and the distance between the midpoint of the projection of the lower sidewall 112 of the sound production component 11 on the sagittal plane and the highest point of the second projection may be within a range of 22 mm-34 mm. Preferably, the distance between the midpoint of the projection of the upper sidewall 111 of the sound production component 11 on the sagittal plane and the highest point of the second projection may be within a range of 12.5 mm-23 mm, and the distance between the midpoint of the projection of the lower sidewall 112 of the sound production component 11 on the sagittal plane and the highest point of the second projection may be within a range of 22.5 mm-33 mm. It should be noted that, when the projection of the upper sidewall 111 of the sound production component 11 on the sagittal plane is a curved line or a broken line, the midpoint of the projection of the upper sidewall 111 of the sound production component 11 on the sagittal plane may be selected by the following exemplary method. A line segment may be drawn by selecting two farthest points on the projection of the upper sidewall 111 on the sagittal plane along the long axis direction, a mid-perpendicular line may be drawn by selecting a midpoint on the line segment, and an interacting point of the mid-perpendicular line and the projection may be the midpoint of the projection of the upper sidewall 111 of the sound production component 11 on the sagittal plane. In some alternative embodiments, a point on the projection of the upper sidewall 111 on the sagittal plane with a smallest distance from the highest point of the second projection may be selected as the midpoint of the projection of the upper sidewall 111 of the sound production component 11 on the sagittal plane. The midpoint of the projection of the lower sidewall 112 of the sound production component 11 on the sagittal plane may be selected in the same manner as above. For example, a point on the projection of the lower sidewall 112 on the sagittal plane with a greatest distance from the highest point of the second projection may be selected as the midpoint of the projection of the lower sidewall 112 of the sound production component 11 on the sagittal plane.

In some embodiments, a distance between the midpoint of the projection of the upper sidewall 111 and the lower sidewall 112 of the sound production component 11 on the sagittal plane and a projection of the upper vertex of the ear hook on the sagittal plane may reflect the size of the sound production component 11 along the short axis direction Z. In order to improve the listening effect of the earphone 10 while ensuring that the earphone 10 does not block the opening of the ear canal of the user, in some embodiments, the distance between the midpoint of the projection of the upper sidewall 111 of the sound production component 11 on the sagittal plane and the projection of the upper vertex of the ear hook on the sagittal plane may be within a range of 13 mm-20 mm, and the distance between the midpoint of the projection of the lower sidewall 112 of the sound production component 11 on the sagittal plane and the projection of the upper vertex of the ear hook on the sagittal plane may be within a range of 22 mm-36 mm. Preferably, the distance between the midpoint of the projection of the upper sidewall 111 of the sound production component 11 on the sagittal plane and the projection of the upper vertex of the ear hook on the sagittal plane may be within a range of 14 mm-19.5 mm, and the distance between the midpoint of the projection of the lower sidewall 112 of the sound production component 11 on the sagittal plane and the projection of the upper vertex of the ear hook on the sagittal plane may be within a range of 22.5 mm-35 mm. More preferably, the distance between the midpoint of the projection of the upper sidewall 111 of the sound production component 11 on the sagittal plane and the projection of the upper vertex of the ear hook on the sagittal plane may be within a range of 15 mm-18 mm, and the distance between the midpoint of the projection of the lower sidewall 112 of the sound production component 11 on the sagittal plane and the projection of the upper vertex of the ear hook on the sagittal plane may be within a range of 26 mm-30 mm.

In some embodiments, a distance between the centroid O of the first projection and the projection of the upper vertex of the ear hook on the sagittal plane may also reflect the size of the sound production component along the short axis direction Z. In order to improve the listening effect of the earphone 10 while ensuring that the earphone 10 does not block the opening of the ear canal of the user, in some embodiments, the distance between the centroid O of the first projection and the projection of the upper vertex of the ear hook on the sagittal plane may be within a range of 14 mm-28 mm. Preferably, the distance between the centroid O of the first projection and the projection of the upper vertex of the ear hook on the sagittal plane may be within a range of 18 mm-24 mm. By adjusting the distance between the centroid O of the first projection and the projection of the upper vertex T1 of the ear hook on the sagittal plane, the distance between the sound guiding hole of the sound production component and the opening of the ear canal may be further reduced on the premise that the sound production component does not cover the opening of the ear canal as much as possible, thereby ensuring the listening effect at the opening of the ear canal of the user and keeping the open state of the opening of the ear canal to access to the sound information from the external environment. As the ear hook is an elastic structure, the distance between the centroid O of the first projection and the projection of the upper vertex of the ear hook on the sagittal plane in the non-wearing state may be slightly smaller than the distance between the centroid O of the first projection and the projection of the upper vertex of the ear hook on the sagittal plane in the wearing state. In some embodiments, the distance between the centroid O of the first projection and the projection of the upper vertex of the ear hook on the sagittal plane in the non-wearing state may be within a range of 12 mm-26 mm. Preferably, the distance between the centroid O of the first projection and the projection of the upper vertex T1 of the ear hook on the sagittal plane in the non-wearing state may be within a range of 14 mm-24 mm. More preferably, the distance between the centroid O of the first projection and the projection of the upper vertex T1 of the ear hook on the sagittal plane in the non-wearing state may be within a range of 16 mm-22 mm. The technical effects regarding the distance between the centroid O of the first projection and the projection of the upper vertex T1 of the ear hook on the sagittal plane in the non-wearing state may refer to the descriptions in the wearing state. It should be noted that the distance between the centroid O of the first projection and the projection of the upper vertex T1 of the ear hook on the sagittal plane in the non-wearing state may be within a range of 14 mm-24 mm may be measured by a method of removing the auricle structure form the human head model and fixing the sound production component on the human head model at the same posture of the wearing state by using a fixing component or adhesive described in the present disclosure.

In some embodiments, in order to make part or the whole structure of the sound production component cover the antihelix region when the user wears the earphone as shown in FIG. 21, a certain included angle may be formed between the upper sidewall 111 of the sound production component 11 and the second portion 122 of the ear hook. Similar to the principle that at least part of the sound production component extends into the cavity of auricular concha, referring to FIG. 14A, the included angle may be represented by an included angle β between the projection of the upper sidewall 111 of the sound production component 11 on the sagittal plane and a tangent line 126 of a projection of a connection part between the second portion 122 of the ear hook and the upper sidewall 111 of the sound production component 11 on the sagittal plane. Specifically, the upper sidewall of the sound production component 11 and the second portion 122 of the ear hook may have the connection part. The projection of the connection part on the sagittal plane may be a point U. The tangent line 126 of the projection of the second portion 122 of the ear hook on the sagittal plane may be drawn through the point U. When the upper sidewall 111 is a curved surface, the projection of the upper sidewall 111 on the sagittal plane may be a curved line or a broken line. At this time, the included angle between the projection of the upper sidewall 111 on the sagittal plane and the tangent line 126 may be an included angle between a tangent line to a point at which the curved line or the broken line has a greatest distance from the ground plane and the tangent line 126. In some embodiments, when the upper sidewall 111 is the curved surface, a tangent line parallel to the long axis direction Y on the projection may also be selected, and an included angle between the tangent line and the horizontal direction may be used to represent the inclination angle between the projection of the upper sidewall 111 on the sagittal plane and the tangent line 126. In some embodiments, the included angle β may be within a range of 45°-110°. Preferably, the included angle β may be within a range of 60°-100°. More preferably, the included angle β may be within a range of 80°-95°.

The human head is approximately regarded as a quasi-sphere structure, and the auricle is a structure that protrudes relative to the head. When the user wears the earphone, part of the ear hook 12 may be attached to the head of the user. In order to make the sound production component 11 in contact with the antihelix region, in some embodiments, a certain inclination angle may be formed between the sound production component 11 and the ear hook plane when the earphone is in the wearing state. The inclination angle may be represented by an included angle between a plane corresponding to the sound production component 11 and the ear hook plane. In some embodiments, the plane 11A corresponding to the sound production component 11 may include an outer side and an inner side. In some embodiments, when the outer side or the inner side of the sound production component 11 is a curved surface, the plane corresponding to the sound production component 11 refers to a tangent plane corresponding to the curved surface at a center position, or a plane roughly coinciding with a curve enclosed by the edge contour of the curved surface. Taking the inner side of the sound production component 11 as an example, the included angle formed between the inner side and the ear hook plane may be the inclination angle of the sound production component 11 relative to the ear hook plane.

Considering that if the angle is too large, the contact area between the sound production component 11 and the antihelix region of the user may be small, sufficient contact resistance may not be provided, and the earphone may be liable to fall off when the user wears the earphone. In addition, the size (especially the size along long axis direction Y of the sound production component 11) of the baffle formed by the antihelix region covered by at least part of the sound production component 11 may be too small, and the sound path difference from the sound guiding hole and the pressure relief hole to the external ear canal 101 may be small, affecting the listening volume at the opening of the ear canal of the user. Furthermore, the size of the sound production component 11 along the long axis direction Y may be too small, the region between the end FE of the sound production component 11 and the inner contour 1014 of the auricle may be relatively large, and the sound emitted from the sound guiding hole and the sound emitted from the pressure relief hole may have the acoustic short circuit in the region between the end FE of the sound production component 11 and the inner contour 1014 of the auricle, resulting in a decrease in the listening volume at the opening of the ear canal of the user. In order to ensure that the user has a better listening effect when wearing the earphone 10, while ensuring the wearing stability and comfort, for example, in some embodiments, when the wearing manner of the earphone is that at least part of the sound production component covers the antihelix region of the user, and the earphone is in the wearing state, the inclination angle of the plane corresponding to the sound production component 11 relative to the ear hook plane may not be greater than 8°. Therefore, the sound production component 11 and the antihelix region of the user may have a relatively large contact region, improving the wearing stability. Meanwhile, most of the structure of the sound production component 11 may be located in the antihelix region, making the opening of the ear canal fully open, and facilitating the user to receive the sound from the external environment. Preferably, the inclination angle of the plane corresponding to the sound production component 11 relative to the ear hook plane may be within a range of 2°-7°. More preferably, the inclination angle of the plane corresponding to the sound production component 11 relative to the ear hook plane may be within a range of 3-6°.

Due to the elasticity of the ear hook, the inclination angle of the sound production component relative to the ear hook plane may vary to a certain extent in the wearing state and the non-wearing state. For example, the inclination angle in the non-wearing state may be smaller than that in the wearing state. In some embodiments, when the earphone is in the non-wearing state, the inclination angle of the sound production component relative to the ear hook plane may be within a range of 0°-6°. By making the inclination angle of the sound production component relative to the ear hook plane in the non-wearing state slightly smaller than that in the wearing state, the ear hook of the earphone 10 may clamp the ear of the user (e.g., the antihelix region) when the earphone is in the wearing state. Therefore, the wearing stability for the user may be improved without affecting the wearing experience of the user. Preferably, in the non-wearing state, the inclination angle of inclination of the sound production component relative to the ear hook plane may be within a range of 1°-6°. More preferably, in the non-wearing state, the inclination angle of the sound production component relative to the ear hook plane may be within a range of 2°-5°.

When the size of the sound production component 11 in the thickness direction X is too small, the volume of the front cavity and the rear cavity formed by the diaphragm and the housing of the sound production component 11 may be too small, the vibration amplitude of the vibration may be limited, and a large sound volume may not be provided. When the size of the sound production component 11 in the thickness direction X is too large, the overall size or weight of the sound production component 11 may be relatively large in the wearing state, which may affect the wearing stability and comfort. In some embodiments, in order to ensure that the sound production component 11 has a better acoustic output effect and to ensure the wearing stability, in some embodiments, when the wearing mode of the earphone is that at least part of the sound production component covers the antihelix region of the user, and the earphone is in the wearing state, a distance between a point on the sound production component farthest from the ear hook plane and the ear hook plane may be within a range of 12 mm-19 mm, and a distance between a point on the sound production component closest to the ear hook plane and the ear hook plane may be within a range of 3 mm-9 mm. Preferably, when the earphone is in the wearing state, the distance between the point on the sound production component farthest from the ear hook plane and the ear hook plane may be within a range of 13.5 mm-17 mm, and the distance between the point on the sound production component closest to the ear hook plane and the ear hook plane may be within a range of 4.5 mm-8 mm. More preferably, when the earphone is in the wearing state, the distance between the point on the sound production component farthest from the ear hook plane and the ear hook plane may be within a range of 14 mm-17 mm, and the distance between the point on the sound production component closest to the ear hook plane and the ear hook plane may be within a range of 5 mm-7 mm. In some embodiments, by controlling the distance between the point on the sound production component farthest from the ear hook plane and the ear hook plane to be within the range of 12 mm-19 mm, and controlling the distance between the point on the sound production component closest to the ear hook plane and the ear hook plane to be within the range of 3 mm-9 mm, the size of the sound production component along the thickness direction X and the long axis direction Y may be constrained, at least part of the sound production component may cooperate with the antihelix region of the user to form the baffle, and the earphone may be ensured to have better wearing comfort and stability. The overall structure of the earphone shown in FIG. 22 and FIG. 23 may be roughly the same as that of the earphone shown in FIG. 19A and FIG. 19B. The content regarding the inclination angle of the sound production component relative to the ear hook plane in the earphone shown in FIG. 22 and FIG. 23, and the distance between the point on the sound production component 11 farthest from the ear hook plane and the ear hook plane may be found in FIG. 19A and FIG. 19B.

In some embodiments, when the wearing manner of the earphone 10 is that at least part of the sound production component covers the antihelix region of the user, and the earphone is in the wearing state, at least part of the sound production component 11 may be subjected to an antihelix force to prevent from sliding down, thereby ensuring the acoustic output effect of the sound production component 11, and improving the wearing stability of the earphone through the force of the antihelix region on the sound production component 11. At this time, the sound production component 11 may have a certain inclination angle relative to the auricle surface of the user. When the inclination angle of the sound production component 11 relative to the auricle surface is large, the sound production component 11 may abut against the antihelix region, and the user may feel a strong sense of discomfort after wearing the earphone for a long time. Therefore, in order to make the user have better stability and comfort when wearing the earphone, and make that the sound production component 11 have a better acoustic output effect, the inclination angle of the sound production component of the earphone relative to the auricle surface may be within a range of 5°-40° in the wearing state. Preferably, in some embodiments, in order to further optimize the acoustic output quality and the wearing experience of the earphone in the wearing state, the inclination angle of the sound production component relative to the auricle surface may be controlled to be within a range of 8°-35°. More preferably, the inclination angle of the sound production component relative to the auricle surface may be controlled to be within a range of 15°-25°. It should be noted that the inclination angle of the sidewall of the sound production component 11 away from the head of the user or facing the opening of the ear canal of the user relative to the auricle surface of the user may be a sum of an included angle $\gamma 1$ between the auricle surface and the sagittal plane and an included angle $\gamma 2$ between the sidewall of the sound production component 11 away from the head of the user or facing the opening of the ear canal of the user and the sagittal plane. The content regarding the inclination angle of the sound production component relative to the auricle surface may be found elsewhere in the embodiments of the present disclosure (e.g., FIG. 15 and related descriptions thereof).

The basic concept has been described above. Obviously, for those skilled in the art, the above detailed disclosure is only an example, and does not constitute a limitation to the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment," or "an embodiment," or "an alternative embodiment" two or more times in different places in the present disclosure do not necessarily refer to the same embodiment. In addition, some features, structures, or characteristics in the present disclosure of one or more embodiments may be appropriately combined.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described. The specific embodiments described in the present disclosure are merely exemplary, and one or more technical features in the specific embodiments are optional or additional, and are not necessary technical features constituting the inventive conception of the present disclosure. In other words, the scope of protection of the present disclosure covers and is much broader than the specific embodiments of the present disclosure.

What is claimed is:

1. An earphone, comprising:

a sound production component; and an ear hook including a first portion and a second portion connected in sequence, wherein the first portion is hung between an auricle of a user and a head of the user, the second portion extends toward a front outer side of the auricle and connects to the sound production component so that the sound production component is worn at a position near an ear canal but does not block an opening of the ear canal, the sound production component forms a first projection on a sagittal plane of the user along a coronal axis direction of the user in a wearing state, and the auricle forms a second projection on the sagittal plane along the coronal axis direction, a centroid of the first projection has a first distance from a highest point of the second projection in a vertical axis direction, the first distance is within a range of 17 mm-43 mm, and an area of the first projection is within a range of 202 $mm^2$-560 $mm^2$.

2. The earphone of claim 1, wherein the centroid of the first projection has a second distance from an end point of the second projection in a sagittal axis direction, at least a portion of the sound production component extends into a cavity of an auricular concha, the first distance is within a range of 25 mm-43 mm, and/or the second distance is within a range of 20 mm-32.8 mm.

3. The earphone of claim 2, wherein a ratio of an area of an overlapping part of the first projection and a projection of the cavity of auricular concha on the sagittal plane to an area of the first projection is within a range of 0.25-0.8.

4. The earphone of claim 2, wherein a ratio of an area of an overlapping part of the first projection and a projection of the cavity of auricular concha on the sagittal plane to a projection area of the cavity of auricular concha on the sagittal plane is not less than 44.01%.

5. The earphone of claim 2, wherein the first projection includes a long axis direction and a short axis direction, and the first projection satisfies at least one of the following conditions:

a size of the first projection in the long axis direction is within a range of 18 mm-29 mm; or a size of the first projection in the short axis direction is within a range of 10 mm-15 mm.

6. The earphone of claim 2, wherein a ratio of a distance between a midpoint of a projection of an upper sidewall of the sound production component on the sagittal plane and the highest point of the second projection to a distance between the centroid of the first projection and the highest point of the second projection is within a range of 0.75-0.9; or a ratio of a distance between a midpoint of a projection of a lower sidewall of the sound production component on the sagittal plane and the highest point of the second projection to a distance between the centroid of the first projection and the highest point of the second projection is within a range of 1.1-1.35.

7. The earphone of claim 2, wherein a distance between a projection of the centroid of the first projection and a projection of a vertex of the ear hook on the sagittal plane is within a range of 28 mm-38 mm.

8. The earphone of claim 2, wherein a ratio of the first distance to a height of the second projection in the vertical axis direction is within a range of 0.35-0.6; or a ratio of the second distance to a width of the second projection in the sagittal axis direction is within a range of 0.4-0.65.

9. The earphone of claim 2, wherein a ratio of a distance between the centroid of the first projection and a centroid of a projection of the opening of the ear canal on the sagittal plane to a distance between the centroid of the first projection and a projection of a contour of the second projection on the sagittal plane is within a range of 0.13-0.55.

10. The earphone of claim 2, wherein an inclination angle of a projection of an upper sidewall or a lower sidewall of the sound production component on the sagittal plane relative to a horizontal direction is within a range of 13°–21°.

11. The earphone of claim 1, wherein the centroid of the first projection has a second distance from an end point of the second projection in a sagittal axis direction, the sound production component at least partially covers an antihelix region, the first distance is within a range of 17 mm-29 mm, and/or the second distance is within a range of 20 mm-31 mm.

12. The earphone of claim 11, wherein a ratio of an area of an overlapping part of the first projection and a projection of a cavity of auricular concha on the sagittal plane to an area of the first projection is not less than 0.18.

13. The earphone of claim 11, wherein the ratio of an area of an overlapping part of the first projection and a projection of a cavity of auricular concha on the sagittal plane to a projection area of the cavity of auricular concha on the sagittal plane is not less than 11.82%.

14. The earphone of claim 11, wherein a minimum distance between a projection of an end of the sound production component on the sagittal plane and a projection of an inner contour of the auricle on the sagittal plane is not greater than 8 mm, or a distance between the projection of the end of the sound production component on the sagittal plane and the projection of the inner contour of the auricle on the sagittal plane in the sagittal axis direction is not greater than 8 mm.

15. The earphone of claim 11, wherein the first projection includes a long axis direction and a short axis direction, and the first projection satisfies at least one of the following conditions:

a size of the first projection in the long axis direction is within a range of 21 mm-33 mm; or a size of the first projection in the short axis direction is within a range of 11 mm-18 mm.

16. The earphone of claim 11, wherein a ratio of a distance between a midpoint of a projection of an upper sidewall of the sound production component on the sagittal plane and a highest point of the second projection to a distance between the centroid of the first projection and the highest point of the second projection is within a range of 0.65-0.85, or a ratio of a distance between a midpoint of a projection of a lower sidewall of the sound production component on the sagittal plane and the highest point of the second projection to a distance between the centroid of the first projection and the highest point of the second projection is within a range of 1.17 to 1.4.

17. The earphone of claim 11, wherein a distance between a projection of the centroid of the first projection and a projection of a vertex of the ear hook on the sagittal plane is within a range of 14 mm-28 mm.

18. The earphone of claim 11, wherein a ratio of the first distance to a height of the second projection in the vertical axis direction is within a range of 0.25-0.4, or a ratio of the second distance to a width of the second projection in the sagittal axis direction is within a range of 0.4-0.6.

19. The earphone of claim 11, wherein a ratio of a distance between the centroid of the first projection and a centroid of a projection of the opening of the ear canal on the sagittal plane to a distance between the centroid of the first projection and a projection of a contour of the second projection on the sagittal plane is within a range of 0.07-0.54.

20. The earphone of claim 11, wherein an inclination angle of a projection of an upper sidewall or a lower sidewall of the sound production component on the sagittal plane relative to a horizontal direction is not greater than 40°.

* * * * *